United States Patent
Robinson et al.

(10) Patent No.: US 10,788,710 B2
(45) Date of Patent: *Sep. 29, 2020

(54) OPTICAL STACK FOR SWITCHABLE DIRECTIONAL DISPLAY

(71) Applicant: RealD Spark, LLC, Beverly Hills, CA (US)

(72) Inventors: Michael G. Robinson, Boulder, CO (US); Graham J. Woodgate, Henley-on-Thames (GB); Robert A. Ramsey, Boulder, CO (US); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,885

(22) Filed: May 28, 2019

(65) Prior Publication Data

US 2019/0293983 A1    Sep. 26, 2019

Related U.S. Application Data

(63) Continuation of application No. 16/131,419, filed on Sep. 14, 2018.
(Continued)

(51) Int. Cl.
*G02F 1/1335* (2006.01)
*G02F 1/13363* (2006.01)
(Continued)

(52) U.S. Cl.
CPC ....... *G02F 1/13363* (2013.01); *G02B 5/3016* (2013.01); *G02B 5/3083* (2013.01);
(Continued)

(58) Field of Classification Search
CPC .. G02F 1/1323; G02F 1/13471; G02B 5/3083
(Continued)

(56) References Cited

U.S. PATENT DOCUMENTS 4,914,553 A    4/1990  Hamada et al.
4,974,941 A   12/1990  Gibbons et al.
(Continued)

FOREIGN PATENT DOCUMENTS

CN    1910399 A    2/2007
CN    2872404      2/2007
(Continued)

OTHER PUBLICATIONS

AU-2011329639 Australia Patent Examination Report No. 1 dated Mar. 6, 2014.
(Continued)

*Primary Examiner* — Paisley L Wilson
(74) *Attorney, Agent, or Firm* — Penny L. Lowry; Neil G. J. Mothew

(57) ABSTRACT

A privacy display comprises a spatial light modulator and a compensated switchable liquid crystal retarder arranged between first and second polarisers arranged in series with the spatial light modulator. In a privacy mode of operation, on-axis light from the spatial light modulator is directed without loss, whereas off-axis light has reduced luminance. The visibility of the display to off-axis snoopers is reduced by means of luminance reduction over a wide polar field. In a wide angle mode of operation, the switchable liquid crystal retardance is adjusted so that off-axis luminance is substantially unmodified.

27 Claims, 63 Drawing Sheets

Related U.S. Application Data

(60) Provisional application No. 62/559,187, filed on Sep. 15, 2017, provisional application No. 62/565,836, filed on Sep. 29, 2017, provisional application No. 62/582,052, filed on Nov. 6, 2017, provisional application No. 62/592,085, filed on Nov. 29, 2017, provisional application No. 62/634,168, filed on Feb. 22, 2018, provisional application No. 62/641,657, filed on Mar. 12, 2018, provisional application No. 62/673,359, filed on May 18, 2018, provisional application No. 62/699,914, filed on Jul. 18, 2018.

(51) Int. Cl.
  *G02B 5/30* (2006.01)
  *G02F 1/137* (2006.01)
  *G02F 1/13* (2006.01)
  *G02F 1/1337* (2006.01)
  *G02F 1/1347* (2006.01)

(52) U.S. Cl.
  CPC ............ *G02F 1/137* (2013.01); *G02F 1/1323* (2013.01); *G02F 1/1337* (2013.01); *G02F 1/13471* (2013.01); *G02F 1/133536* (2013.01); *G02F 1/133634* (2013.01); *G02F 2001/13706* (2013.01); *G02F 2001/13712* (2013.01); *G02F 2001/133738* (2013.01); *G02F 2001/133742* (2013.01); *G02F 2203/12* (2013.01); *G02F 2413/02* (2013.01)

(58) Field of Classification Search
  USPC .......................................................... 349/119
  See application file for complete search history.

(56) References Cited

U.S. PATENT DOCUMENTS

| | | |
|---|---|---|
| 5,528,720 A | 6/1996 | Winston et al. |
| 5,727,107 A | 3/1998 | Umemoto et al. |
| 5,959,664 A | 9/1999 | Woodgate |
| 5,971,559 A | 10/1999 | Ishikawa et al. |
| 6,014,164 A | 1/2000 | Woodgate et al. |
| 6,061,489 A | 5/2000 | Ezra et al. |
| 6,075,557 A | 6/2000 | Holliman et al. |
| 6,108,059 A | 8/2000 | Yang |
| 6,199,995 B1 | 3/2001 | Umemoto et al. |
| 6,204,904 B1 | 3/2001 | Tillin et al. |
| 6,232,592 B1 | 5/2001 | Sugiyama |
| 6,305,813 B1 | 10/2001 | Lekson et al. |
| 6,335,999 B1 | 1/2002 | Winston et al. |
| 6,422,713 B1 | 7/2002 | Fohl et al. |
| 6,464,365 B1 | 10/2002 | Gunn et al. |
| 6,663,254 B2 | 12/2003 | Ohsumi |
| 6,731,355 B2 | 5/2004 | Miyashita |
| 6,847,488 B2 | 1/2005 | Travis |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,067,985 B2 | 6/2006 | Adachi |
| 7,073,933 B2 | 7/2006 | Gotoh et al. |
| 7,101,048 B2 | 9/2006 | Travis |
| 7,215,415 B2 | 5/2007 | Maehara et al. |
| 7,410,286 B2 | 8/2008 | Travis |
| 7,430,358 B2 | 9/2008 | Qi et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,944,428 B2 | 5/2011 | Travis |
| 7,970,246 B2 | 6/2011 | Travis et al. |
| 7,976,208 B2 | 7/2011 | Travis |
| 7,991,257 B1 | 8/2011 | Coleman |
| 8,016,475 B2 | 9/2011 | Travis |
| 8,154,686 B2 | 4/2012 | Mather et al. |
| 8,216,405 B2 | 7/2012 | Emerton et al. |
| 8,237,876 B2 | 8/2012 | Tan et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,534,901 B2 | 9/2013 | Panagotacos et al. |
| 8,714,804 B2 | 5/2014 | Kim et al. |
| 9,519,153 B2 | 12/2016 | Robinson et al. |
| 2002/0171793 A1 | 11/2002 | Sharp et al. |
| 2003/0137738 A1 | 7/2003 | Ozawa et al. |
| 2004/0042233 A1 | 3/2004 | Suzuki et al. |
| 2004/0109303 A1 | 6/2004 | Olczak |
| 2004/0145703 A1 | 7/2004 | O'Connor et al. |
| 2004/0170011 A1 | 9/2004 | Kim et al. |
| 2005/0135116 A1 | 6/2005 | Epstein et al. |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0264717 A1 | 12/2005 | Chien et al. |
| 2005/0276071 A1 | 12/2005 | Sasagawa et al. |
| 2006/0139447 A1 | 6/2006 | Unkrich |
| 2006/0221642 A1 | 10/2006 | Daiku |
| 2006/0269213 A1 | 11/2006 | Hwang et al. |
| 2006/0291053 A1 | 12/2006 | Robinson et al. |
| 2006/0291243 A1 | 12/2006 | Niioka et al. |
| 2007/0025680 A1 | 2/2007 | Winston et al. |
| 2007/0035964 A1 | 2/2007 | Olczak |
| 2007/0064163 A1 | 3/2007 | Tan et al. |
| 2007/0115551 A1 | 5/2007 | Spilman et al. |
| 2007/0115552 A1 | 5/2007 | Robinson et al. |
| 2007/0139772 A1 | 6/2007 | Wang |
| 2007/0188667 A1 | 8/2007 | Schwerdtner |
| 2007/0223252 A1 | 9/2007 | Lee et al. |
| 2007/0285775 A1 | 12/2007 | Lesage et al. |
| 2008/0084519 A1 | 4/2008 | Brigham et al. |
| 2008/0086289 A1 | 4/2008 | Brott |
| 2008/0225205 A1 | 9/2008 | Travis |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0067156 A1 | 3/2009 | Bonnett et al. |
| 2009/0140656 A1 | 6/2009 | Kohashikawa et al. |
| 2009/0160757 A1 | 6/2009 | Robinson |
| 2009/0225380 A1 | 9/2009 | Schwerdtner et al. |
| 2009/0278936 A1 | 11/2009 | Pastoor et al. |
| 2010/0053771 A1 | 3/2010 | Travis et al. |
| 2010/0091254 A1 | 4/2010 | Travis et al. |
| 2010/0177387 A1 | 7/2010 | Travis et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0300608 A1 | 12/2010 | Emerton et al. |
| 2011/0032483 A1 | 2/2011 | Hruska et al. |
| 2011/0043142 A1 | 2/2011 | Travis et al. |
| 2011/0044056 A1 | 2/2011 | Travis et al. |
| 2011/0187293 A1 | 8/2011 | Travis |
| 2011/0188120 A1 | 8/2011 | Tabirian et al. |
| 2011/0216266 A1 | 9/2011 | Travis |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0310232 A1 | 12/2011 | Wilson et al. |
| 2012/0002121 A1 | 1/2012 | Pirs et al. |
| 2012/0002295 A1 | 1/2012 | Dobschal et al. |
| 2012/0127573 A1 | 5/2012 | Robinson et al. |
| 2012/0147280 A1 | 6/2012 | Osterman et al. |
| 2012/0243204 A1 | 9/2012 | Robinson |
| 2013/0307831 A1 | 11/2013 | Robinson et al. |
| 2014/0071382 A1 | 3/2014 | Scardato |
| 2014/0240828 A1 | 8/2014 | Robinson et al. |

(56) References Cited

U.S. PATENT DOCUMENTS

| | | |
|---|---|---|
| 2014/0340728 A1 | 11/2014 | Taheri |
| 2015/0177447 A1 | 6/2015 | Woodgate et al. |
| 2016/0238869 A1 | 8/2016 | Osterman et al. |
| 2016/0357046 A1 | 12/2016 | Choi et al. |
| 2017/0236494 A1 | 8/2017 | Sommerlade et al. |
| 2018/0052346 A1 | 2/2018 | Sakai et al. |
| 2018/0113334 A1* | 4/2018 | Fang .............. G02F 1/13363 |
| 2019/0025624 A1* | 1/2019 | Petelin ............. G02B 27/281 |

FOREIGN PATENT DOCUMENTS

| | | |
|---|---|---|
| CN | 101364004 A | 2/2009 |
| EP | 0830984 A2 | 3/1998 |
| EP | 0860729 A2 | 8/1998 |
| EP | 0939273 A1 | 9/1999 |
| EP | 2003394 A2 | 12/2008 |
| JP | H08211334 | 8/1996 |
| JP | H08254617 | 10/1996 |
| JP | H08340556 | 12/1996 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 3968742 B2 | 8/2007 |
| JP | 2007273288 A | 10/2007 |
| JP | 2008204874 A | 9/2008 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| TW | M537663 U | 3/2017 |
| WO | 1999011074 A1 | 3/1999 |
| WO | 2001061241 A1 | 8/2001 |
| WO | 2011022342 A2 | 2/2011 |

OTHER PUBLICATIONS

AU-2015258258 Australian Office Action of Australian Patent Office dated Jun. 9, 2016.
CA-2817044 Canadian office action dated Jul. 14, 2016.
CN-201180065590.0 Office first action dated Dec. 31, 2014.
CN-201180065590.0 Office fourth action dated Jan. 4, 2017.
CN-201180065590.0 Office second action dated Oct. 21, 2015.
CN-201180065590.0 Office Third action dated Jun. 6, 2016.
CN-201480023023.2 Office first action dated Aug. 12, 2016.
EP-11842021.5 Office Action dated Dec. 17, 2014.
EP-11842021.5 Office Action dated Oct. 2, 2015.
EP-11842021.5 Office Action dated Sep. 2, 2016.
JP-2013540083 Notice of reasons for rejection dated Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
RU-2013122560 First office action dated Jan. 22, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Gass, et al. "Privacy LCD Technology for Cellular Phones", Sharp Laboratories of Europe Ltd, Mobile LCD Group, Feb. 2007, pp. 45-49.
Weindorf et al., "Active Circular Polarizer OLED E-Mirror", Proceedings of the Society for Information Display 25th Annual Symposium on Vehicle Displays, Livonia, MI, pp. 225-237, Sep. 25-26, 2018.
PCT/US2018/031206 International search report and written opinion of international searching authority dated Jul. 20, 2018.
PCT/US2018/053328 International search report and written opinion of international searching authority dated Nov. 30, 2018.
PCT/US2018/051021 International search report and written opinion of international searching authority dated Nov. 21, 2018.
PCT/US2019/014889 International search report and written opinion of international searching authority dated May 24, 2019.

* cited by examiner

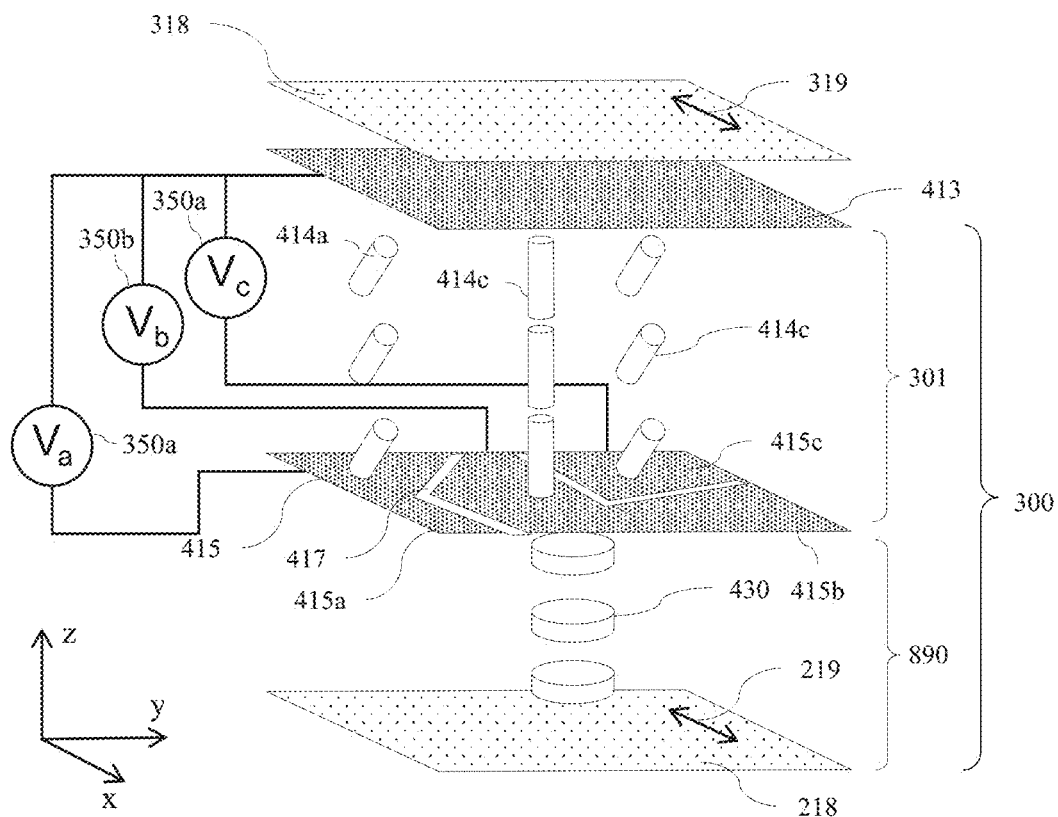
*FIG. 25A*
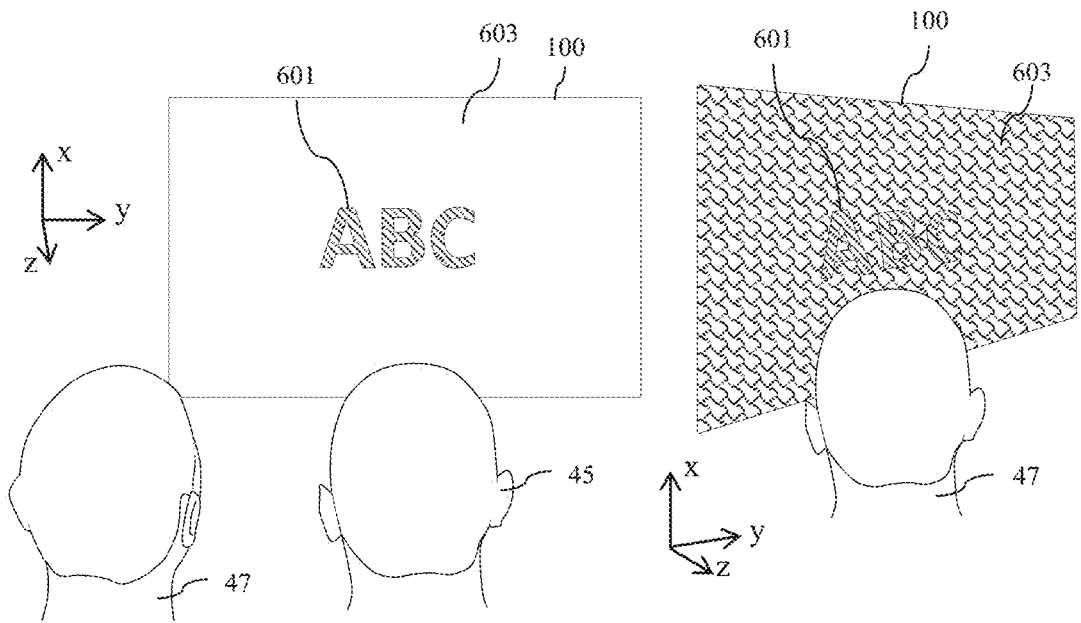
*FIG. 25B*  *FIG. 25C*

OPTICAL STACK FOR SWITCHABLE DIRECTIONAL DISPLAY

TECHNICAL FIELD

This disclosure generally relates to illumination from light modulation devices, and more specifically relates to switchable optical stacks for providing control of illumination for use in a display including a privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Control of off-axis privacy may further be provided by means of contrast reduction, for example by adjusting the liquid crystal bias tilt in an In-Plane-Switching LCD.

BRIEF SUMMARY

According to a first aspect of the present disclosure there is provided a display device comprising: a spatial light modulator; a display polariser arranged on a side of the spatial light modulator; an additional polariser arranged on the same side of the spatial light modulator as the display polariser; and plural retarders arranged between the additional polariser and the display polariser; wherein the plural retarders comprise: a switchable liquid crystal retarder comprising a layer of liquid crystal material arranged between the display polariser and the additional polariser; and at least one passive compensation retarder.

The plural retarders may be arranged to not affect the luminance of light passing through the display polariser, the additional polariser and the plural retarders along an axis along a normal to the plane of the retarders and/or to reduce the luminance of light passing through the display polariser, the additional polariser and the plural retarders along an axis inclined to a normal to the plane of the retarders.

The at least one passive compensation retarder may be arranged to introduce no phase shift to polarisation components of light passed by the one of the display polariser and the additional polariser on the input side of the plural retarders along an axis along a normal to the plane of the at least one passive compensation retarder and/or to introduce a phase shift to polarisation components of light passed by the one of the display polariser and the additional polariser on the input side of the plural retarders along an axis inclined to a normal to the plane of the at least one passive compensation retarder.

The switchable liquid crystal retarder may be arranged to introduce no phase shift to polarisation components of light passed by the one of the display polariser and the additional polariser on the input side of the plural retarders along an axis along a normal to the plane of the switchable liquid crystal retarder and/or to introduce a phase shift to polarisation components of light passed by the one of the display polariser and the additional polariser on the input side of the plural retarders along an axis inclined to a normal to the plane of the switchable liquid crystal retarder in a switchable state of the switchable liquid crystal retarder.

Advantageously a switchable privacy display may be provided that may be switched between a wide angle operating state and a privacy operating state. The field of view for privacy operation may be extended in comparison to known arrangements, and lower off-axis luminance levels may be achieved, increasing degree of privacy observed by an off-axis snooper. Further, on-axis luminance may be maintained in both wide angle and privacy states of operation for on-axis primary users.

The display polariser and the additional polariser may have electric vector transmission directions that are parallel.

In one alternative, the switchable liquid crystal retarder may comprise two surface alignment layers disposed adjacent to the layer of liquid crystal material and on opposite sides thereof and each arranged to provide homeotropic alignment in the adjacent liquid crystal material. The layer of liquid crystal material of the switchable liquid crystal retarder may comprise a liquid crystal material with a negative dielectric anisotropy. The layer of liquid crystal material may have a retardance for light of a wavelength of 550 nm in a range from 500 nm to 1000 nm, preferably in a range from 600 nm to 900 nm and most preferably in a range from 700 nm to 850 nm.

Where two surface alignment layers providing homeotropic alignment are provided, the at least one passive compensation retarder may comprise a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm.

Alternatively, where two surface alignment layers providing homeotropic alignment are provided, the at least one passive compensation retarder may comprise a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm. Advantageously, in this case increased field of view in wide angle mode of operation may be provided. Further, zero voltage operation in wide angle mode of operation may be provided, reducing power consumption.

In another alternative, the switchable liquid crystal retarder may comprise two surface alignment layers disposed adjacent to the layer of liquid crystal material and on opposite sides thereof and each arranged to provide homogeneous alignment in the adjacent liquid crystal material. Advantageously in comparison to homeotropic alignment on opposite sides of the liquid crystal, increased resilience to the visibility of flow of liquid crystal material during applied pressure may be achieved.

The layer of liquid crystal material of the switchable liquid crystal retarder may comprise a liquid crystal material with a positive dielectric anisotropy. The layer of liquid crystal material may have a retardance for light of a wavelength of 550 nm in a range from 500 nm to 900 nm, preferably in a range from 600 nm to 850 nm and most preferably in a range from 700 nm to 800 nm.

Where two surface alignment layers providing homogeneous alignment are provided, the at least one passive compensation retarder may comprise a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm.

Alternatively, where the two surface alignment layers providing homogeneous alignment are provided, the at least one passive compensation retarder may comprise a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm. Advantageously, in this case increased resilience to the visibility of flow of liquid crystal material during applied pressure may be achieved.

In another alternative, the switchable liquid crystal retarder may comprise two surface alignment layers disposed adjacent to the layer of liquid crystal material and on opposite sides thereof, one of the surface alignment layers being arranged to provide homeotropic alignment in the adjacent liquid crystal material and the other of the surface alignment layers being arranged to provide homogeneous alignment in the adjacent liquid crystal material.

When the surface alignment layer arranged to provide homogeneous alignment is between the layer of liquid crystal material and the compensation retarder, the layer of liquid crystal material may have a retardance for light of a wavelength of 550 nm in a range from 700 nm to 2000 nm, preferably in a range from 1000 nm to 1500 nm and most preferably in a range from 1200 nm to 1500 nm.

When the surface alignment layer arranged to provide homogeneous alignment is between the layer of liquid crystal material and the compensation retarder, the at least one passive compensation retarder may comprise a retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm.

When the surface alignment layer arranged to provide homogeneous alignment is between the layer of liquid crystal material and the compensation retarder, the at least one passive compensation retarder may comprise a pair of retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

When the surface alignment layer arranged to provide homeotropic alignment is between the layer of liquid crystal material and the compensation retarder, the layer of liquid crystal material may have a retardance for light of a wavelength of 550 nm in a range from 500 nm to 1800 nm, preferably in a range from 700 nm to 1500 nm and most preferably in a range from 900 nm to 1350 nm.

When the surface alignment layer arranged to provide homeotropic alignment is between the layer of liquid crystal material and the compensation retarder, the at least one passive compensation retarder may comprise a retarder having its optical axis perpendicular to the plane of the retarder, the at least one passive retarder having a retardance for light of a wavelength of 550 nm in a range from −300 nm to −1600 nm, preferably in a range from −500 nm to −1300 nm and most preferably in a range from −700 nm to −1150 nm.

When the surface alignment layer arranged to provide homeotropic alignment is between the layer of liquid crystal material and the compensation retarder, the at least one passive compensation retarder may comprise a pair of retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm. Advantageously, in this case increased resilience to the visibility of flow of liquid crystal material during applied pressure may be achieved.

Each alignment layer may have a pretilt having a pretilt direction with a component in the plane of the liquid crystal layer that is parallel or anti-parallel or orthogonal to the electric vector transmission direction of the display polariser. Advantageously a display may be provided with narrow viewing angle in a lateral direction and a wide viewing freedom for display rotation about a horizontal axis. Such a display may be comfortable to view for a head-on display user and difficult to view for an off-axis display user.

The at least one passive retarder may comprise at least two passive retarders with at least two different orientations of optical axes which may have optical axes in the plane of the retarders that are crossed. Field of view for liquid crystal retarders with homogeneous alignment is increased while providing resilience to the visibility of flow of liquid crystal material during applied pressure.

The pair of passive retarders may have optical axes that extend at 45° and at 135°, respectively, with respect to an electric vector transmission direction that is parallel to the electric vector transmission of the display polariser. The passive retarders may be provided using stretched films to advantageously achieve low cost and high uniformity.

The switchable liquid crystal retarder may be provided between the pair of passive retarders. Advantageously the thickness and complexity of the plural retarders may be reduced.

A transparent electrode and a liquid crystal alignment layer may be formed on a side of each of the pair of passive retarders adjacent the switchable liquid crystal retarder; and may further comprise first and second substrates between which the switchable liquid crystal retarder is provided, the first and second substrates each comprising one of the pair of passive retarders, wherein each of the pair of passive retarders has a retardance for light of a wavelength of 550 nm in a range from 150 nm to 800 nm, preferably in a range from 200 nm to 700 nm and most preferably in a range from 250 nm to 600 nm.

In one alternative, the at least one passive compensation retarder may comprise a retarder having an optical axis perpendicular to the plane of the retarder. Advantageously the thickness and complexity of the passive retarder stack may be reduced.

The at least one passive compensation retarder may comprise two passive retarders having an optical axis perpendicular to the plane of the passive retarders, and the switchable liquid crystal retarder is provided between the two passive retarders. Advantageously the thickness and complexity of the plural retarders may be reduced. High head-on efficiency may be achieved in both wide and privacy modes, a wide field of view for wide angle mode and snoopers may be unable to perceive image data from a wide range of off-axis viewing locations.

A transparent electrode and a liquid crystal alignment layer may be formed on a side of each of the two passive retarders adjacent the switchable liquid crystal retarder. First and second substrates between which the switchable liquid crystal retarder may be provided, the first and second substrates each comprising one of the two passive retarders. The two passive retarders may have a total retardance for light of a wavelength of 550 nm in a range −300 nm to −700 nm, preferably in a range from −350 nm to −600 nm and most preferably in a range from −400 nm to −500 nm.

In another alternative, the at least one passive compensation retarder may comprise a retarder having an optical axis with a component perpendicular to the plane of the retarder and with a component in the plane of the retarder. Advantageously fields of view in wide angle mode may be increased and snoopers may be unable to perceive image data from a wide range of off-axis viewing locations.

The component in the plane of the passive retarder may extend at 0°, with respect to an electric vector transmission direction that is parallel or perpendicular to the electric vector transmission of the display polariser. The at least one passive retarder may further comprise a passive retarder having an optical axis perpendicular to the plane of the passive retarder or a pair of passive retarders which have optical axes in the plane of the passive retarders that are crossed.

The retardance of the at least one passive compensation retarder may be equal and opposite to the retardance of the switchable liquid crystal retarder.

The switchable liquid crystal retarder may comprise first and second pretilts; and the at least one passive compensation retarder may comprise a compensation retarder with first and second pretilts, the first pretilt of the compensation retarder being the same as the first pretilt of the liquid crystal retarder and the second pretilt of the compensation retarder being the same as the second pretilt of the liquid crystal retarder.

The switchable liquid crystal retarder may further comprise electrodes arranged to apply a voltage for controlling the layer of liquid crystal material. The electrodes may be on opposite sides of the layer of liquid crystal material. The display may be switched by control of the liquid crystal layer, advantageously achieving a switchable privacy display, or other display with reduced off-axis stray light. The display may further comprise a control system arranged to control the voltage applied across the electrodes of the at least one switchable liquid crystal retarder.

The electrodes may be patterned to provide at least two pattern regions. Advantageously increased privacy performance may be provided by obscuring image data. The display may be switched between a wide angle mode with no visibility of camouflage structure and a privacy mode with additional camouflage to provide reduced visibility to an off-axis snooper without substantial visibility of the camouflage pattern to a head-on user.

The control system may further comprise a means to determine the location of a snooper with respect to the display and the control system is arranged to adjust the voltage applied across the electrodes of the at least one switchable liquid crystal retarder in response to the snooper location. Advantageously the visibility of an image to a detected snooper may be minimised for a range of snooper locations.

The display device may further comprise at least one further retarder and a further additional polariser, wherein the at least one further retarder is arranged between the first-mentioned additional polariser and the further additional polariser. Advantageously off-axis luminance may be further reduced, reducing the visibility of the image to an off-axis snooper.

In one alternative for the display device, the spatial light modulator is a transmissive spatial light modulator arranged to receive output light from a backlight. Advantageously the backlight may provide reduced off-axis luminance in comparison to emissive displays.

The backlight may provide a luminance at polar angles to the normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator. Advantageously the luminance may be reduced for off-axis snoopers.

The backlight may comprise: an array of light sources; a directional waveguide comprising: an input end extending in a lateral direction along a side of the directional waveguide, the light sources being disposed along the input end and arranged to input input light into the waveguide; and opposed first and second guide surfaces extending across the directional waveguide from the input end for guiding light input at the input end along the waveguide, the waveguide being arranged to deflect input light guided through the directional waveguide to exit through the first guide surface. Advantageously uniform large area illumination may be provided with high efficiency.

The backlight may further comprise a light turning film and the directional waveguide is a collimating waveguide. The collimating waveguide may comprise (i) a plurality of elongate lenticular elements, and (ii) a plurality of inclined light extraction features, wherein the plurality of elongate lenticular elements and the plurality of inclined light extraction features are oriented to deflect input light guided through the directional waveguide to exit through the first guide surface. Advantageously a narrow angular output may be provided by the backlight.

The directional waveguide may be an imaging waveguide arranged to image the light sources in the lateral direction so that the output light from the light sources is directed into respective optical windows in output directions that are distributed in dependence on the input positions of the light sources. The imaging waveguide may comprise a reflective end for reflecting the input light back along the imaging waveguide, wherein the second guide surface is arranged to deflect the reflected input light through the first guide surface as output light, the second guide surface comprises light extraction features and intermediate regions between the light extraction features, the light extraction features being oriented to deflect the reflected input light through the first guide surface as output light and the intermediate regions being arranged to direct light through the waveguide without extracting it; and the reflective end may have positive optical power in the lateral direction extending between sides of the waveguide that extend between the first and second guide surfaces. Advantageously a switchable directional illumination may be provided that may be switched between narrow angle and wide angle illumination.

In one alternative where the spatial light modulator is a transmissive spatial light modulator, the display polariser may be an input display polariser arranged on the input side of the spatial light modulator between the backlight and the spatial light modulator, and the additional polariser is arranged between the input display polariser and the backlight. Advantageously the efficiency of the display is increased. The additional polariser may be a reflective polariser.

In this case, the display device may further comprise an output polariser arranged on the output side of the spatial light modulator.

In one alternative where the spatial light modulator is a transmissive spatial light modulator, the display polariser may be an output polariser arranged on the output side of the spatial light modulator. Advantageously the efficiency of the display is increased.

The display device may further comprise an input polariser arranged on the input side of the spatial light modulator.

The display device may further comprise a further additional polariser arranged on the input side of the spatial light modulator and at least one further retarder arranged between the at least one further additional polariser and the input polariser. Advantageously the luminance may be reduced for off-axis snoopers.

In one alternative for the display device, the spatial light modulator may comprise an emissive spatial light modulator arranged to output light. In that case, the display polariser may be an output display polariser arranged on the output side of the emissive spatial light modulator. Advantageously display thickness may be reduced in comparison to displays with backlights, and flexible and bendable displays may be conveniently provided.

The display device may comprise at least one further retarder and a further additional polariser, wherein the at least one further retarder is arranged between the first-mentioned additional polariser and the further additional polariser. Advantageously the luminance may be reduced for off-axis snoopers.

The various optional features and alternatives set out above with respect to the first aspect of the present invention may be applied together in any combination.

According to a second aspect of the present disclosure there is provided a view angle control optical element for application to a display device comprising a spatial light modulator and a display polariser arranged on a side of the spatial light modulator, the view angle control optical element comprising a control polariser and plural retarders for arrangement between the additional polariser and the display polariser on application of the view angle control optical element to the display device, the plural retarders comprising: a switchable liquid crystal retarder comprising a layer of liquid crystal material; and at least one passive compensation retarder.

Advantageously, the view angle control optical element may be distributed as an after-market element and may be attached to display devices by display users. The element does not require complex alignment. Moiré beating between the element and the pixels of the display is not present and selection of the component with regards to pixel pitch is not required. Inventory cost is reduced.

Alternatively, the view angle control optical element may be conveniently factory fitted into display devices.

The various features and alternatives set out above with respect to the first aspect of the present disclosure may similarly be applied to the second aspect of the present disclosure.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 25A is a schematic diagram illustrating in perspective side view an arrangement of a switchable compensated retarder in a privacy mode of operation comprising a negative C-plate passive compensation retarder and homeotropically aligned switchable liquid crystal retarder further comprising a patterned electrode layer;

FIG. 25B is a schematic diagram illustrating in perspective front view illumination of a primary viewer and a snooper by a camouflaged luminance controlled privacy display:

FIG. 25C is a schematic diagram illustrating in perspective side view illumination of a snooper by a camouflaged luminance controlled privacy display;

DETAILED DESCRIPTION

Figure 1A:
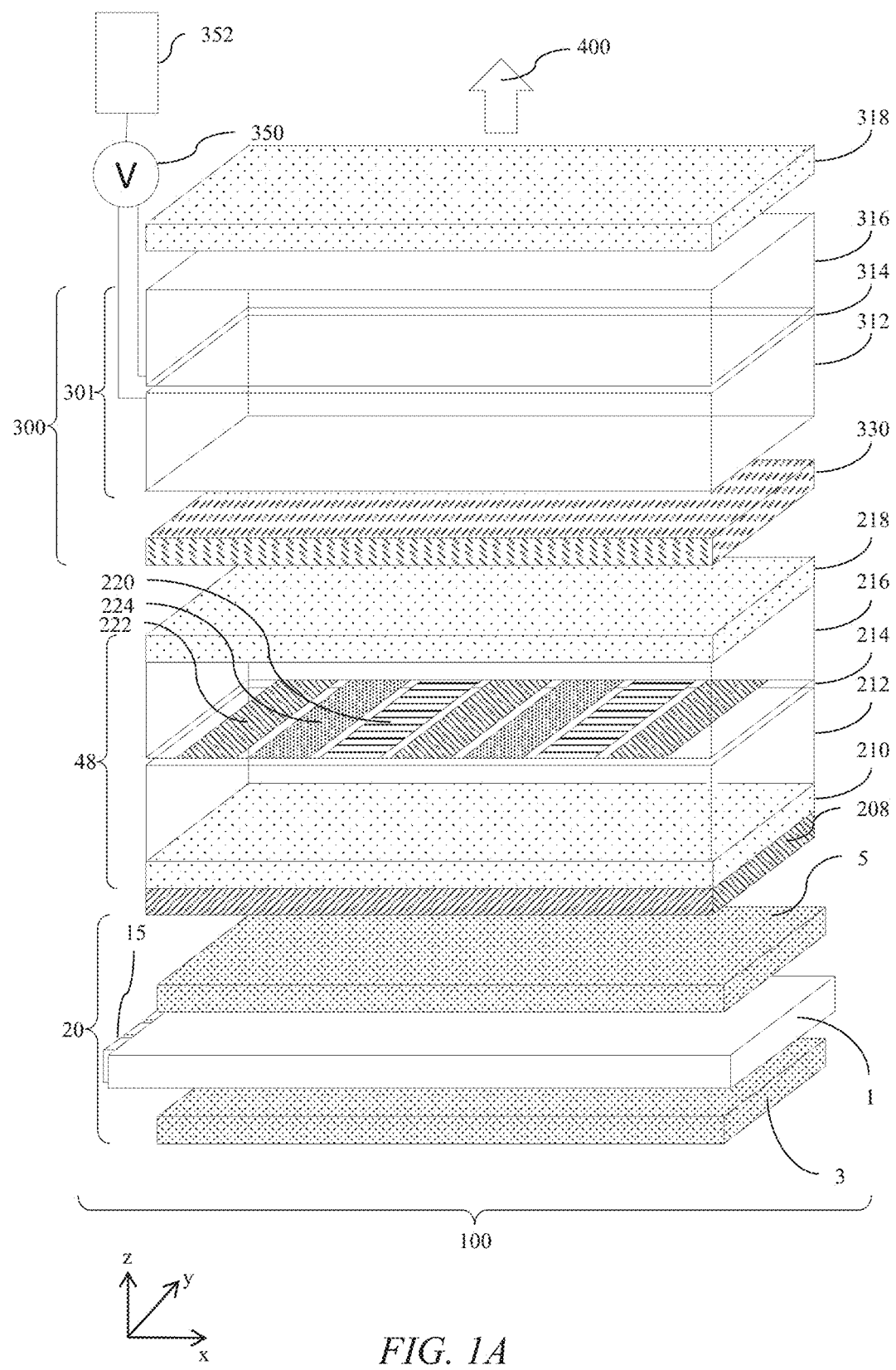
FIG. 1A is a schematic diagram illustrating in side perspective view an optical stack of a directional display device comprising a front switchable retarder.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

Optical axis refers to the direction of propagation of a light ray in the uniaxial birefringent material in which no birefringence is experienced. For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half wave retarder, the relationship between d, $\Delta n$, and $\lambda_0$ is chosen so that the phase shift between polarization components is $\Gamma = \pi$. For a quarter wave retarder, the relationship between d, $\Delta n$, and $\lambda_0$ is chosen so that the phase shift between polarization components is $\Gamma = \pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the (x-y) plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pretilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

Optical isolation retarders provided between the display polariser and an OLED display emission layer are described further in U.S. Pat. No. 7,067,985. Optical isolation retarders are in a different place to the passive retarders of the present embodiments. Isolation retarder reduces frontal reflections from the OLED display emission layer which is a different effect to the luminance reduction for off-axis viewing positions of the present embodiments.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

FIG. 1A is a schematic diagram illustrating in side perspective view an optical stack of a display device.

Display device 100 comprises a spatial light modulator 48 comprising at least one display polariser that is the output polariser 218. Backlight 20 is arranged to output light and the spatial light modulator 48 comprises a transmissive spatial light modulator 48 arranged to receive output light from the backlight 20. The display device 100 is arranged to output light 400 with angular luminance properties as will be described herein.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Optionally a reflective polariser 208 may be provided between the dichroic input display polariser 210 and backlight 210 to provide recirculated light and increase display efficiency. Advantageously efficiency may be increased.

Backlight 20 may comprise input light sources 15, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

In the present embodiments, the backlight 20 may be arranged to provide an angular light distribution that has reduced luminance for off-axis viewing positions in comparison to head-on luminance as will be described in FIGS. 26A to 28C below. Backlight 20 may further comprise a switchable backlight arranged to switch the output angular luminance profile in order to provide reduced off-axis luminance in a privacy mode of operation and higher off-axis luminance in a wide angle mode of operation. Such switching backlight 20 may cooperate with the switchable compensated retarder 300 of the present embodiments.

Additional polariser 318 is arranged on the same output side of the spatial light modulator 48 as the display output polariser 218 which may be an absorbing dichroic polariser.

The display polariser 218 and the additional polariser 318 have electric vector transmission directions 219, 319 that are parallel. As will be described below, such parallel alignment provides high transmission for central viewing locations.

Plural retarders which together are referred to herein as a switchable compensated retarder 300 are arranged between the additional polariser 318 and the display polariser 218 and comprise: (i) a switchable liquid crystal retarder 301 comprising a layer 314 of liquid crystal material arranged between the display polariser 218 and the additional polariser 318; and (ii) a passive compensation retarder 330.

Figure 1B:
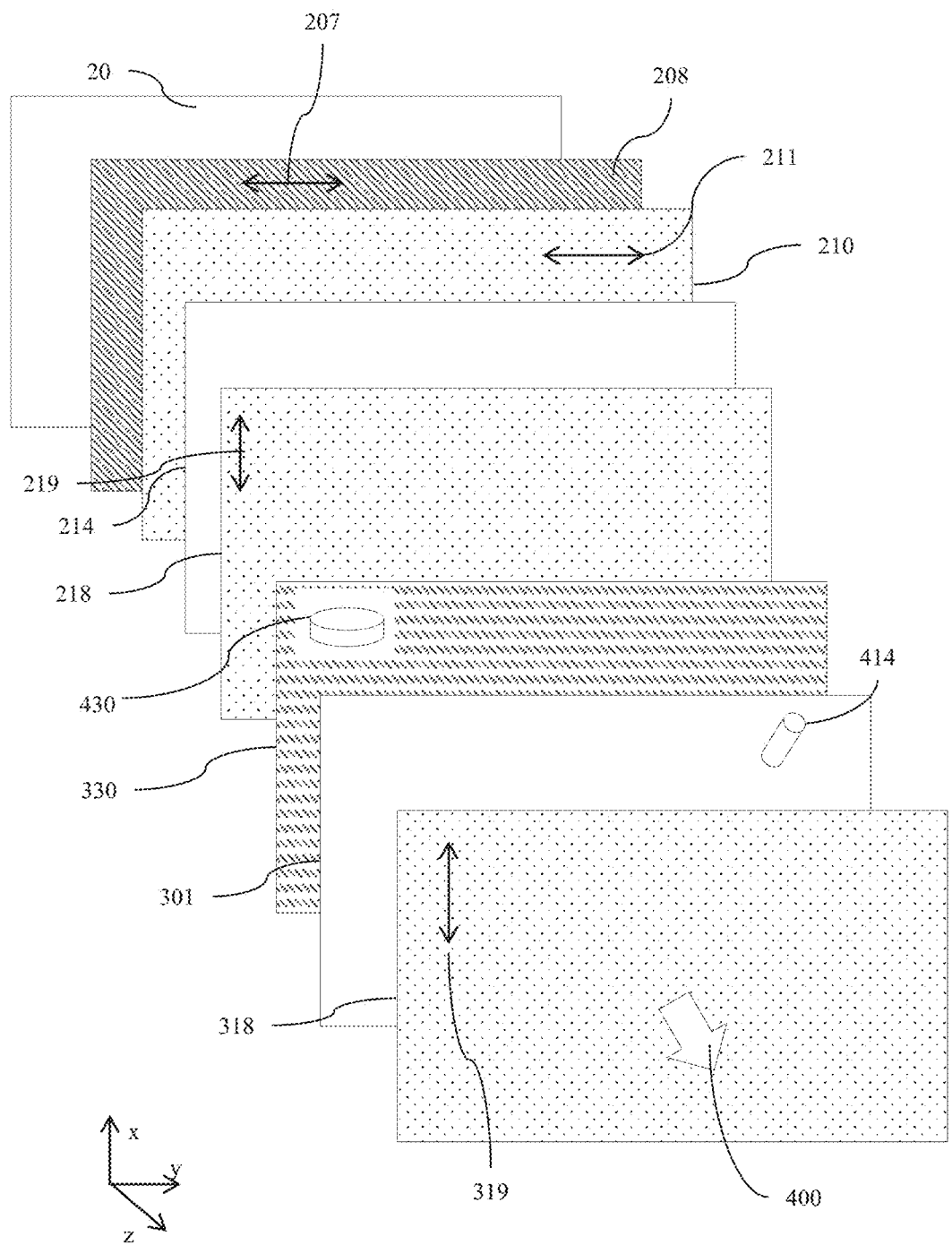
FIG. 1B is a schematic diagram illustrating in front view alignment of optical layers in the optical stack of FIG. 1A.

FIG. 1B is a schematic diagram illustrating in front view alignment of optical layers in the optical stack of FIG. 1A. The input electric vector transmission direction 211 at the input display polariser 210 of the spatial light modulator 48 provides an input polarisation component that may be transformed by the liquid crystal layer 214 to provide output polarisation component determined by the electric vector transmission direction 219 of the output display polariser 218. Passive compensation retarder 330 may comprise retardation layer with a discotic birefringent material 430, while switchable liquid crystal retarder 301 may comprise liquid crystal material.

Switchable compensated retarder 300 thus comprises a switchable liquid crystal retarder 301 comprising a switchable liquid crystal retarder 301, substrates 312, 316 and passive compensation retarder 330 arranged between and additional polariser 318 and display polariser 218.

Substrates 312, 316 may be glass substrates or polymer substrates such as polyimide substrates. Flexible substrates that may be conveniently provided with transparent electrodes may be provided. Advantageously curved, bent and foldable displays may be provided.

The display device 100 further comprises a control system 352 arranged to control the voltage applied by voltage driver 350 across the electrodes of the switchable liquid crystal retarder 301.

It may be desirable to provide reduced stray light or privacy control of an emissive display.

Figure 1C:
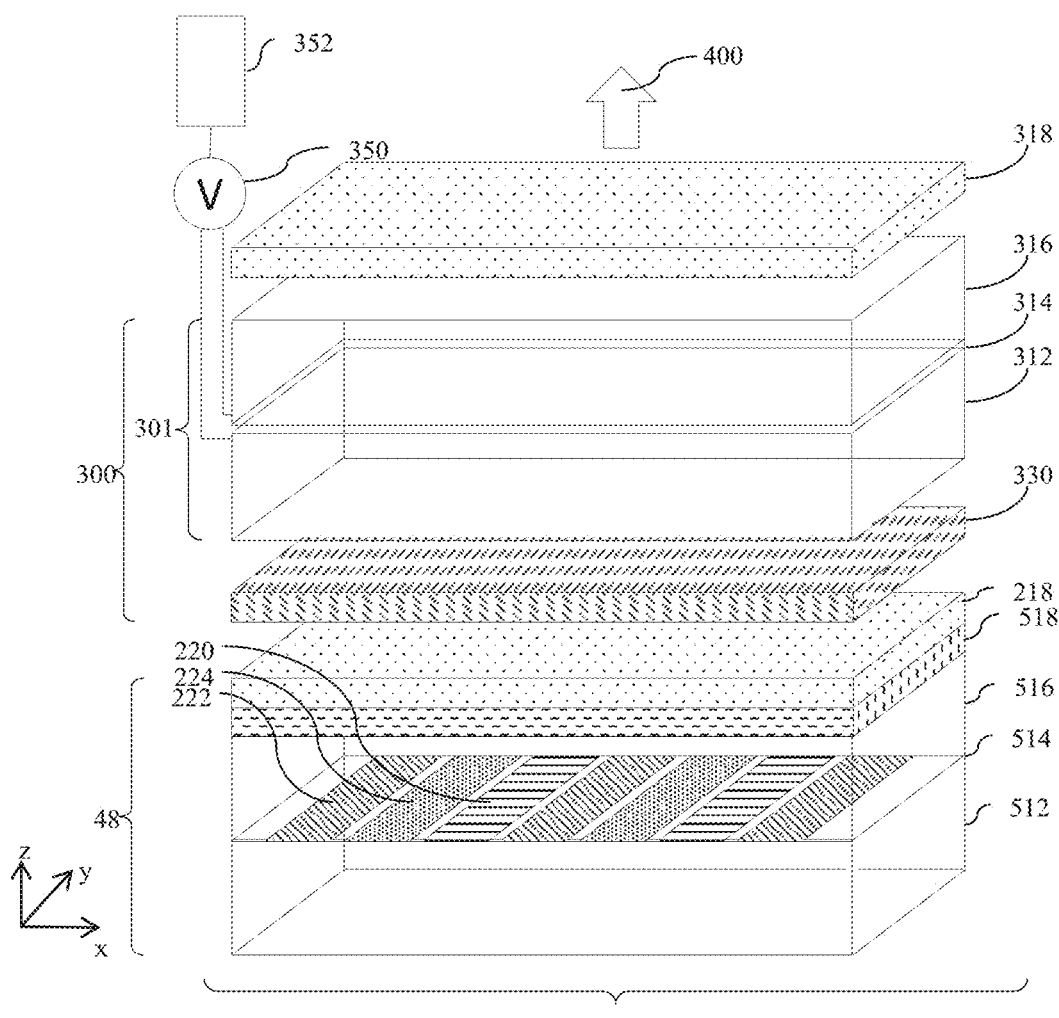
FIG. 1C is a schematic diagram illustrating in side perspective view an optical stack of a directional display device comprising an emissive spatial light modulator and a switchable compensated retarder arranged on the output side of the emissive spatial light modulator.

FIG. 1C is a schematic diagram illustrating in side perspective view an optical stack of a directional display device comprising an emissive spatial light modulator 48 and a switchable compensated retarder 300 arranged on the output side of the emissive spatial light modulator 48.

Spatial light modulator 48 may alternatively be provided by other display types that provide output light 400 by emission, such as organic LED displays (OLED), with output display polariser 218, substrates 512, 516 and light emission layer 514. Output polariser 218 may provide reduction of luminance for light reflected from the OLED pixel plane by means of one of more retarders 518 inserted between the output display polariser 218 and OLED pixel plane. The one or more retarders 518 may be a quarter waveplate and is different to the compensation retarder 330 of the present disclosure.

In the embodiment of FIG. 1C, the spatial light modulator 48 thus comprises an emissive spatial light modulator and the display polariser is output display polariser 218.

Otherwise, the directional display device of FIG. 1C is the same as that of FIG. 1A, as described above.

A view angle control optical element 260 for application to a display device will now be described. View angle control optical elements 260 may be added to spatial light modulators comprising a display polariser 210, 218 to achieve switchable field-of-view characteristics.

Figure 1D:
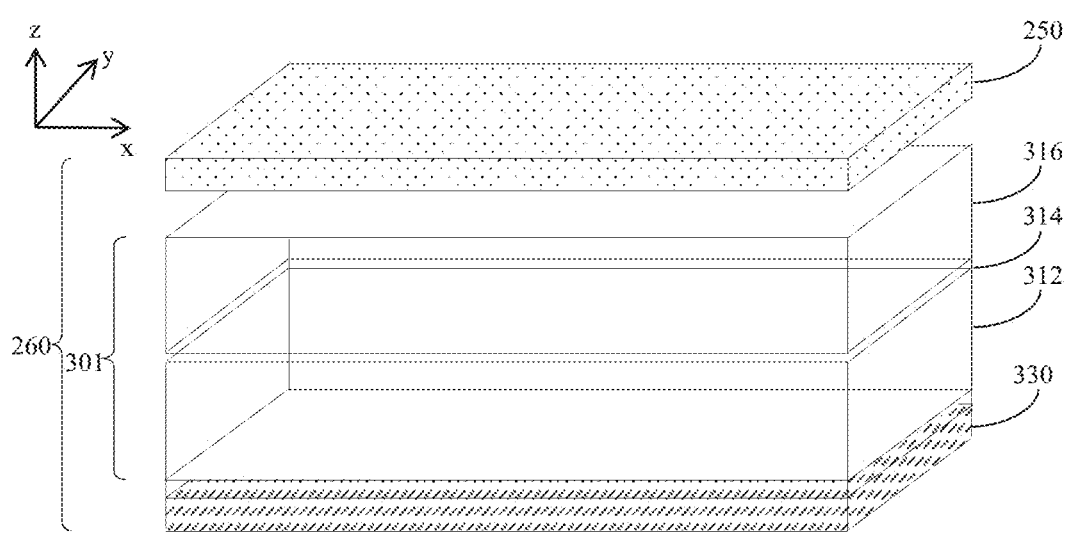
FIG. 1D is a schematic diagram illustrating in side perspective view a view angle control optical element comprising a passive compensation retarder, a switchable liquid crystal retarder and a control polariser.

FIG. 1D is a schematic diagram illustrating in side perspective view a view angle control optical element 260 for application to a display device comprising a passive compensation retarder 330, a switchable liquid crystal retarder 301 and a control polariser 250.

In use, view angle control optical element 260 may be attached by a user or may be factory fitted to a polarised output spatial light modulator 48. View angle control optical element 260 may be provided as a flexible film for curved and bent displays. Alternatively the view angle control optical element 260 may be provided on a rigid substrate such as a glass substrate.

Advantageously, an after-market privacy control element and/or stray light control element may be provided that does not require matching to the panel pixel resolution to avoid Moiré artefacts. View angle control optical element 260 may be further provided for factory fitting to spatial light modulator 48.

By attaching the view angle control optical element 260 of FIG. 1D to an existing display device, it is possible to form a display device as shown in any of FIGS. 1A-C.

The embodiments of FIGS. 1A-D provide polar luminance control for light 400 that is output from the spatial light modulator 48. That is, the switchable compensated retarder 300 (comprising the switchable liquid crystal retarder 301 and the passive compensation retarder 330) does not affect the luminance of light passing through the input display polariser 210, the switchable compensated retarder 300 and the additional polariser 318 along an axis along a normal to the plane of the switchable compensated retarder 300, but the switchable compensated retarder 300 does reduce the luminance of light passing therethrough along an axis inclined to a normal to the plane of the switchable compensated retarder 300, at least in one of the switchable states of the compensated switchable retarder 300. The principles leading to this effect are described in greater detail below with reference to FIGS. 29A-31E and arises from the presence or absence of a phase shift introduced by the switchable liquid crystal retarder 301 and the passive compensation retarder 330 to light along axes that are angled differently with respect to the liquid crystal material of the switchable liquid crystal retarder 301 and the passive compensation retarder 330. A similar effect is achieved in all the devices described below.

Furthermore, the provision of the passive compensation retarder 330 in addition to the switchable liquid crystal retarder 301 improves the performance, as will be described in more detail with reference to some specific display devices, and by comparison to some comparative examples described with reference to FIGS. 19A-E.

It may be desirable to reduce the number of optical layers between a spatial light modulator 48 and an observer. An arrangement wherein the plural retarders 300 are arranged on the input side of the spatial light modulator 48 will now be described.

Figure 2A:
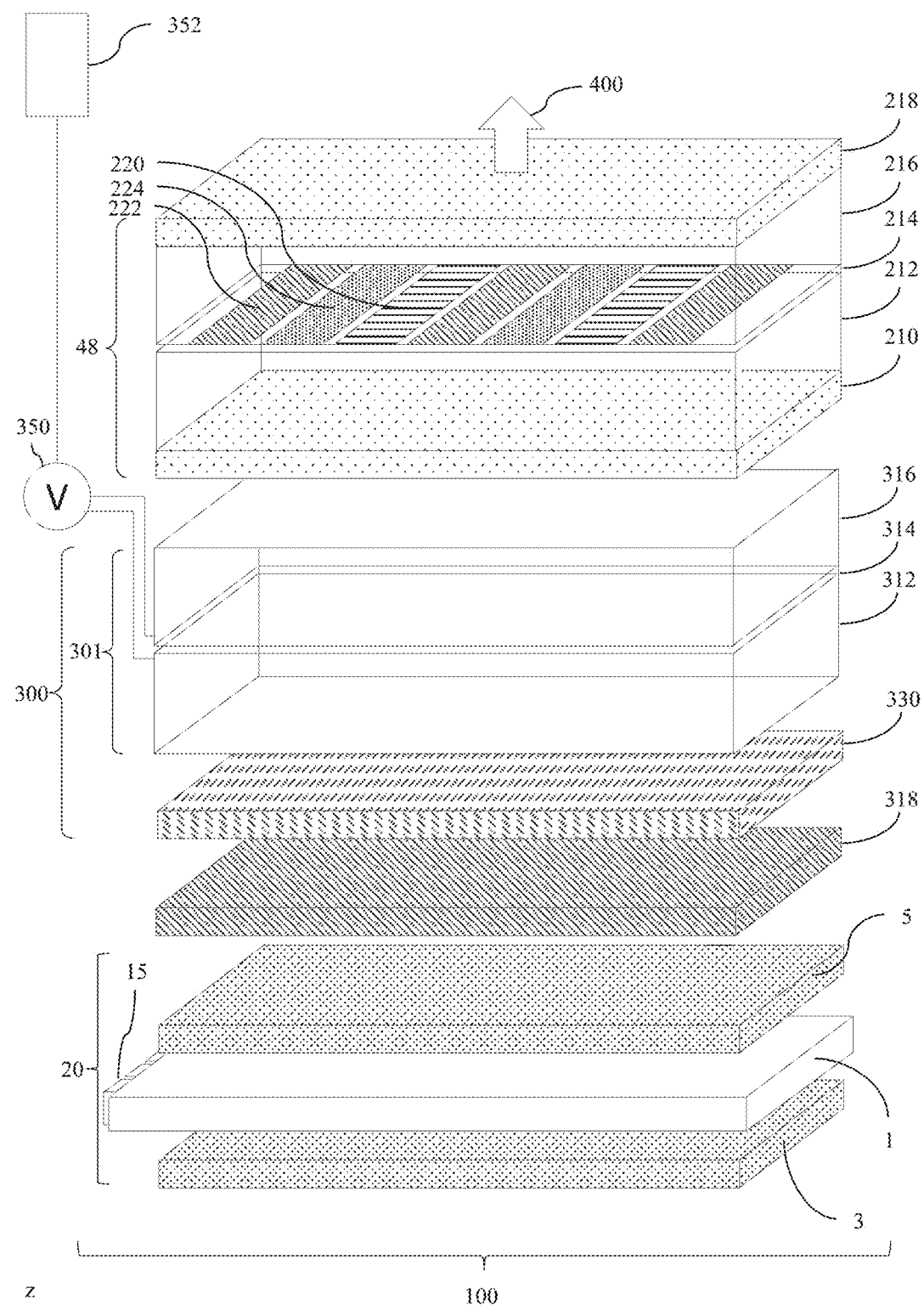
FIG. 2A is a schematic diagram illustrating in side perspective view an optical stack of a directional display device comprising a backlight, a rear switchable compensated retarder, and a transmissive spatial light modulator wherein the additional polariser comprises a reflective polariser.
Figure 2B:
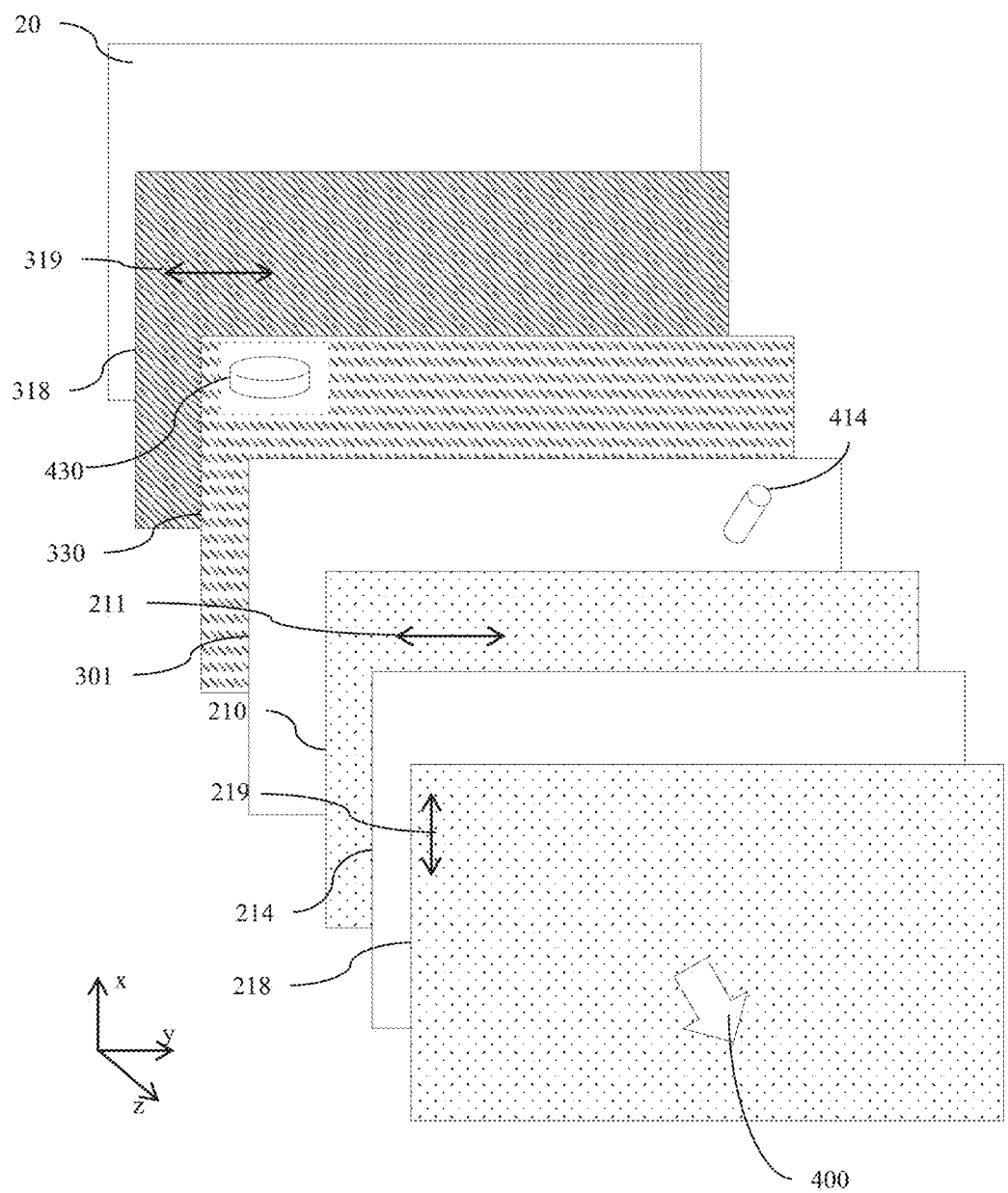
FIG. 2B is a schematic diagram illustrating in front view alignment of optical layers in the optical stack of FIG. 2A.

FIG. 2A is a schematic diagram illustrating in side perspective view an optical stack of a directional display device comprising a backlight 20, a switchable rear retarder 300, a transmissive spatial light modulator 48 wherein the additional polariser 318 comprises a reflective polariser, and FIG. 2B is a schematic diagram illustrating in front view alignment of optical layers in the optical stack of FIG. 2A.

The display device 100 comprises a spatial light modulator 48; a display polariser 210 arranged on the input side of the spatial light modulator 48. Additional polariser 318 is arranged on the same side of the spatial light modulator 48 as the display polariser 210. Additional polariser 318 is a reflective polariser that operates in cooperation with the backlight 20 to achieve increased efficiency.

Plural retarders 300 are arranged between the reflective additional polariser 318 and the display polariser 210. As for FIG. 1A, the plural retarders 300 comprise: a switchable liquid crystal retarder 301 comprising a layer 314 of liquid crystal material arranged between the display polariser 210 and the reflective additional polariser 318; and a passive compensation retarder 330. Thus the reflective additional polariser 318 is arranged on the input side of the input display polariser 210 between the input display polariser 210 and the backlight 20 and the plural retarders 300 are arranged between the reflective additional polariser 318 and the input display polariser 210.

The electric vector transmission direction 319 of the reflective additional polariser 318 is parallel to the electric vector transmission direction 211 of input polariser 210 to achieve the switchable directional properties as will be described hereinbelow.

In alternative embodiments the additional polariser 318 may comprise both a reflective polariser and an absorbing dichroic polariser or may comprise only a dichroic polariser.

The reflective additional polariser 318 may for example be a multilayer film such as DBEF™ from 3M Corporation, or may be a wire grid polariser. Advantageously display efficiency may be improved due to light recycling from the polarised reflection from the polariser 372. Further cost and thickness may be reduced in comparison to using both an absorbing dichroic polariser and a reflective polariser as additional polariser 318.

In comparison to the arrangement of FIG. 1A, FIG. 2A may provide improved front of screen image contrast due to the reduced number of layers between the pixels 220, 222, 224 and an observer.

Figure 2C:
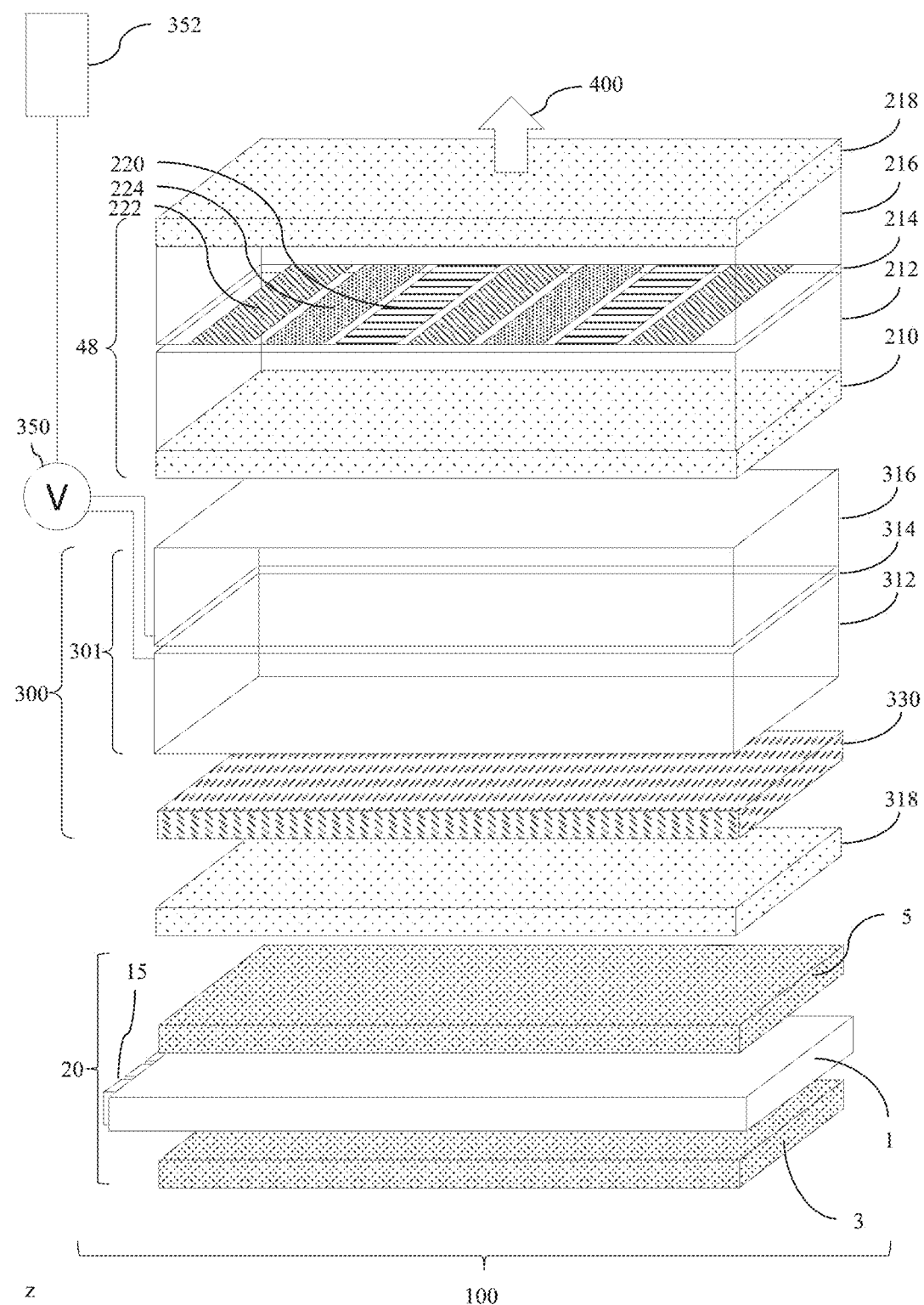
FIG. 2C is a schematic diagram illustrating in side perspective view an optical stack of a directional display device comprising a backlight, a rear switchable compensated retarder, and a transmissive spatial light modulator wherein the additional polariser comprises a dichroic polariser.

FIG. 2C is a schematic diagram illustrating in side perspective view an optical stack of a directional display device comprising a backlight 20, a rear switchable compensated retarder 300, and a transmissive spatial light modulator 48 wherein the additional polariser 318 comprises a dichroic polariser. In comparison to the reflective additional polariser 318 of FIG. 2A, the dichroic additional polariser 318 does not recycle high angle light into the backlight and thus may reduce the off-axis luminance in comparison to the arrangement of FIG. 2A. Advantageously privacy performance is improved.

The arrangement and operation of the switchable compensated retarders 300 and additional polariser 318 of FIGS. 1A-1C and FIGS. 2A-2B will now be described.

Figure 3:
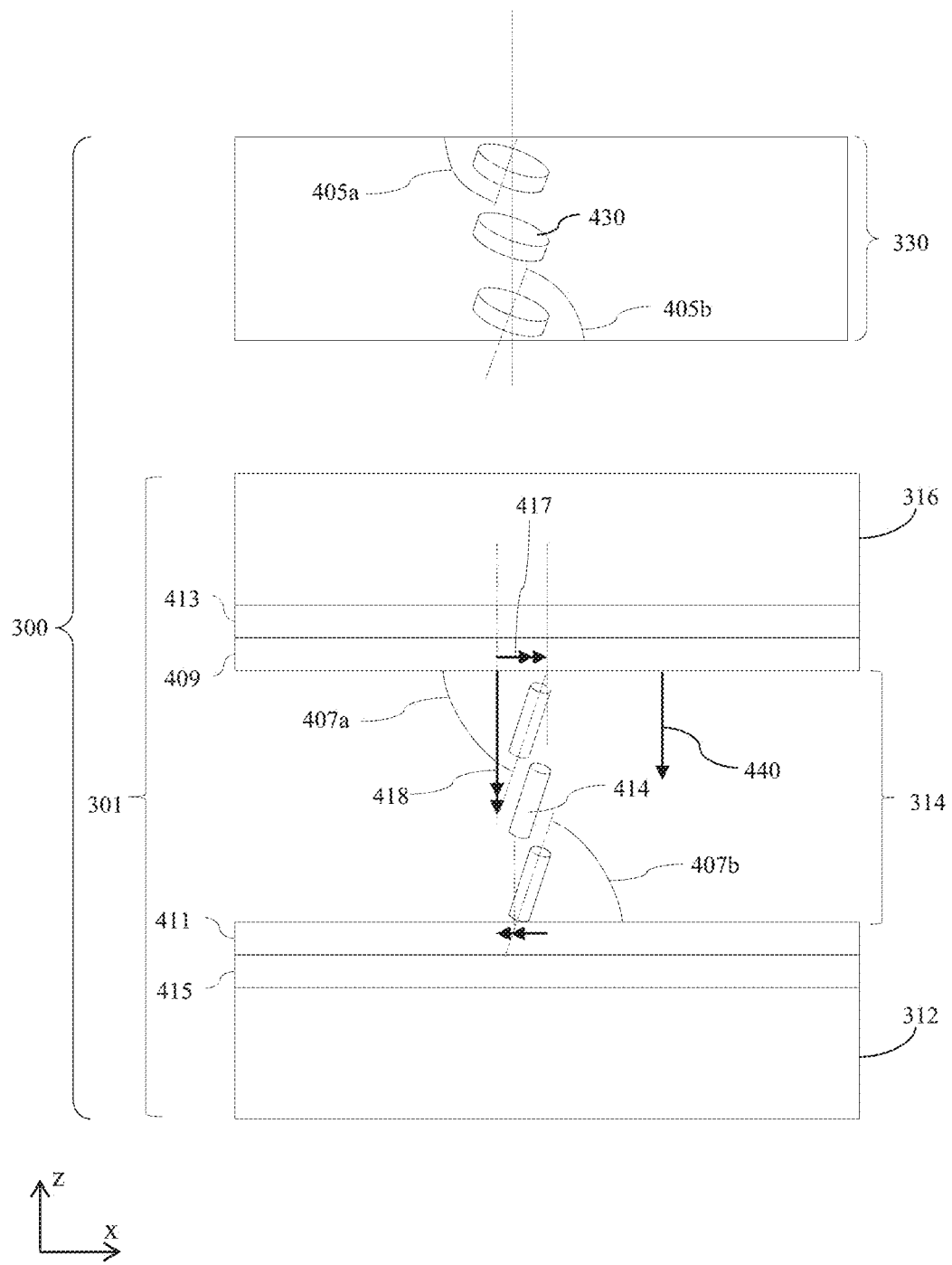
FIG. 3 is a schematic diagram illustrating in side view an arrangement of a compensated switchable liquid crystal retarder.

FIG. 3 is a schematic diagram illustrating in side view an illustrative arrangement of a switchable liquid crystal retarder 301 comprising a layer 314 of liquid crystal material 414 with a negative dielectric anisotropy. Substrates 312, 316 may have transparent electrodes 413, 415 arranged thereon and homeotropic surface alignment layers 409, 411 arranged on opposite sides of the switchable liquid crystal retarder 301. The homeotropic alignment layers 409, 411 may provide homeotropic alignment in the adjacent liquid crystal material 414 with a pretilt angle 407.

The orientation of the liquid crystal material 414 in the x-y plane is determined by the pretilt direction of the alignment layers so that each alignment layer has a pretilt wherein the pretilt of each alignment layer has a pretilt direction with a component 417a, 417b in the plane of the switchable liquid crystal retarder 301 that is parallel or anti-parallel or orthogonal to the electric vector transmission direction 303 of the output display polariser 218.

The pretilt 407a, 407b may for example be 88 degrees so that the component 417 is small to achieve reduction of disclinations in the relaxed (zero voltage) state of alignment of the layer 314 of liquid crystal material 414. Thus the layer 314 is provided by substantially a positive C-plate in the zero voltage arrangement. In practice the liquid crystal layer further has small O-plate characteristics provided by the homeotropic alignment layer pretilt at angle 407a and residual component 417.

The switchable liquid crystal retarder 301 comprises electrodes 413, 415 disposed adjacent to the retarder switchable liquid crystal retarder 301 and on opposite sides of the switchable liquid crystal retarder 301. The layer 314 of liquid crystal material 414 is switchable by means of a voltage being applied across the electrodes 413, 415.

In the undriven state the liquid crystal material 414 is aligned with a component 418 perpendicular to the plane of the retarder 301 and a component 417 in the plane of the retarder.

The retarder 330 is illustrated as comprising a negative passive O-plate comprising discotic birefringent material 430. The retardance of the passive compensation retarder 330 may be equal and opposite to the retardance of the switchable liquid crystal retarder 301. The switchable liquid crystal retarder 301 may comprise first and second pretilts 407a. 407b; and the passive compensation retarder 330 comprises a compensation retarder with first and second pretilts 405a, 405b, the first pretilt 405a of the compensation retarder 330 being the same as the first pretilt 407a of the liquid crystal retarder 301 and the second pretilt 405b of the compensation retarder 330 being the same as the second pretilt 307b of the liquid crystal retarder 301.

Passive O-plates may comprise for example cured reactive mesogen layers that may be discotic reactive mesogens. Pretilt of the compensation retarder may be achieved by curing reactive mesogen materials after alignment with a suitable alignment layer. O-plates may also comprise double stretched polymer films such as polycarbonate.

In operation, the switchable liquid crystal retarder 301 is switchable between two orientation states. The first state may provide display viewing by multiple viewers. The second state may be provided with a narrow angle mode for privacy operation, or reduced stray light, for example in night-time operation. As will be described further below, such elements can provide high transmission for a wide range of polar angles in wide angle mode of operation and a restricted luminance polar field of view in a privacy mode of operation.

The operation of the display of FIG. 1A in wide angle mode representing a first state will now be described.

Figure 4A:
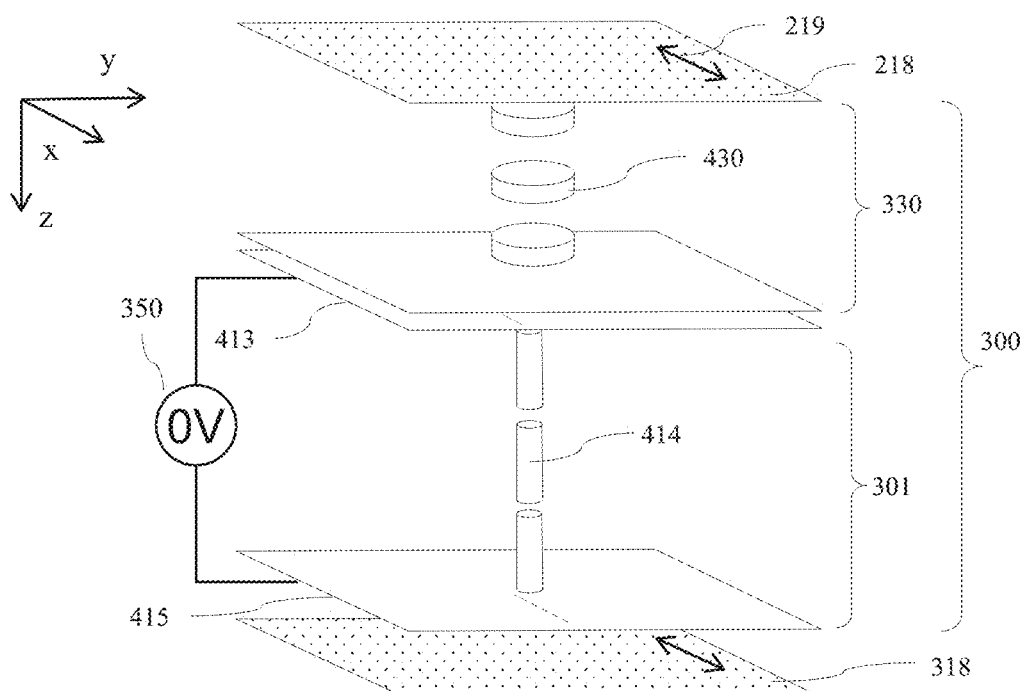
FIG. 4A is a schematic diagram illustrating in perspective side view an arrangement of a switchable compensated retarder comprising a negative C-plate in a wide angle mode of operation.

FIG. 4A is a schematic diagram illustrating in perspective side view an arrangement of the switchable compensated retarder 300 in a wide angle mode of operation. Zero volts is provided across the switchable liquid crystal retarder 301. In FIG. 4A and other schematic diagrams below, some layers of the optical stack are omitted for clarity. For example the switchable liquid crystal retarder 301 is shown omitting the substrates 312, 316.

The switchable liquid crystal retarder 301 comprises two surface alignment layers disposed adjacent to the liquid crystal material 414 on opposite sides thereof and arranged to provide homeotropic alignment at the adjacent liquid crystal material 414. As described above, the liquid crystal material 414 may be provided with a pretilt, for example 88 degrees from the horizontal to remove degeneracy of liquid crystal material 414 alignment.

The passive compensation retarder 330 comprises a negative C-plate retarder having an optical axis that is a fast axis perpendicular to the plane of the retarder. Thus the material 430 of the C-plate retarder may have a negative dielectric anisotropy. C-plates may comprise transparent birefringent materials such as: polycarbonates or reactive mesogens that are cast onto a substrate that provides homeotropic alignment for example; Zeonex™ Cyclo Olefin Polymer (COP); discotic polymers; and Nitto Denko™ double stretched polycarbonates.

Figure 4B:
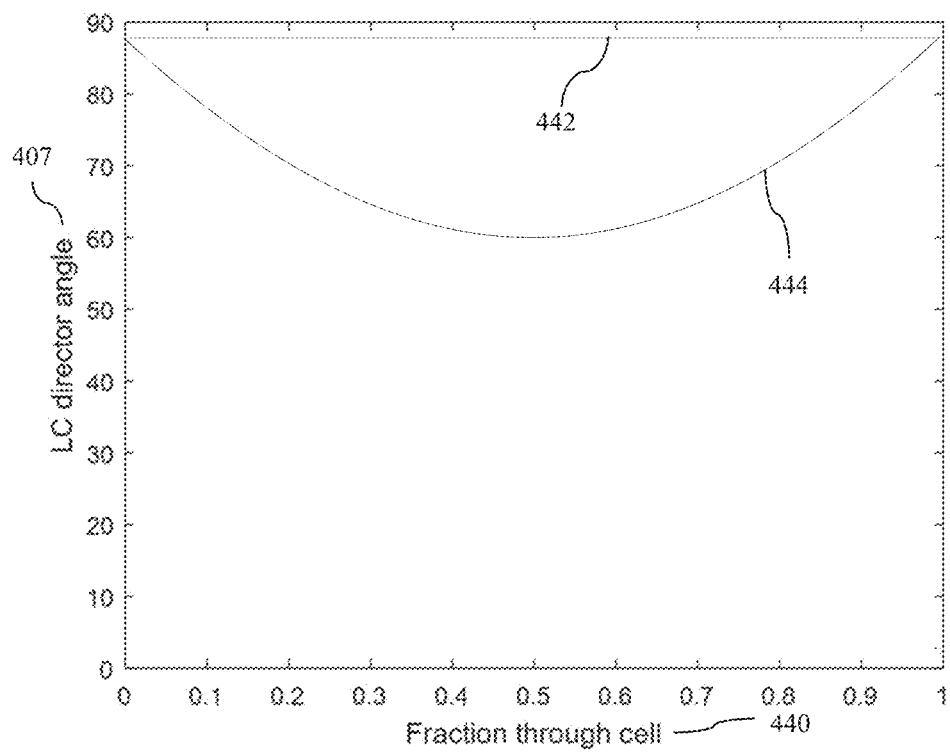
FIG. 4B is a schematic diagram illustrating a graph of liquid crystal director angle against fractional location through the switchable liquid crystal retarder cell.

FIG. 4B is a schematic diagram illustrating a graph of liquid crystal director angle 407 against fractional location 440 through the switchable liquid crystal retarder cell, where the fractional location 440 varies between 0 for a location at the surface alignment layer 409 and 1 for a location at the surface alignment layer 411.

For a vertically aligned mode with no voltage applied as illustrated in FIG. 4A, the liquid crystal directors are at a tilt 407 of 88 degrees through the thickness of the cell as indicated by tilt profile 442. The tilt profile for the layer 314 may be the same as the profile 442. The compensation retarder 330 may provide correction for the pretilt direction of the switchable liquid crystal retarder 301. The compensation retarder 330 may alternatively have a uniform tilt angle of 90 degrees, such difference from the pretilt of the liquid crystal layer providing only small difference in off-axis viewing properties.

Thus the off-axis retardance of the compensation retarder 330 is substantially equal and opposite to the off-axis retardance of the switchable liquid crystal retarder 301 when no voltage is applied.

Figure 4C:
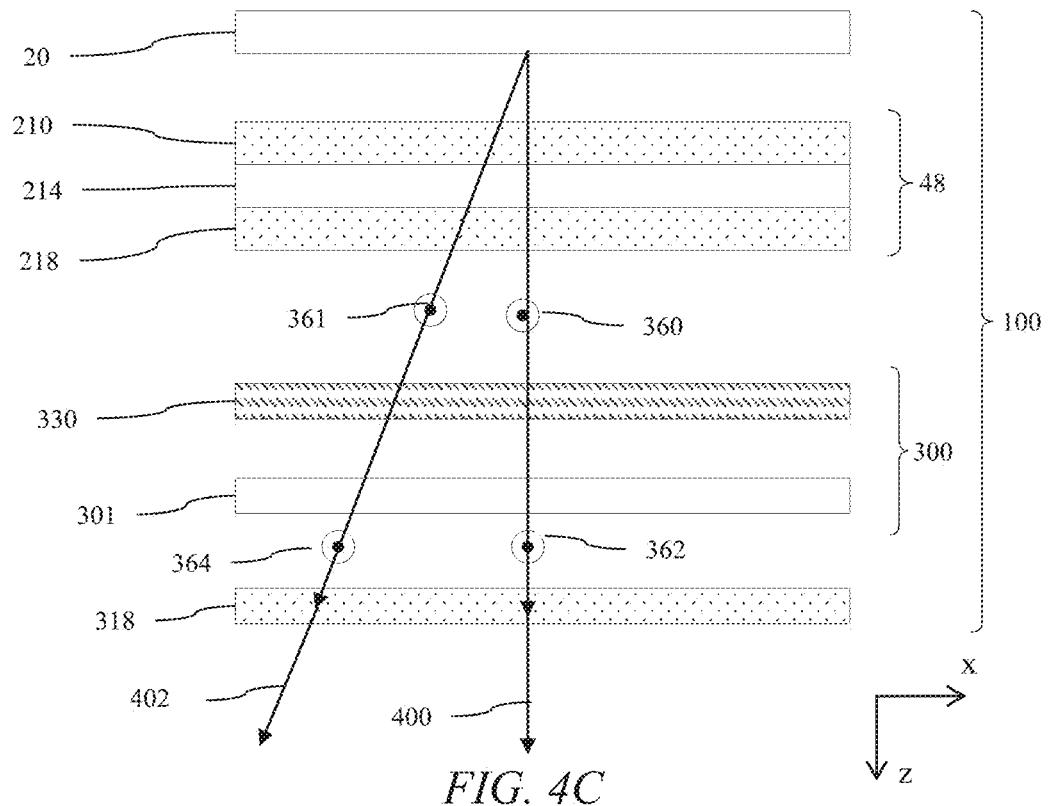
FIG. 4C is a schematic diagram illustrating in side view propagation of output light from a spatial light modulator through the optical stack of FIG. 4A in a wide angle mode of operation.
Figure 4D:
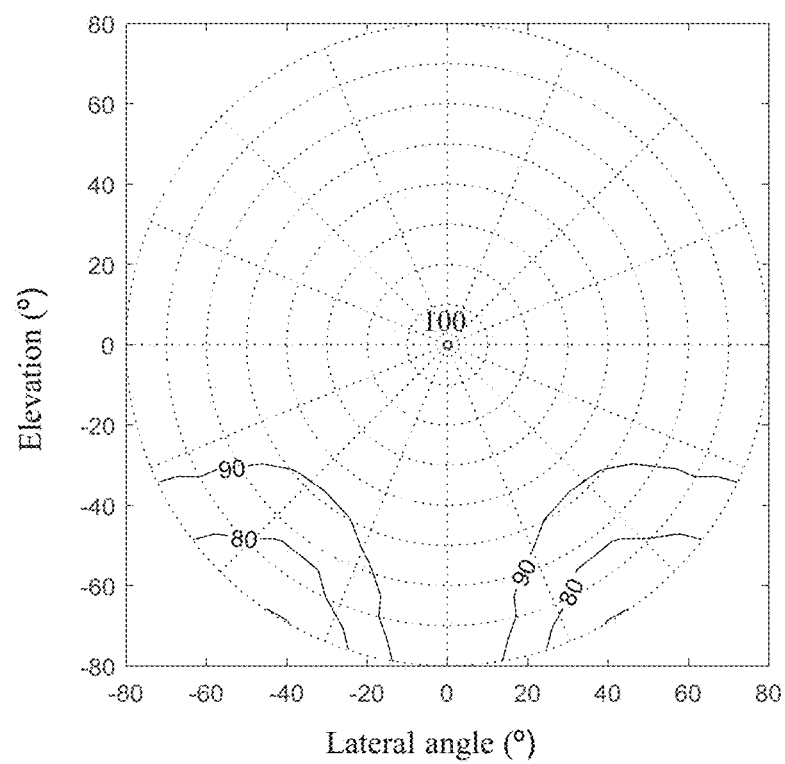
FIG. 4D is a schematic graph illustrating the variation of output transmission with polar direction for the transmitted light rays in FIG. 4C.

FIG. 4C is a schematic diagram illustrating in side view propagation of output light from the spatial light modulator 48 through the optical stack of FIG. 1A in a wide angle mode of operation, and FIG. 4D is a schematic graph illustrating the variation of output transmission with polar direction for the transmitted light rays in FIG. 4C in a wide angle mode of operation.

An ideal compensated switchable retarder 300 comprises compensation retarder 330 in combination with a variable switchable liquid crystal retarder 301 wherein the dielectric constants, anisotropy and dispersion of anisotropy of the compensation retarder 330 have the equal and opposite dielectric constants, anisotropy and dispersion of anisotropy to that of the layer 314. The retardance of the passive compensation retarder 330 is equal and opposite to the retardance of the switchable liquid crystal retarder 301.

Such an ideal compensated switchable retarder achieves compensation for transmitted light in a first wide angle state of the layer 314 of liquid crystal material 414 for all polar angles; and narrow field of view in a lateral direction in a second privacy state of the switchable liquid crystal retarder 301.

Further the optical axis of compensation retarder 330 has the same direction as that of the optical axis of the liquid crystal retarder 301 in its wide angle state. Such a compensation retarder 330 cancels out the retardance of the liquid crystal retarder for all viewing angles, and provides an ideal wide angle viewing state with no loss of luminance for all viewing directions.

The wide angle transmission polar profile for non-ideal material selections will now be described.

The illustrative embodiments of the present disclosure illustrate compensation retarders 330 that may not exactly compensate the retardation of the switchable liquid crystal retarder 301 because of small differences in material properties that are typical for the retarders 330, 301. However, advantageously such deviations are small and high performance wide and narrow angle states can be achieved with such deviations that may be close to ideal performance.

Thus when the switchable liquid crystal retarder 301 is in a first state of said two states, the switchable compensated retarder 300 provides no overall transformation of polarisation component 360, 361 to output light rays 400 passing therethrough perpendicular to the plane of the switchable retarder or at an acute angle to the perpendicular to the plane of the switchable retarder, such as for light rays 402.

Polarisation component 362 is substantially the same as polarisation component 360 and polarisation component 364 is substantially the same as polarisation component 361. Thus the angular transmission profile of FIG. 4D is substantially uniformly transmitting across a wide polar region.

In other words, when the layer of liquid crystal material 414 is in the first orientation state of said two orientation states, the plural retarders 330, 301 provide no overall retardance to light passing therethrough perpendicular to the plane of the retarders or at an acute angle to the perpendicular to the plane of the retarders 330, 301.

Advantageously the variation of display luminance with viewing angle in the first state is substantially unmodified. Multiple users may conveniently view the display from a wide range of viewing angles.

The operation of the compensated retarder 300 and additional polariser 318 in a narrow angle mode for example for use in a privacy mode of operation will now be described.

Figure 5A:
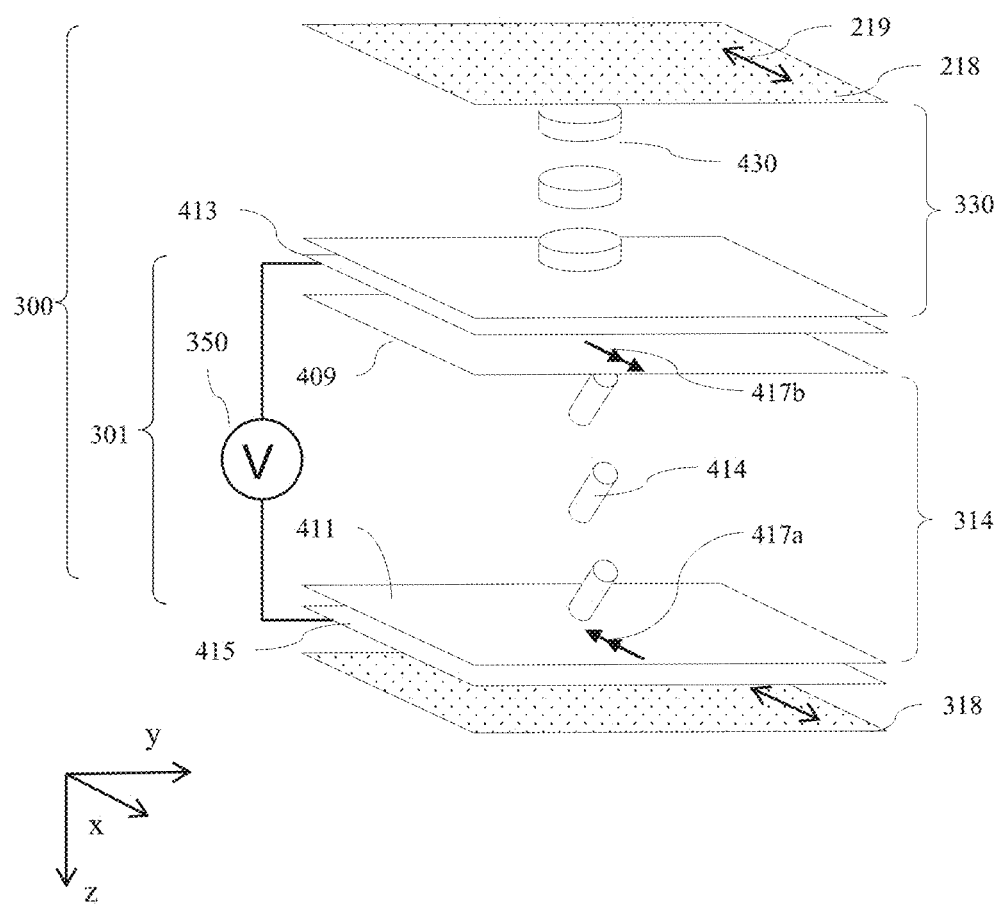
FIG. 5A is a schematic diagram illustrating in perspective side view an arrangement of a switchable compensated retarder comprising a negative C-plate in a privacy mode of operation.

FIG. 5A is a schematic diagram illustrating in perspective side view an arrangement of the switchable compensated retarder 300 in a privacy mode of operation comprising a negative C-plate passive compensation retarder 330 and homeotropically aligned switchable liquid crystal retarder 301 in a privacy mode of operation.

The liquid crystal retarder 301 further comprises transparent electrodes 413, 415 such as ITO electrodes arranged across the switchable liquid crystal retarder 301. Electrodes 413, 415 control the switchable liquid crystal retarder 301 by adjusting the voltage being applied to the electrodes 413, 415.

Control system 352 is arranged to control the voltage applied by voltage driver 350 across the electrodes 413, 415 of the switchable liquid crystal retarder 301.

Returning to FIG. 4B, when a voltage is applied the splayed tilt profile 444 of is provided for switchable liquid crystal retarder 301 such that the retardance of the layer 314 of liquid crystal material 414 is modified.

The direction of optimum privacy performance may be adjusted in response to observer position by control of the drive voltage. In another use or to provide controlled luminance to off-axis observers for example in an automotive environment when a passenger or driver may wish some visibility of the displayed image, without full obscuration, by means of intermediate voltage levels.

Figure 5B:
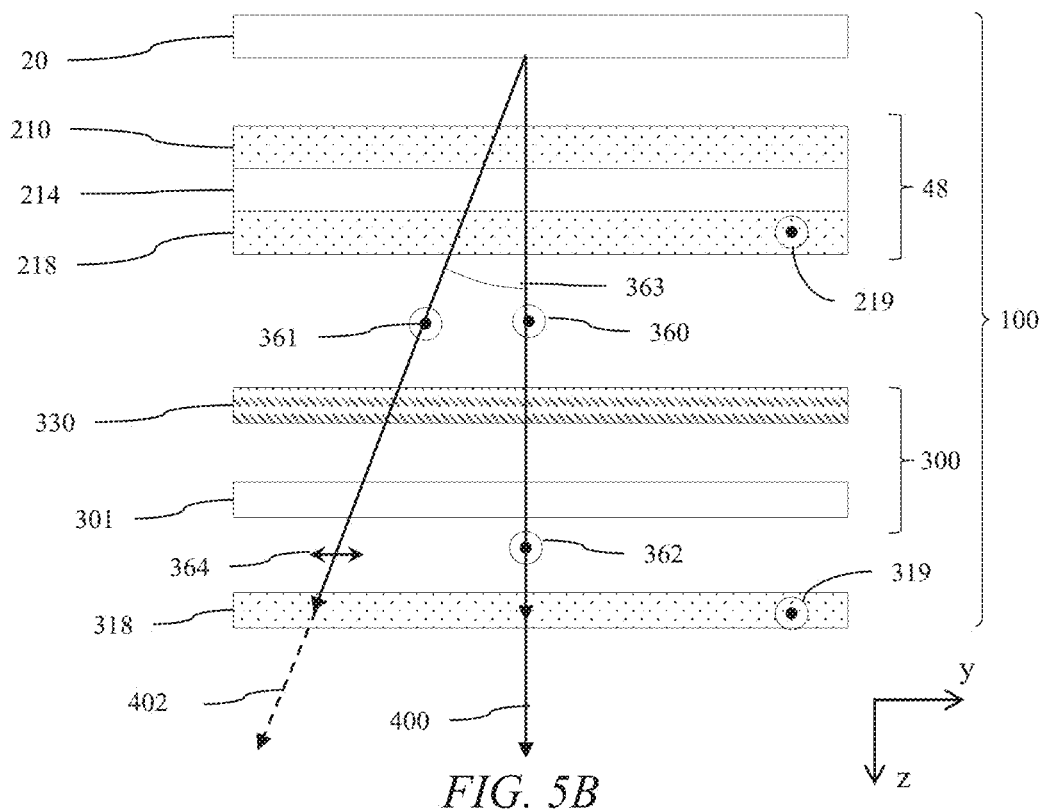
FIG. 5B is a schematic diagram illustrating in side view propagation of output light from a spatial light modulator through the optical stack of FIG. 5A in a privacy mode of operation.

FIG. 5B is a schematic diagram illustrating in side view propagation of output light from the spatial light modulator 48 through the optical stack of FIG. 1A in a privacy mode of operation wherein the switchable liquid crystal retarder 301 is oriented by means of an applied voltage.

In the present embodiments, the compensated switchable liquid crystal retarder 330 may be configured, in combination with the display polariser 210, 218, 316 and the additional polariser 318, to have the effect that the luminance of light output from the display device at an acute angle to the optical axis (off-axis) is reduced, i.e. compared to the retarder not being present. The compensated switchable liquid crystal retarder 330 may also be configured, in combination with the display polariser 210, 218, 316 and the additional polariser 318, to have the effect that the luminance of light output from the display device along the optical axis (on-axis) is not reduced, i.e. compared to the retarder not being present.

Polarisation component 360 from the output display polariser 218 is transmitted by output display polariser 218 and incident on switchable compensated retarder 300. On-axis light has a polarisation component 362 that is unmodified from component 360 while off-axis light has a polarisation component 364 that is transformed by retarders of switchable compensated retarder 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

Thus when the retarder switchable liquid crystal retarder 301 is in the second orientation state of said two orientation states, the plural retarders 301, 330 provide no overall retardance to light passing therethrough along an axis perpendicular to the plane of the retarders, but provides a non-zero overall retardance to light passing therethrough for some polar angles 363 that are at an acute angle to the perpendicular to the plane of the retarders 301, 330.

In other words when the switchable liquid crystal retarder 301 is in a second state of said two states, the switchable compensated retarder 330 provides no overall transformation of polarisation component 360 to output light rays 400 passing therethrough along an axis perpendicular to the plane of the switchable retarder 301, but provides an overall transformation of polarisation component 361 to light rays 402 passing therethrough for some polar angles which are at an acute angle to the perpendicular to the plane of the retarders 301, 330.

An illustrative material system will be described for narrow angle operation.

Figure 5C:
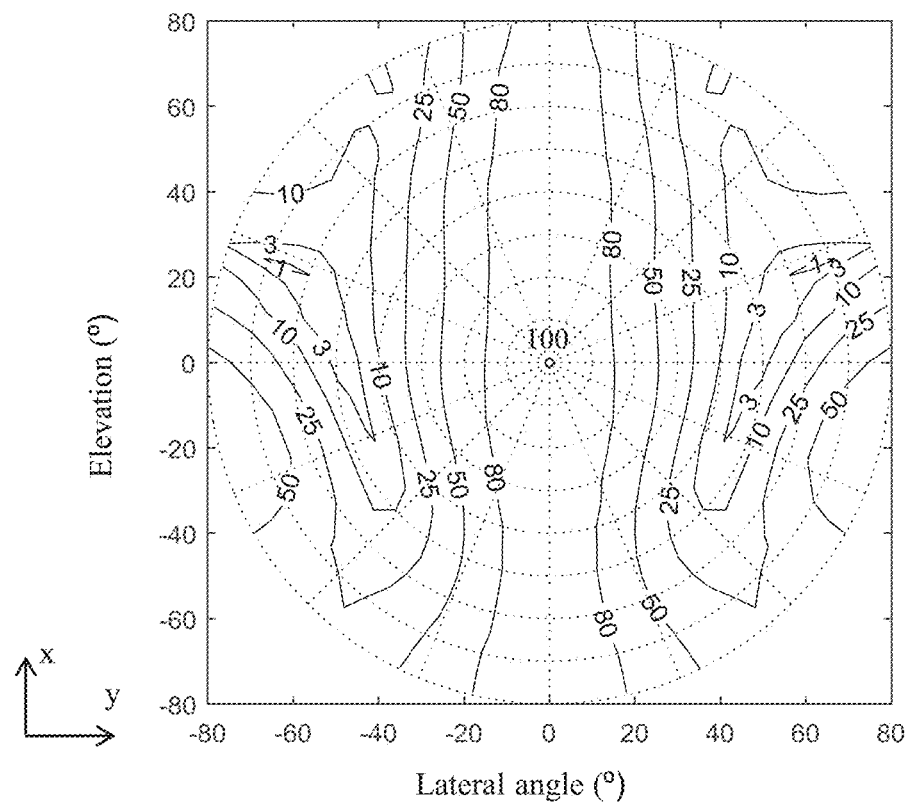
FIG. 5C is a schematic graph illustrating the variation of output transmission with polar direction for the transmitted light rays in FIG. 5B.

FIG. 5C is a schematic graph illustrating the variation of output transmission with polar direction for the transmitted light rays in FIG. 5B, with the parameters described in TABLE 1.

TABLE 1

| FIG. | Mode | Passive compensation retarder(s) | | Active LC retarder | | | |
|---|---|---|---|---|---|---|---|
| | | Type | Δn.d/ nm | Alignment layers | Pretilt/ deg | Δn.d/ nm | Δε | Voltage/ V |
| 4A & 4D | Wide | Negative C | −700 | Homeotropic | 88 | 810 | −4.3 | 0 |
| 5A & 5C | Privacy | | | Homeotropic | 88 | | | 2.2 |

In the present embodiments, desirable ranges for retardations and voltages have been established by means of simulation of retarder stacks and experiment with display optical stacks.

The switchable liquid crystal retarder 300 comprises a first surface alignment layer 409 disposed on a first side of the layer of liquid crystal material 414, and a second surface alignment layer 411 disposed on the second side of the layer of liquid crystal material 414 opposite the first side; wherein the first surface alignment layer 409 is a homeotropic alignment layer and the second surface alignment layer 411 is a homeotropic alignment layer, wherein the layer of liquid crystal material has an retardance for light of a wavelength of 550 nm between 500 nm and 1000 nm, preferably between 600 nm and 900 nm and most preferably between 700 nm and 850 nm.

When the passive compensation retarder 330 comprises a retarder having an optical axis perpendicular to the plane of the retarder, the passive retarder has a retardance for light of a wavelength of 550 nm between −300 nm and −900 nm, preferably between −450 nm and −800 nm and most preferably between −500 nm and −725 nm.

The polar distribution of light transmission illustrated in FIG. 5C modifies the polar distribution of luminance output from the underlying spatial light modulator 48 and where applicable the backlight 20.

Advantageously, a privacy display is provided that has low luminance to an off-axis snooper while maintaining high luminance for an on-axis observer. A large polar region is provided over which the luminance of the display to an off-axis snooper is reduced. Further the on-axis luminance is substantially unaffected for the primary display user in privacy mode of operation.

The voltage applied across the electrodes is zero for the first orientation state and non-zero for the second orientation state. Advantageously the wide mode of operation may have no additional power consumption, and the failure mode for driving of the switchable liquid crystal retarder 301 is for wide angle mode.

The operation of the privacy mode of the display of FIG. 1A will now be described further.

Figure 6A:
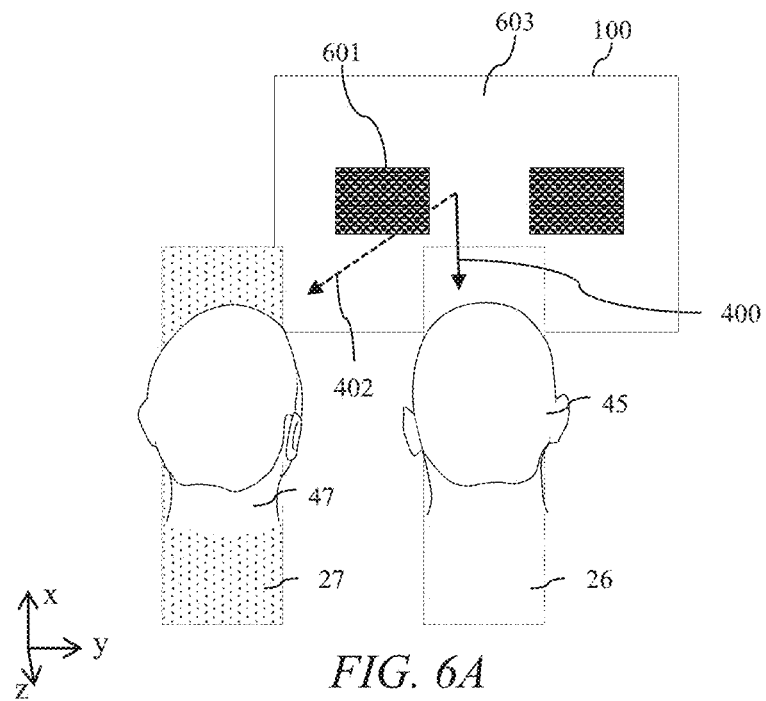
FIG. 6A is a schematic diagram illustrating in front perspective view observation of transmitted output light for a display operating in privacy mode.

FIG. 6A is a schematic diagram illustrating in front perspective view observation of transmitted output light for a display operating in privacy mode. Display device 100 may be provided with white regions 603 and black regions 601. A snooper may observe an image on the display if luminance difference between the observed regions 601, 603 can be perceived. In operation, primary user 45 observes a full luminance images by rays 400 to viewing locations 26 that may be optical windows of a directional display. Snooper 47 observes reduced luminance rays 402 in viewing locations 27 that may be optical windows of a directional display. Regions 26, 27 further represent on-axis and off-axis regions of FIG. 5C.

Figure 6B:
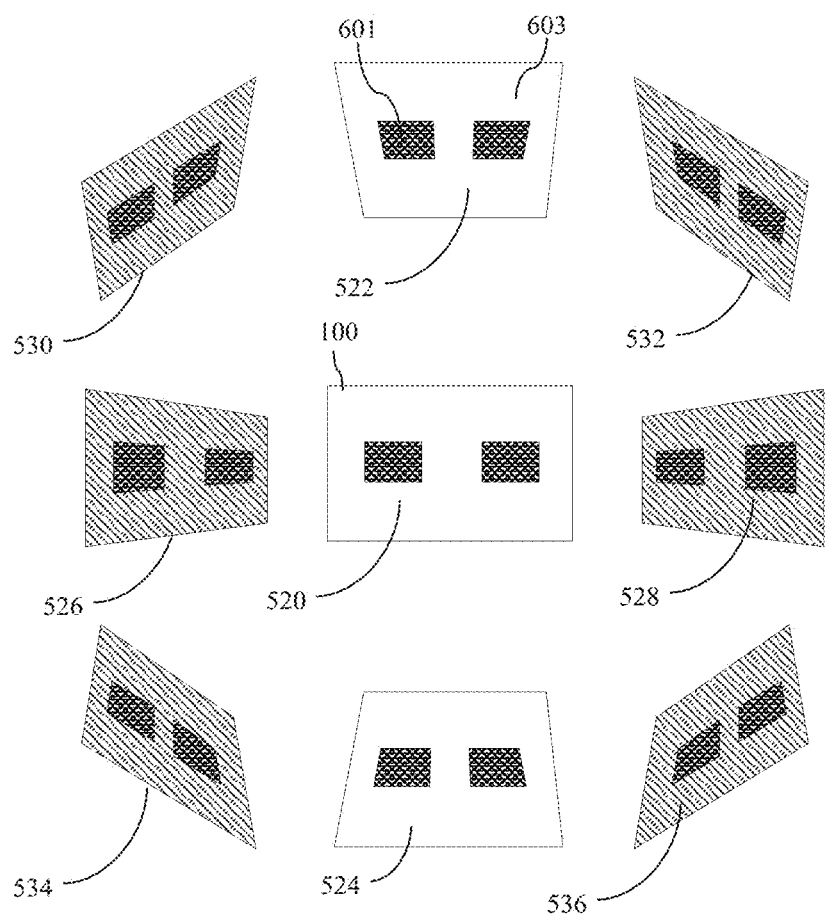
FIG. 6B is a schematic diagram illustrating in front perspective views the appearance of the display of FIGS. 1A-1C operating in privacy mode.

FIG. 6B is a schematic diagram illustrating in front perspective views the appearance of the display of FIG. 1A operating in privacy mode 1 with luminance variations as illustrated in FIG. 5C. Thus upper viewing quadrants 530, 532, lower viewing quadrants 534, 536 and lateral viewing positions 526, 528 provide reduced luminance, whereas up/down central viewing regions 522, 520 and head-on viewing provides much higher luminance.

It may be desirable to provide controllable display illumination in an automotive vehicle.

Figure 6C:
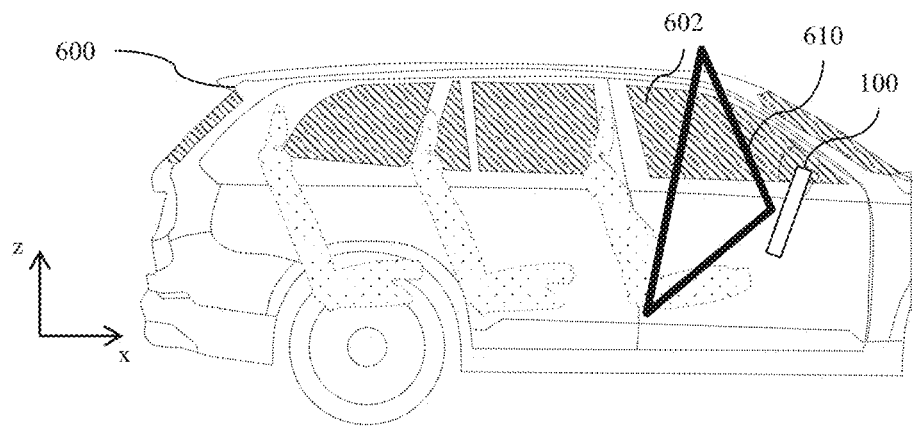
FIG. 6C is a schematic diagram illustrating in side view an automotive vehicle with a switchable directional display arranged within the vehicle cabin for both entertainment and sharing modes of operation.

FIG. 6C is a schematic diagram illustrating in side view an automotive vehicle with a switchable directional display 100 arranged within the vehicle cabin 602 of an automotive vehicle 600 for both entertainment and sharing modes of operation. Light cone 610 (for example representing the cone of light within which the luminance is greater than 50% of the peak luminance) may be provided by the luminance distribution of the display 100 in the elevation direction and is not switchable.

Figure 6D:
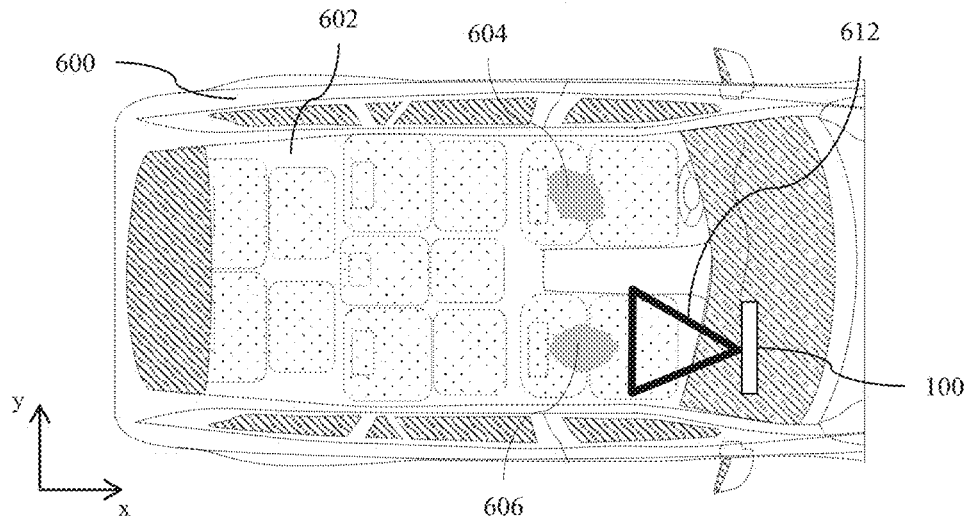
FIG. 6D is a schematic diagram illustrating in top view an automotive vehicle with a switchable directional display arranged within the vehicle cabin in an entertainment mode of operation.

FIG. 6D is a schematic diagram illustrating in top view an automotive vehicle with a switchable directional display 100 arranged within the vehicle cabin 602 in an entertainment mode of operation and operates in a similar manner to a privacy display. Light cone 612 is provided with a narrow angular range such that passenger 606 may see the display 100 whereas driver 604 may not see an image on the display 100. Advantageously entertainment images may be displayed to the passenger 606 without distraction to the driver 604.

Figure 6E:
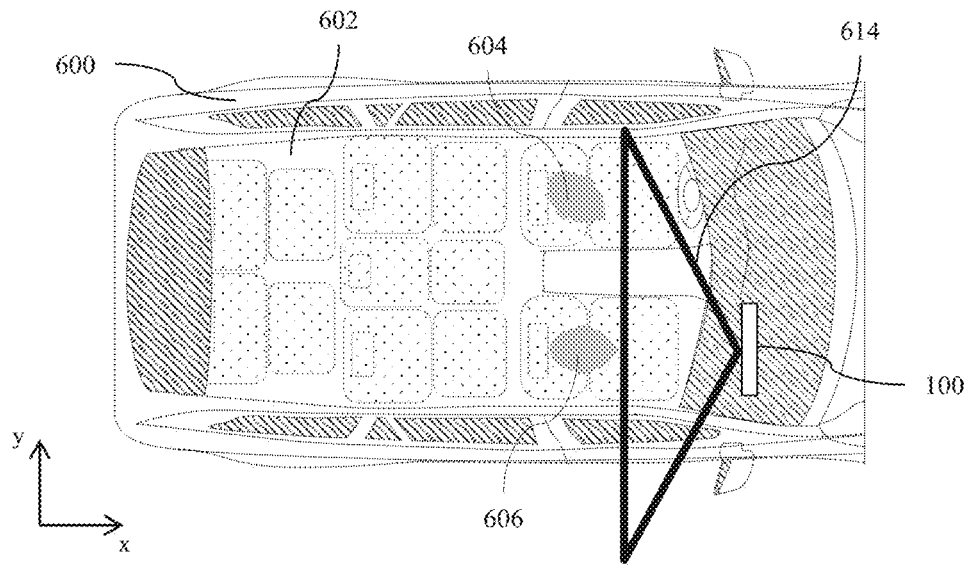
FIG. 6E is a schematic diagram illustrating in top view an automotive vehicle with a switchable directional display arranged within the vehicle cabin in a sharing mode of operation.

FIG. 6E is a schematic diagram illustrating in top view an automotive vehicle with a switchable directional display 100 arranged within the vehicle cabin 602 in a sharing mode of operation. Light cone 614 is provided with a wide angular range such that all occupants may perceive an image on the display 100, for example when the display is not in motion or when non-distracting images are provided.

Figure 6F:
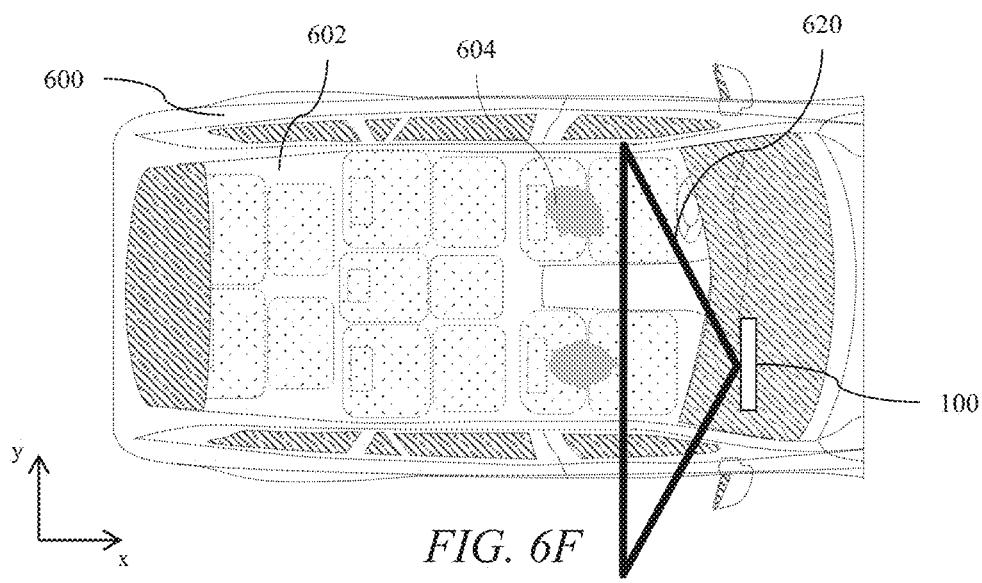
FIG. 6F is a schematic diagram illustrating in top view an automotive vehicle with a switchable directional display arranged within the vehicle cabin for both night-time and day-time modes of operation.

FIG. 6F is a schematic diagram illustrating in top view an automotive vehicle with a switchable directional display 100 arranged within the vehicle cabin 602 for both night-time and day-time modes of operation. In comparison to the arrangements of FIGS. 6C-E, the optical output is rotated so that the display elevation direction is along an axis between the driver 604 and passenger 606 locations. Light cone 620 illuminates both driver 604 and passenger 606.

Figure 6G:
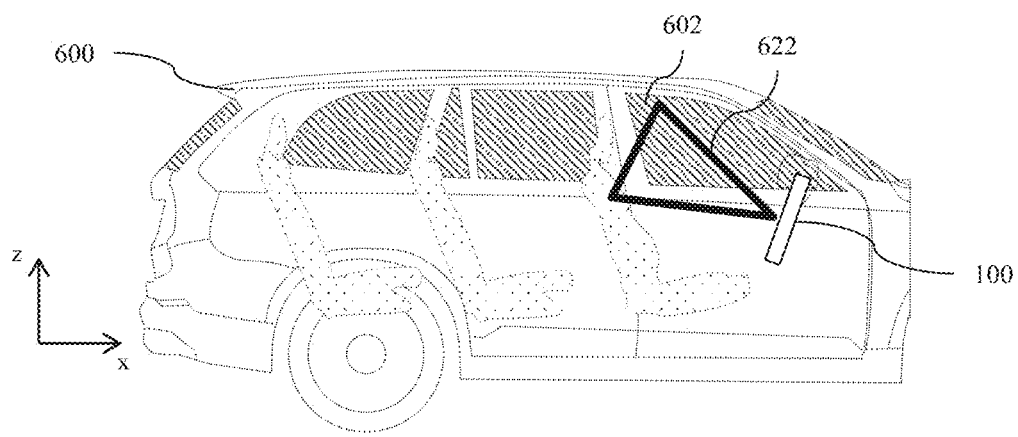
FIG. 6G is a schematic diagram illustrating in side view an automotive vehicle with a switchable directional display arranged within the vehicle cabin in a night-time mode of operation.

FIG. 6G is a schematic diagram illustrating in side view an automotive vehicle with a switchable directional display 100 arranged within the vehicle cabin 602 in a night-time mode of operation. Thus the display may provide a narrow angular output light cone 622. Stray light that illuminates internal surfaces and occupants of the vehicle cabin 602 and cause distraction to driver 604 may advantageously be substantially reduced. Both driver 604 and passenger 606 may advantageously be able to observe the displayed images.

Figure 6H:
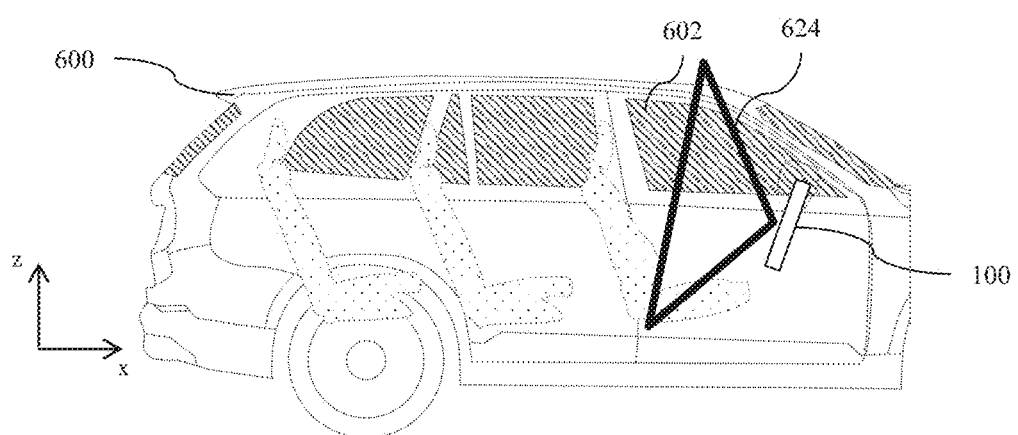
FIG. 6H is a schematic diagram illustrating in side view an automotive vehicle with a switchable directional display arranged within the vehicle cabin in a day-time mode of operation.
Figure 7A:
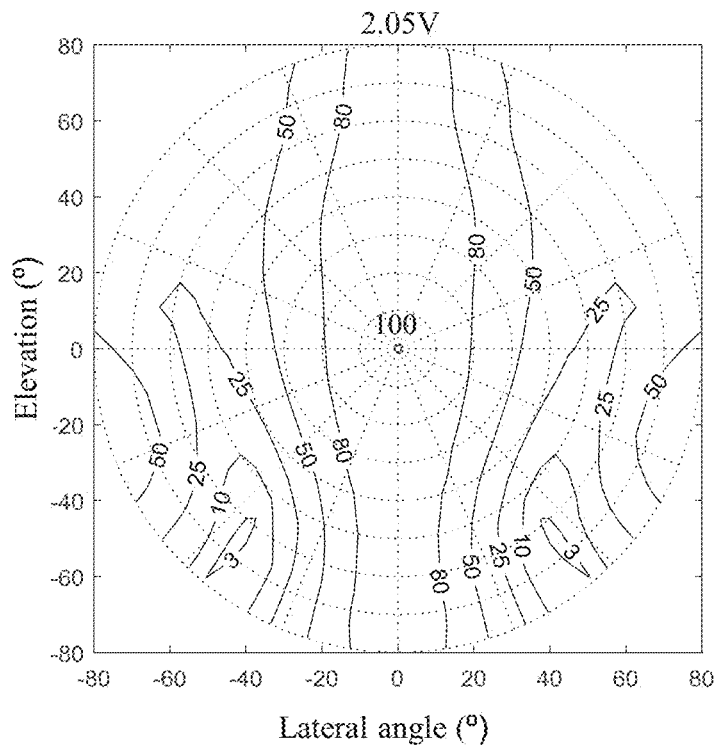
FIG. 7A, FIG. 7B, FIG. 7C, and FIG. 7D are schematic diagrams illustrating the variation of output transmission with polar direction for different drive voltages.
Figure 7B:
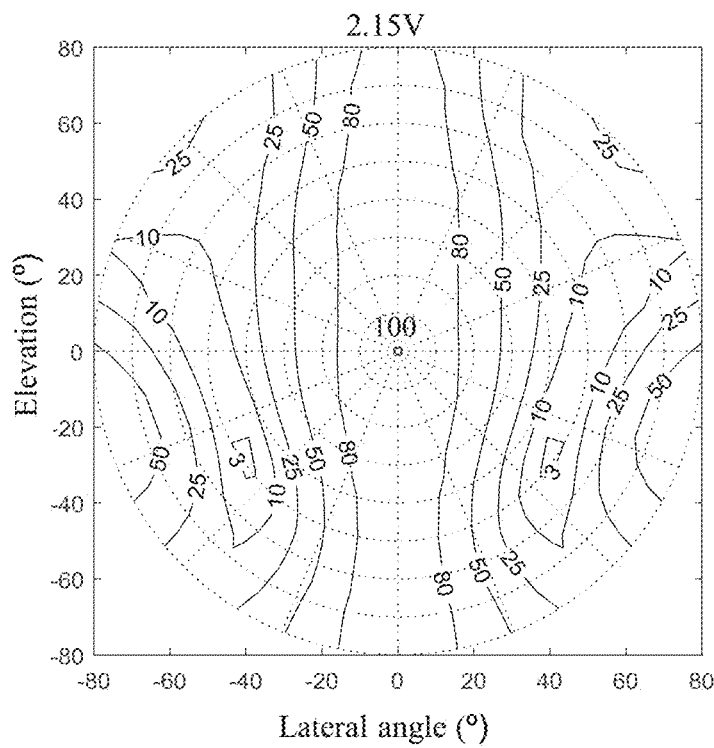
Figures 7C, 7D:
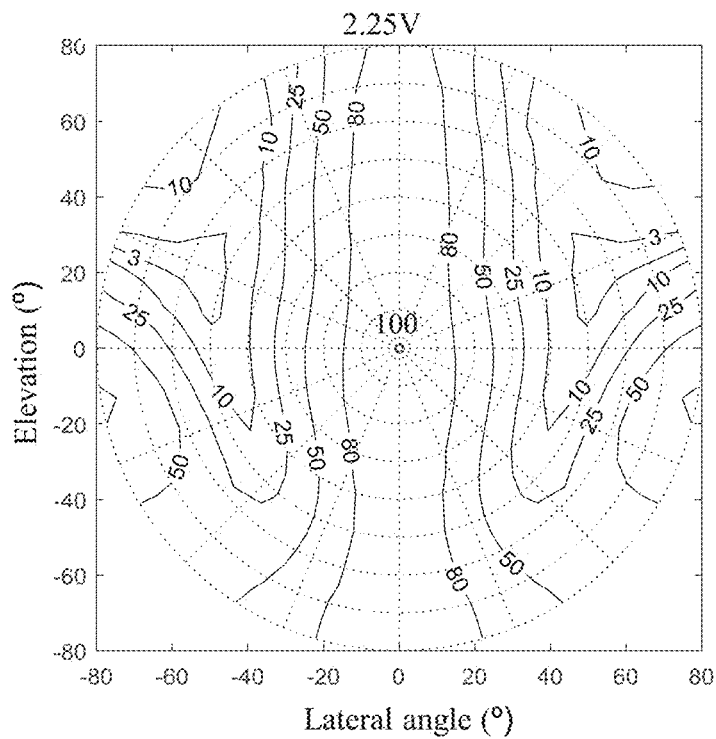

FIG. 6H is a schematic diagram illustrating in side view an automotive vehicle with a switchable directional display 100 arranged within the vehicle cabin 602 in a day-time mode of operation. Thus the display may provide a narrow angular output light cone 624. Advantageously the display may be conveniently observed by all cabin 602 occupants.

The displays 100 of FIGS. 6C-H may be arranged at other vehicle cabin locations such as driver instrument displays, center console displays and seat-back displays.

FIGS. 7A-D are schematic diagrams illustrating the variation of output transmission with polar direction for four different drive voltages from 2.05V to 2.35V in 0.1V increments. Thus the applied voltage may provide control of the luminance field-of-view minima locations in the privacy mode of operation. Further the luminance minima may be controlled between an elevation that is zero or less to elevations that are in the upper quadrants of the polar profile.

Figure 8:
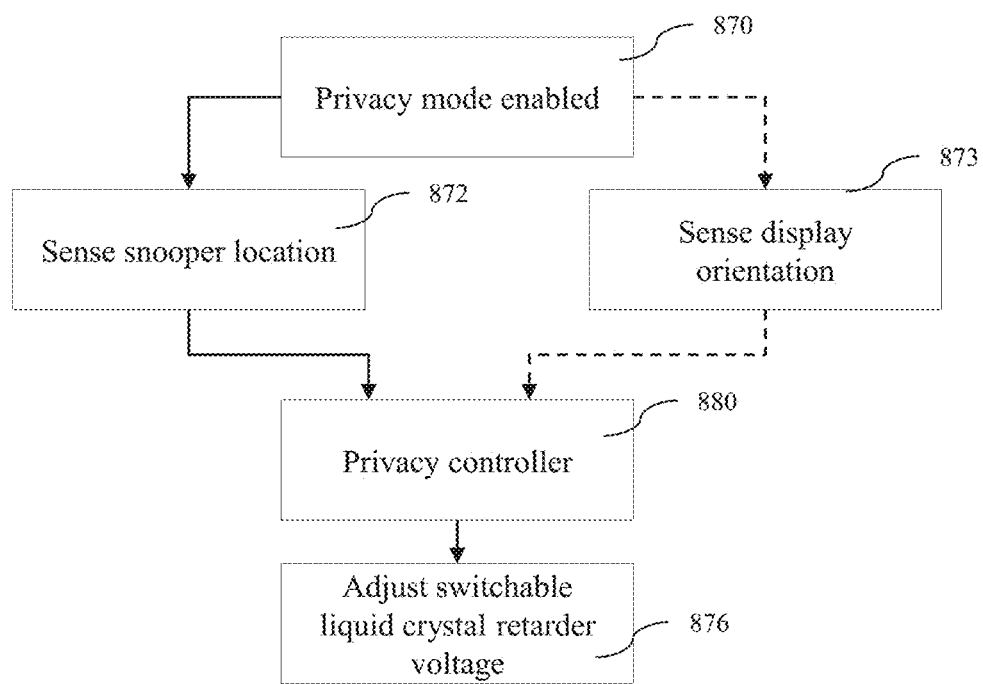
FIG. 8 is a flow chart illustrating control of a privacy display.

FIG. 8 is a flow chart illustrating control of a privacy display implemented by a control system. The control may be applied to each of the devices described herein.

In a first step 870 a user may enable a privacy mode of operation.

Where a first and further compensated switchable liquid crystal retarders 300B are provided (as for example in the device of FIG. 22A described below), the control system is arranged in the second orientation state to control the voltage applied across the electrodes 413, 415 of the first-mentioned switchable liquid crystal retarder 314A and to control the voltage applied across the electrodes of the further switchable liquid crystal retarder 314B; wherein the overall retardance to light passing through the first-mentioned switchable liquid crystal retarder 314A and first-mentioned passive compensation retarder 330A at some polar angles at an acute angle to the perpendicular to the plane of the retarders 31A, 330A is different to the overall retardance to light passing through the further switchable liquid crystal retarder 314B and further passive compensation retarder 330B at the same polar angles.

Such a privacy mode setting may be provided by manual setting (for example a keyboard operation) or by automatic sensing using sensor to locate the presence of a snooper as described for example in U.S. Patent Publ. No. 2017-0236494, which is incorporated herein by reference in its entirety. Optionally the display orientation with respect to the snooper may be further detected by means of detector 873.

In a second step 872 the snooper location may be detected for example by means of a camera or by a keyboard setting or other method. In an illustrative example, an OFFICE setting may be provided wherein it may be desirable to optimise privacy performance for snoopers that are moving around a shared office environment and thus optimise performance for look-down viewing quadrants. By way of comparison in a FLIGHT setting, it may be desirable to provide privacy level optimisation for sitting snoopers, with improved privacy level for lower elevations than desirable for OFFICE setting.

In a third step 876 the voltage applied to the switchable liquid crystal retarder 301 may be adjusted and in a fourth step 878 the LED profile may be adjusted with the control system.

Thus the control system may further comprise a means 872 to determine the location of a snooper 47 with respect to the display device 100 and the control system is arranged to adjust the voltage applied by drive 350 across the electrodes 413, 415 of the switchable liquid crystal retarder 314 in response to the measured location of the snooper 47.

Advantageously the privacy operation of the display may be controlled to optimise for snooper viewing geometry.

Returning to the discussion of the present embodiments, further arrangements of compensated switchable retarders 300 will now be described.

Figure 9A:
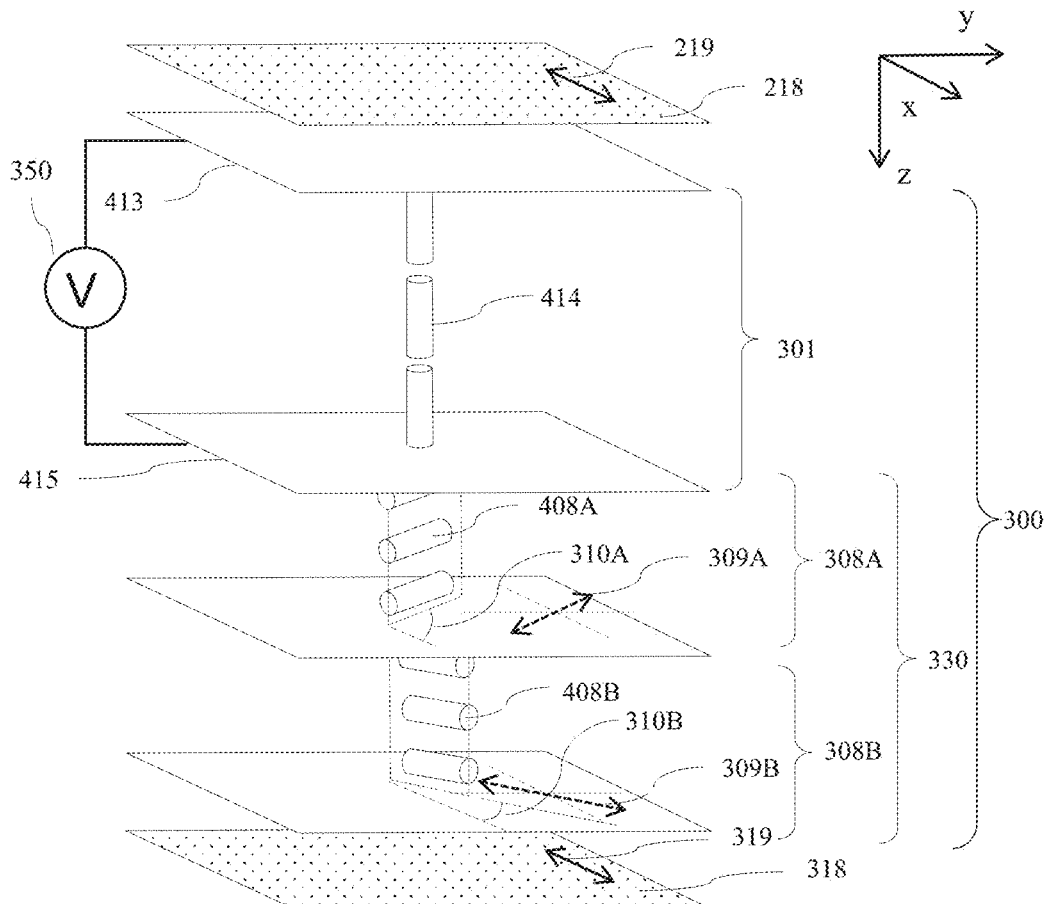
FIG. 9A is a schematic diagram illustrating in perspective side view an arrangement of a switchable compensated retarder in a wide angle mode of operation comprising crossed A-plate passive compensation retarders and homeotropically aligned switchable liquid crystal retarder.
Figure 9B:
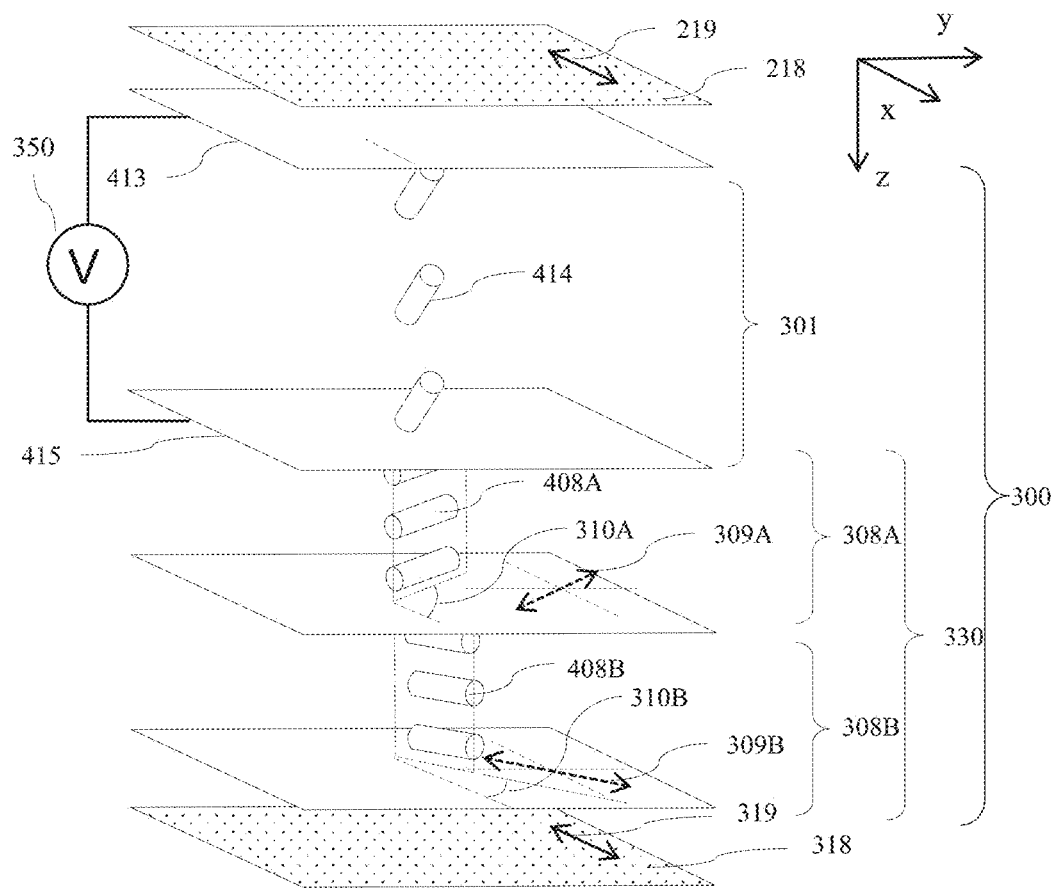
FIG. 9B is a schematic diagram illustrating in perspective side view an arrangement of a switchable compensated retarder in a privacy mode of operation comprising crossed A-plate passive compensation retarders and homeotropically aligned switchable liquid crystal retarder.

FIG. 9A is a schematic diagram illustrating in perspective side view an arrangement of a switchable retarder in a privacy mode of operation comprising crossed A-plate passive compensation retarders 308A, 308B and homeotropically aligned switchable liquid crystal retarder 301; and FIG. 9B is a schematic diagram illustrating in perspective side view an arrangement of a switchable compensated retarder in a privacy mode of operation comprising crossed A-plate passive compensation retarders and homeotropically aligned switchable liquid crystal retarder.

In comparison to the arrangement of FIG. 4A and FIG. 5A, the compensation retarder 330 may alternatively comprise a pair of retarders 308A, 308B which have optical axes in the plane of the retarders that are crossed. The compensation retarder 330 thus comprises a pair of retarders 308A, 308B that each comprise a single A-plate.

The pair of retarders 308A, 308B each comprise plural A-plates having respective optical axes 309A, 309B aligned at different angles with respect to each other. The pair of retarders have optical axes 309A, 309B that each extend at 45° with respect to an electric vector transmission direction that is parallel to the electric vector transmission direction 211 of the input display polariser 210 in the case that the additional polariser 318 is arranged on the input side of the input display polariser or is parallel to the electric vector transmission direction 219 of the output display polariser 218 in the case that the additional polariser 318 is arranged on the output side of the input display polariser 218.

Figure 9C:
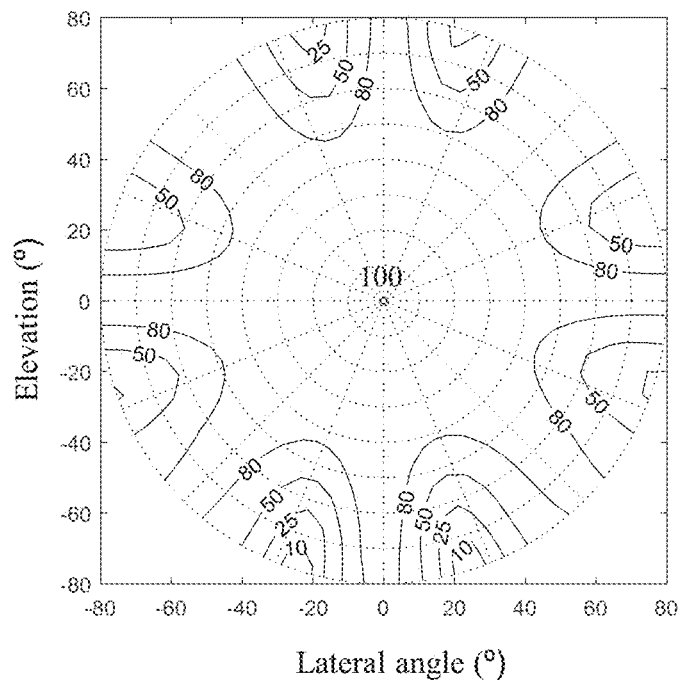
FIG. 9C is a schematic graph illustrating the variation of output transmission with polar direction for transmitted light rays in FIG. 9A in a wide angle mode of operation.
Figure 9D:
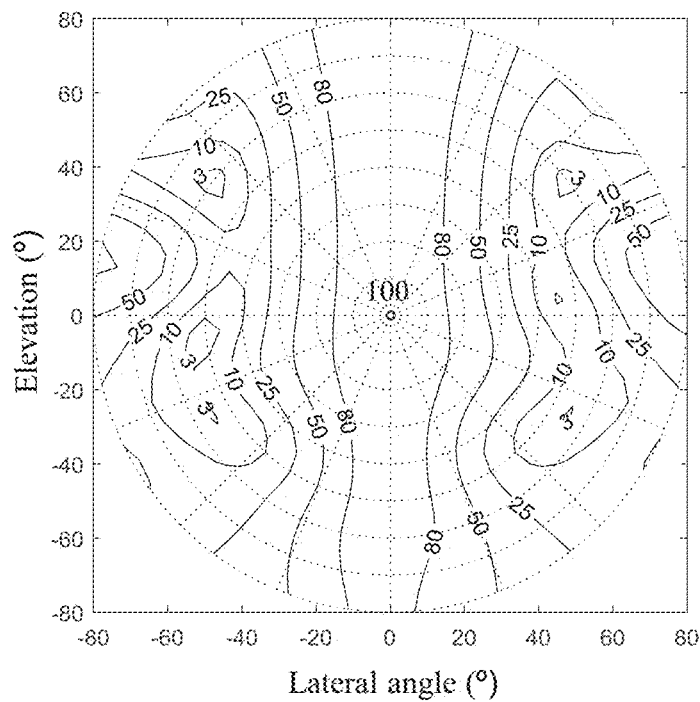
FIG. 9D is a schematic graph illustrating the variation of output transmission with polar direction for transmitted light rays in FIG. 9B in a privacy mode of operation.

FIG. 9C is a schematic graph illustrating the variation of output transmission with polar direction for transmitted light rays in FIG. 9A in a wide angle mode of operation; and FIG. 9D is a schematic graph illustrating the variation of output transmission with polar direction for transmitted light rays in FIG. 9B in a privacy mode of operation provided by the illustrative embodiment of TABLE 2.

Advantageously A-plates may be more conveniently manufactured at lower cost than for the C-plate retarder of FIG. 4A and FIG. 5A. Further a zero voltage state may be provided for the wide angle mode of operation, minimising power consumption during wide angle operation.

In the present embodiments, 'crossed' refers to an angle of substantially 90° between the optical axes of the two retarders in the plane of the retarders. To reduce cost of retarder materials, it is desirable to provide materials with some variation of retarder orientation due to stretching errors during film manufacture for example. Variations in retarder orientation away from preferable directions can reduce the head-on luminance and increase the minimum transmission. Preferably the angle 310A is at least 35° and at most 550, more preferably at least 40° and at most 50° and most preferably at least 42.5° and at most 47.5°. Preferably the angle 310B is at least 125° and at most 1450, more preferably at least 130° and at most 135° and most preferably at least 132.50 and at most 137.5°.

During mechanical distortion, such as when touching the display, the homeotropically aligned liquid crystal retarders 301 of FIGS. 9A-9B may have undesirably long recovery times creating visible misalignment artefacts. It would be desirable to provide fast recovery times after mechanical distortion.

Figure 10A:
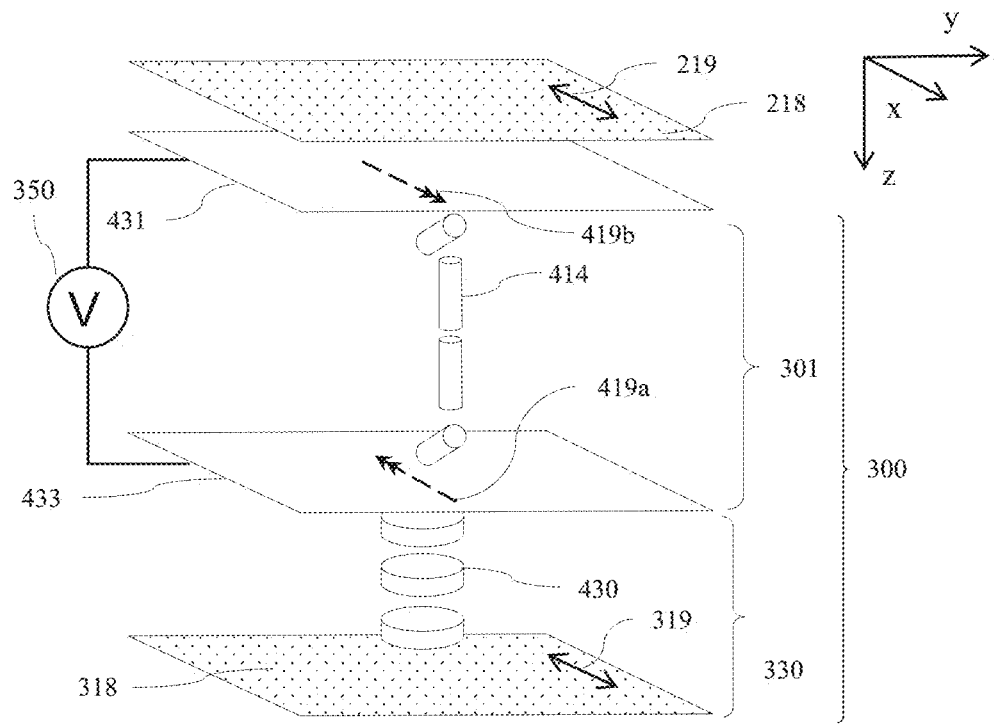
FIG. 10A and FIG. 10B are schematic diagrams illustrating in perspective side view an arrangement of a switchable compensated retarder in a wide angle mode and a privacy mode of operation respectively comprising a homogeneously aligned switchable liquid crystal retarder and a passive negative C-plate retarder.
Figure 10B:
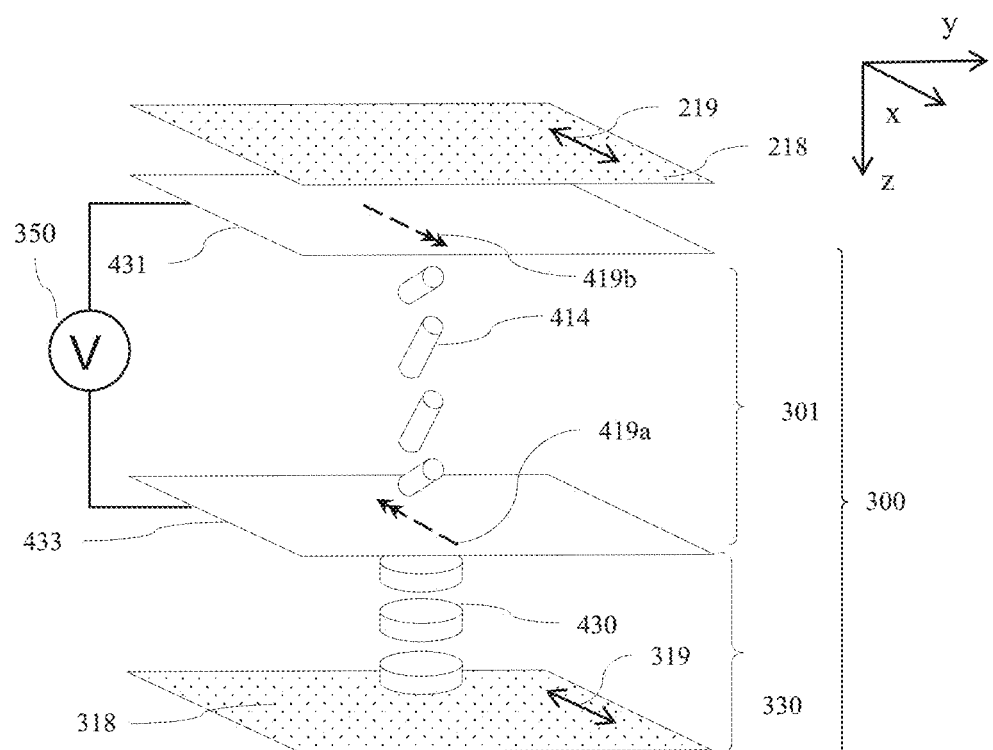

FIGS. 10A-10B are schematic diagrams illustrating in perspective side view an arrangement of a switchable retarder in a wide angle and privacy mode of operation respectively comprising a homogeneously aligned switchable liquid crystal retarder comprising liquid crystal material 414 with a positive dielectric anisotropy and a passive negative C-plate retarder 330 for first and second drive voltages respectively.

The switchable liquid crystal retarder further comprises surface alignment layers 431, 433 disposed adjacent to the layer of liquid crystal material 414 and each arranged to provide homogeneous alignment in the adjacent liquid crystal material. In other words, the switchable liquid crystal retarder comprises two surface alignment layers 431, 433 disposed adjacent to the layer of liquid crystal material 414 and on opposite sides thereof and each arranged to provide homogeneous alignment in the adjacent liquid crystal material 414.

Figure 10C:
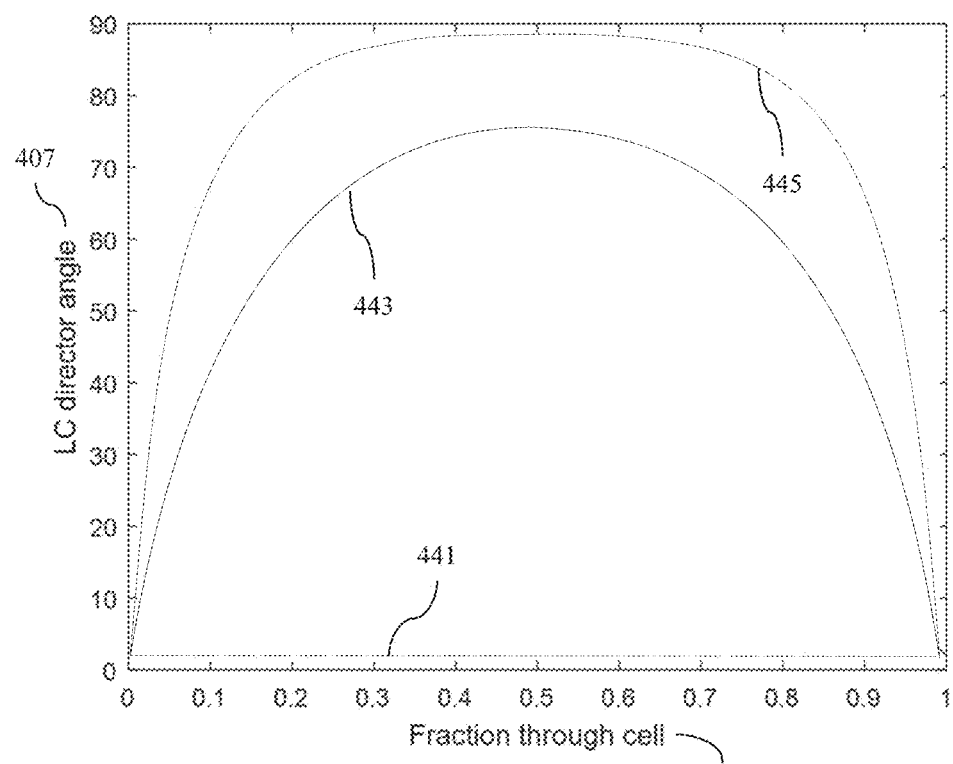
FIG. 10C is a schematic diagram illustrating a graph of liquid crystal director angle against fractional location through the switchable liquid crystal retarder cell of FIG. 10A for different applied voltages.

FIG. 10C is a schematic diagram illustrating a graph of liquid crystal director angle 407 against fractional location 440 through the switchable liquid crystal retarder 301 of FIG. 10A for various different applied voltages. FIG. 10C differs from FIG. 4B wherein the pretilt angle is small and

TABLE 2

| FIG. | Mode | Passive compensation retarder(s) | | Active LC retarder | | | | |
| | | Type | Δn.d/ nm | Alignment layers | Pretilt/ deg | Δn.d/ nm | Δε | Voltage/ V |
| --- | --- | --- | --- | --- | --- | --- | --- | --- |
| 9A & 9C | Wide | Crossed A | +650 @ 45° | Homeotropic | 88 | 810 | −4.3 | 0 |
| 9B & 9D | Privacy | | +650@ 135° | Homeotropic | 88 | | | 2.3 |

When the passive compensation retarder 330 comprises a pair of retarders which have optical axes in the plane of the retarders that are crossed, each retarder of the pair of retarders has a retardance for light of a wavelength of 550 nm between 300 nm and 800 nm, preferably between 500 nm and 700 nm and most preferably between 550 nm and 675 nm.

increases with applied voltage. Profile 441 illustrates liquid crystal material 414 tilt angle for 0V applied voltage, tilt profile 443 illustrates director orientations for 2.5V and tilt profile 445 illustrates director orientations for 5V. Thus the liquid crystal layers are typically splayed in desirable switched states, and compensated by the compensation retarders 330. Increasing the voltage above 2.5V to 10V progressively reduces the thickness of the retarder 301 in which splay is present, and advantageously increases the polar field of view over which the transmission is maximised.

Resolved component 419a, 419b of liquid crystal tilt compared to the direction perpendicular to the plane of the retarder is substantially higher than components 417a, 417b of FIG. 5A.

The increased magnitude of resolved component 419a, 419b may provide increased restoring force after mechanical distortion in comparison to the arrangement of FIG. 9A for example. Sensitivity to mechanical distortions such as during touching the display may advantageously be reduced.

The voltage of operation may be reduced below 10V for acceptable wide angle field of view, reducing power consumption; and reducing cost and complexity of electrical driving.

Figures 11A, 11B:
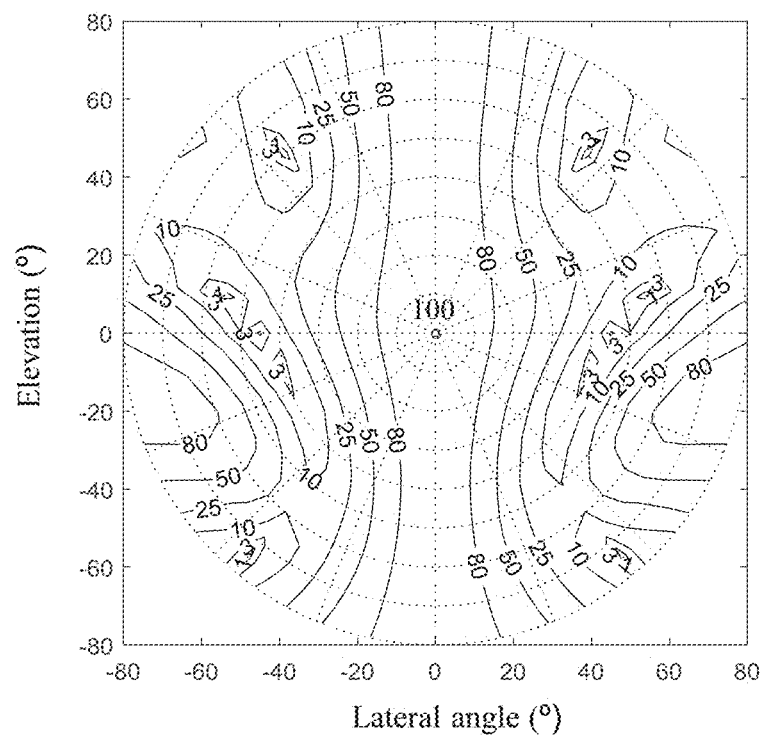
FIG. 11A, FIG. 11B, and FIG. 11C are schematic graphs illustrating the variation of output transmission with polar direction for transmitted light rays of switchable compensated retarder comprising a homogeneously aligned liquid crystal cell and a negative C-plate in a privacy mode and for two different wide angle mode addressing drive voltages respectively.
Figure 11C:
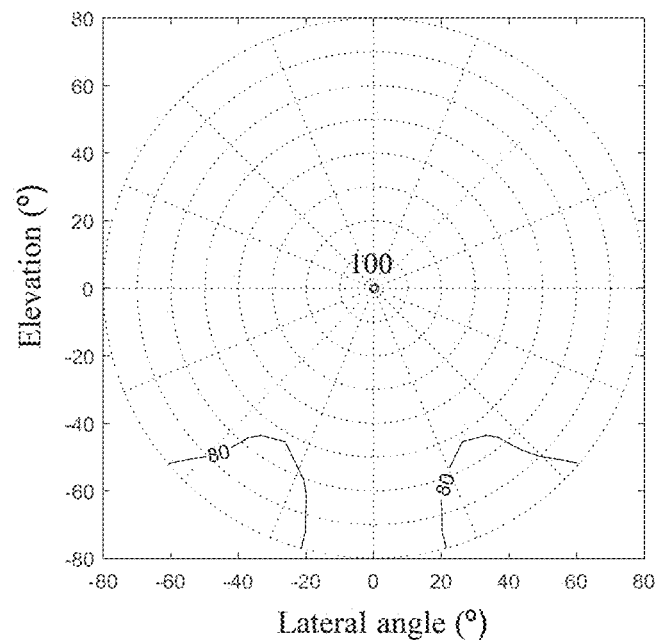

FIGS. 11A-11C are schematic graphs illustrating the variation of output transmission with polar direction for transmitted light rays of switchable compensated retarder comprising a homogeneously aligned liquid crystal retarder 301 and a passive negative C-plate compensation retarder 330, similar to the display device of FIGS. 10A and 10B, in a privacy mode and two different wide angle modes for different drive voltages comprising the embodiments illustrated in TABLE 3.

alignment layer 433 disposed on the second side of the layer of liquid crystal material 414 opposite the first side; wherein the first surface alignment layer 409 is a homogeneous alignment layer and the second surface alignment layer is a homogeneous alignment layer; wherein the layer of liquid crystal material has a retardance for light of a wavelength of 550 nm in a range from 500 nm to 1000 nm, preferably in a range from 600 nm to 850 nm and most preferably in a range from 700 nm to 800 nm. Thus when the first and second alignment layers are each homogeneous alignment layers and when the passive compensation retarder 330 comprises a retarder having an optical axis perpendicular to the plane of the retarder, the passive retarder has a retardance for light of a wavelength of 550 nm in a range from −300 nm to −700 nm, preferably in a range from −350 nm to −600 nm and most preferably −400 nm to −500 nm.

Advantageously off-axis privacy can be provided by means of luminance reduction and privacy level increase over wide polar regions. Further resistance to visual artefacts arising from flow of liquid crystal material in the layer 314 may be improved in comparison to homeotropic alignment.

Various other configurations of the optical structure and driving of FIG. 10A will now be described.

TABLE 3

| | | Passive compensation retarder(s) | | Active LC retarder | | | |
|---|---|---|---|---|---|---|---|
| FIG. | Mode | Type | Δn.d/ nm | Alignment layers | Pretilt/ deg | Δn.d/ nm | Δε | Voltage/ V |
| 11A | Privacy | Negative C | −500 | Homogeneous | 2 | 750 | +13.2 | 2.3 |
| 11B | Wide | | | Homogeneous | 2 | | | 5.0 |
| 11C | Wide | | | | | | | 10.0 |

Desirable ranges for optical retardance for active LC retarder 301 comprising homogeneous alignment layers 431, 433 on both substrates and a passive negative C-plate compensation retarder 330 are further described in TABLE 4.

TABLE 4

| Active LC layer retardance/nm | Minimum negative C-plate retardance/nm | Typical negative C-plate retardance/nm | Maximum negative C-plate retardance/nm |
|---|---|---|---|
| 600 | −300 | −400 | −500 |
| 750 | −350 | −450 | −600 |
| 900 | −400 | −500 | −700 |

The switchable liquid crystal retarder 300 thus comprises a first surface alignment layer 431 disposed on a first side of the layer of liquid crystal material 414, and a second surface Operation at 5V provides lower power consumption and lower cost electronics while achieving acceptable luminance roll-off in wide angle mode. Field of view in wide angle mode can further be extended by operation at 10V.

Figure 12A:
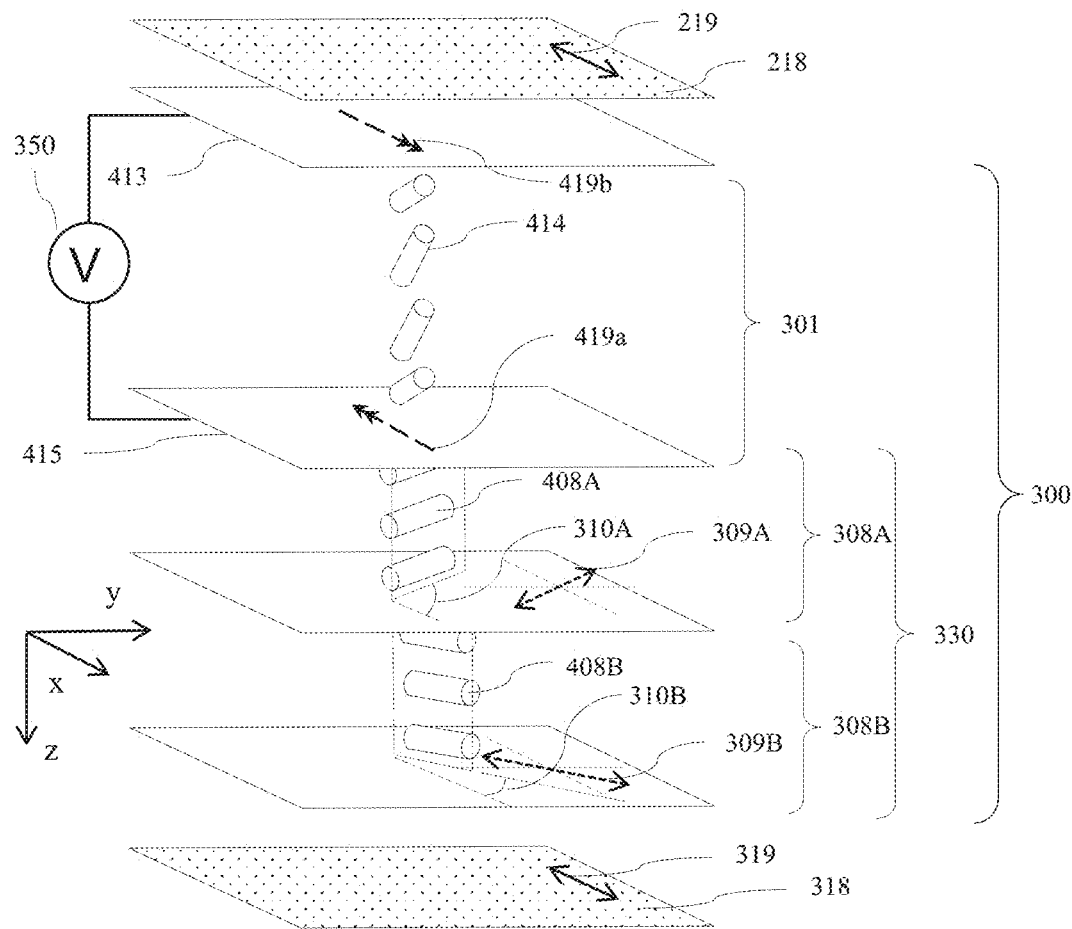
FIG. 12A is a schematic diagram illustrating in perspective side view an arrangement of a switchable compensated retarder in a privacy mode of operation comprising crossed A-plate passive compensation retarders and homogeneously aligned switchable liquid crystal retarder.
Figure 12B:
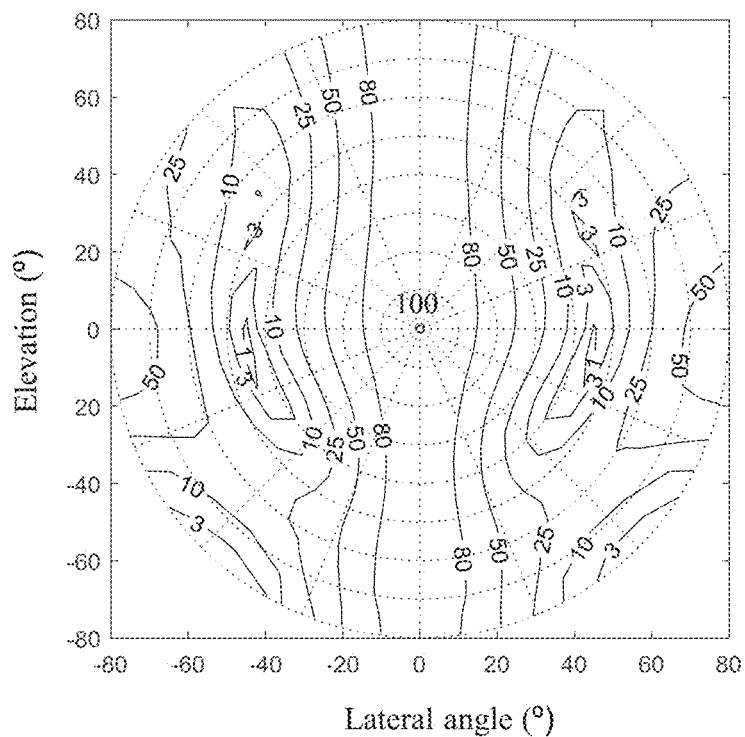
FIG. 12B, FIG. 12C, and FIG. 12D are schematic graphs illustrating the variation of output transmission with polar direction for transmitted light rays of switchable compensated retarder comprising a homogeneously aligned liquid crystal cell and crossed A-plates in a privacy mode and wide angle modes for different drive voltages.
Figure 12C:
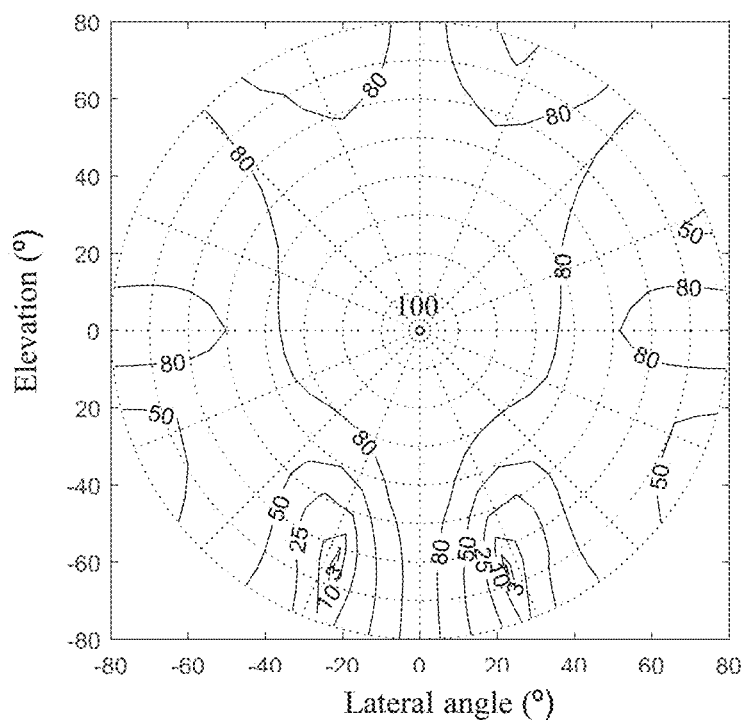
Figure 12D:
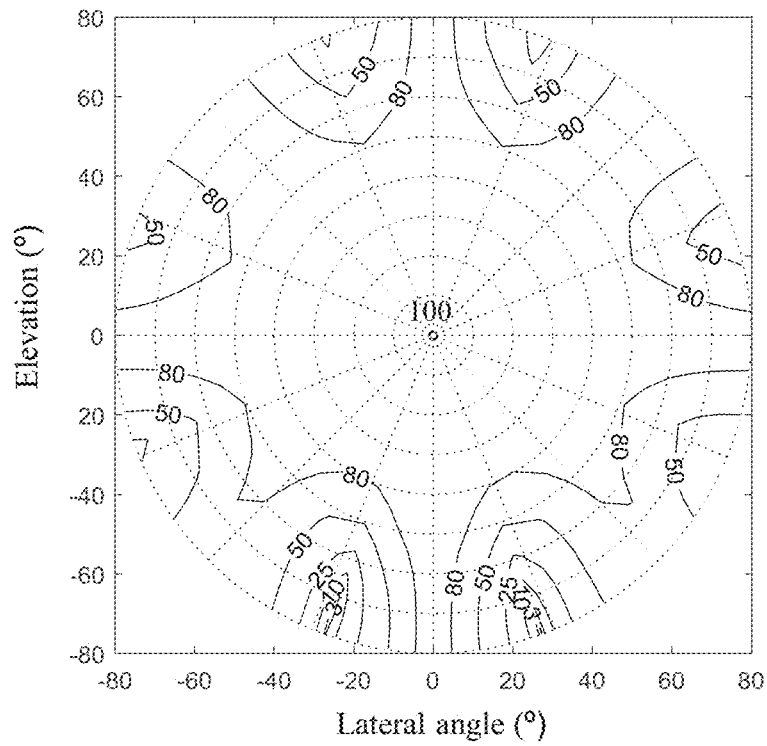

FIG. 12A is a schematic diagram illustrating in perspective side view an arrangement of a switchable compensated retarder in a privacy mode of operation, the arrangement comprising crossed A-plate passive compensation retarders 308A, 308B and homogeneously aligned switchable liquid crystal retarder 301; and FIGS. 12B-D are schematic graphs illustrating the variation of output transmission with polar direction for transmitted light rays of switchable compensated retarder 301 comprising a homogeneously aligned liquid crystal material 414 and passive crossed A-plate retarders 308A, 308B, in a privacy mode and a wide angle mode for different drive voltages comprising the respective embodiments illustrated in TABLE 5.

TABLE 5

| | | Passive compensation retarder(s) | | Active LC retarder | | | |
|---|---|---|---|---|---|---|---|
| FIG. | Mode | Type | Δn.d/ nm | Alignment layers | Pretilt/ deg | Δn.d/ nm | Δε | Voltage/ V |
| 12B | Privacy | Crossed A | +500 @ 45° | Homogeneous | 2 | 750 | +13.2 | 2.3 |
| 12C | Wide | | +500 @135° | Homogeneous | | | | 5 |
| 12D | Wide | | | | | | | 10 |

Desirable ranges for optical retardance for active LC retarder 301 comprising homogeneous alignment layers 409, 411 on both substrates and crossed positive A-plate retarders 308A, 308B are further described in TABLE 6.

TABLE 6

| Active LC layer retardance/nm | Minimum positive A-plate retardance/nm | Typical positive A-plate retardance/nm | Maximum positive A-plate retardance/nm |
|---|---|---|---|
| 600 | +300 | +400 | +600 |
| 750 | +350 | +500 | +700 |
| 900 | +400 | +600 | +800 |

Thus when: the first and second alignment layers are each homogeneous alignment layers; the layer of liquid crystal material has a retardance for light of a wavelength of 550 nm in a range from 500 nm to 1000 nm, preferably in a range from 600 nm to 850 nm and most preferably in a range from 700 nm to 800 nm; and the passive compensation retarder 330 comprises a pair of retarders which have optical axes in the plane of the retarders that are crossed, then each retarder of the pair of retarders has a retardance for light of a wavelength of 550 nm between 300 nm and 800 nm, preferably between 350 nm and 650 nm and most preferably between 450 nm and 550 nm.

Further crossed A-plates may be conveniently provided from low cost materials.

By way of illustration various other example embodiments of the optical structure and driving of FIG. 12A will now be described. FIG. 12C and FIG. 12D further illustrate that by adjustment of addressing voltage and retardances, advantageously different wide angle fields of view may be achieved.

Arrangements of optical stack structures will now be further described.

Figure 13A:
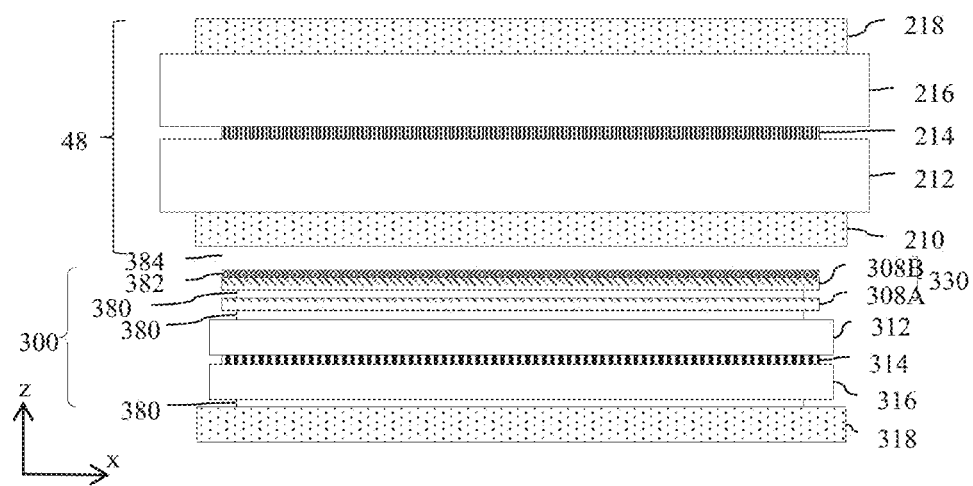
FIG. 13A and FIG. 13B are schematic diagrams illustrating in side views part of a display comprising a switchable compensated retarder and optical bonding layers.
Figure 13B:
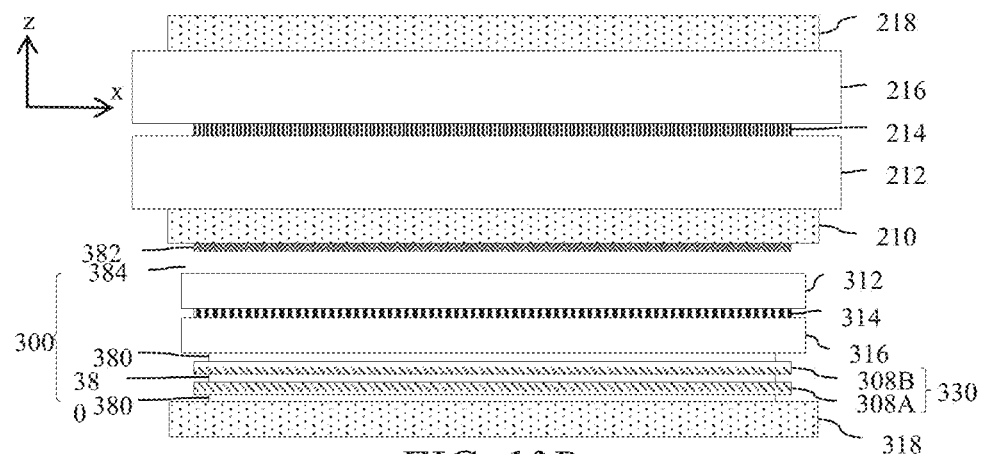

FIG. 13A and FIG. 13B are schematic diagrams illustrating in side views part of a display comprising a switchable compensated retarder and optical bonding layers 380. Optical bonding layers 380 may be provided to laminate films and substrates, achieving increased efficiency and reduced luminance at high viewing angles in privacy mode. Further an air gap 384 may be provided between the spatial light modulator 48 and the switchable compensated retarder 300. To reduce wetting of the two surfaces at the air gap 384, an anti-wetting surface 382 may be provided to at least one of the switchable compensated retarder 300 or spatial light modulator 48.

The passive compensation retarder 330 may be provided between the switchable liquid crystal layer 301 and spatial light modulator 48 as illustrated in FIG. 13A, or may be provided between the additional polariser 318 and switchable liquid crystal retarder 301 as illustrated in FIG. 13B. Substantially the same optical performance is provided in both systems.

FIG. 13A illustrates that optical layers are bonded to outer sides of the substrates 312, 316. Advantageously, bending of the substrates 312, 316 from the attached layers due to stored stresses during lamination may be reduced and display flatness maintained.

Similarly, switchable compensated retarder 300 may be arranged wherein the output polariser 218 is the display polariser. Scatter that may be provided by spatial light modulator 48, such as from phase structures at the pixels 220, 222, 224 do not degrade the output luminance profile in comparison to arrangements wherein the switchable compensated retarder 301 is arranged behind the spatial light modulator 48.

It may be desirable to provide the additional polariser with a different electric vector transmission direction to the electric vector transmission direction of the display polariser.

Figure 14:
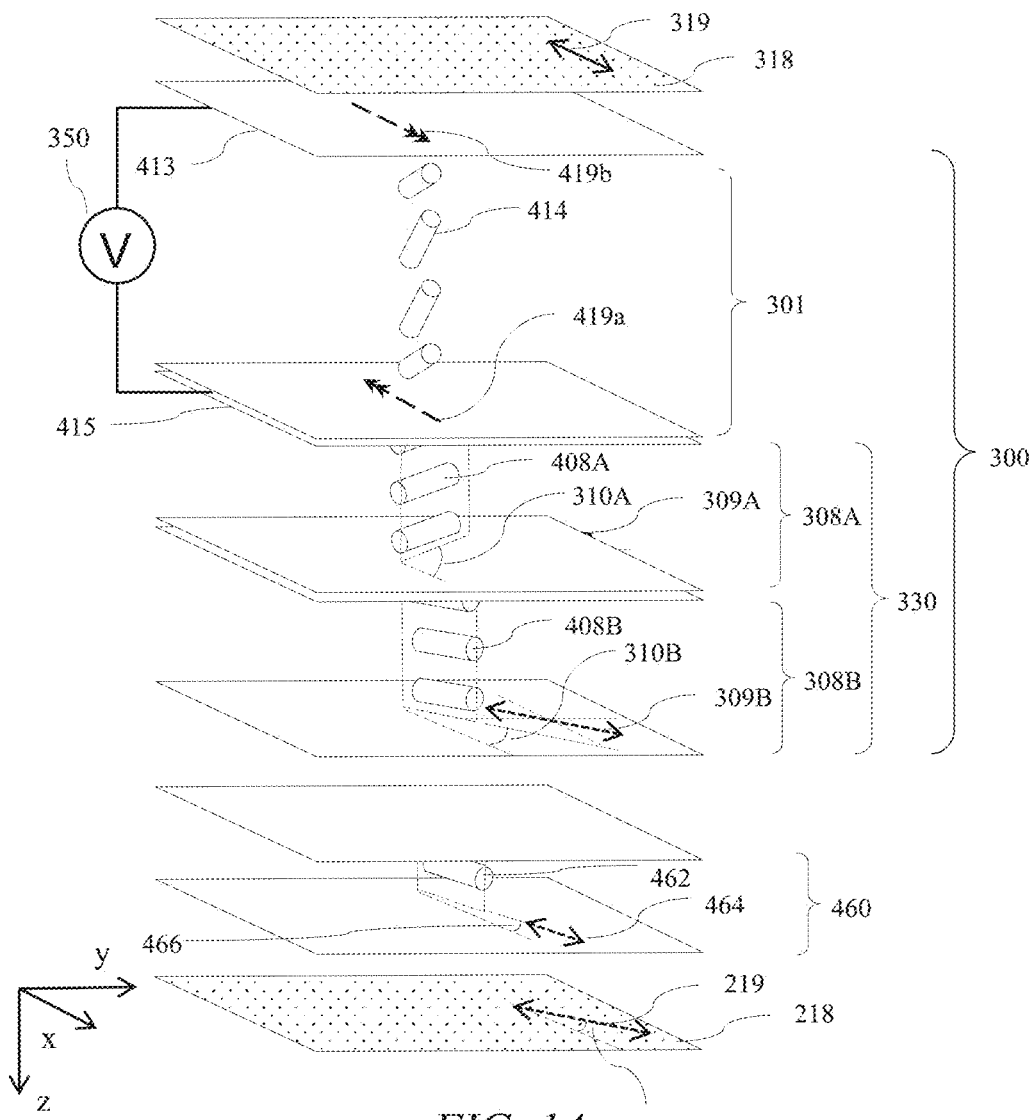
FIG. 14 is a schematic diagram illustrating in perspective side view an arrangement of a switchable compensated retarder in a privacy mode of operation comprising crossed A-plate passive compensation retarders and homogeneously aligned switchable liquid crystal retarder, further comprising a passive rotation retarder.

FIG. 14A is a schematic diagram illustrating in perspective side view an arrangement of a switchable compensated retarder in a privacy mode of operation comprising the crossed A-plate passive compensation retarders 308A, 308B and homogeneously aligned switchable liquid crystal retarder 301, as described above but further comprising a passive rotation retarder 460.

The display polariser 218 may be provided with an electric vector transmission direction 219, that may be for example at an angle 317 of 45 degrees in the case of a twisted nematic LCD display. The additional polariser 318 may be arranged to provide vertically polarised light to a user who may be wearing polarising sunglasses that typically transmit vertically polarised light.

The passive rotation retarder 460 is different to the compensation retarder 330 of the present embodiments and its operation will now be described.

Passive rotation retarder 460 may comprise a birefringent material 462 and be a half waveplate, with retardance at a wavelength of 550 nm of 275 nm for example.

Passive rotation retarder 460 has a fast axis orientation 464 that is inclined at an angle 466 that may be 22.5 degrees to the electric vector transmission direction 319 of the additional polariser 318. The passive rotation retarder 460 thus rotates the polarisation from the output polariser 218 such that the polarisation direction of the light that is incident onto the compensation retarder 308B is parallel to the direction 319.

The passive rotation retarder 460 modifies the on-axis polarisation state, by providing an angular rotation of the polarisation component from the display polariser 218. In comparison the compensation retarders 308A, 308B together do not modify the on-axis polarisation state.

Further, the passive rotation retarder 460 provides a rotation of polarisation that may be substantially independent of viewing angle. In comparison the compensation retarders 308A, 308B provide substantial modifications of output luminance with viewing angle.

Advantageously a display may be provided with an output polarisation direction 319 that is different from the display polariser polarisation direction 219, for example to provide viewing with polarising sunglasses.

In an alternative embodiment the separate retarder 460 may be omitted and the retardance of the retarder 308B of FIG. 11A increased to provide an additional half wave rotation in comparison to the retardance of retarder 308A. To continue the illustrative embodiment, the retardance of retarder 308B at a wavelength of 550 nm may be 275 nm greater than the retardance of retarder 308A. Advantageously the number of layers, complexity and cost may be reduced.

It would be desirable to provide reduced thickness and reduced total number of optical components.

Figure 15A:
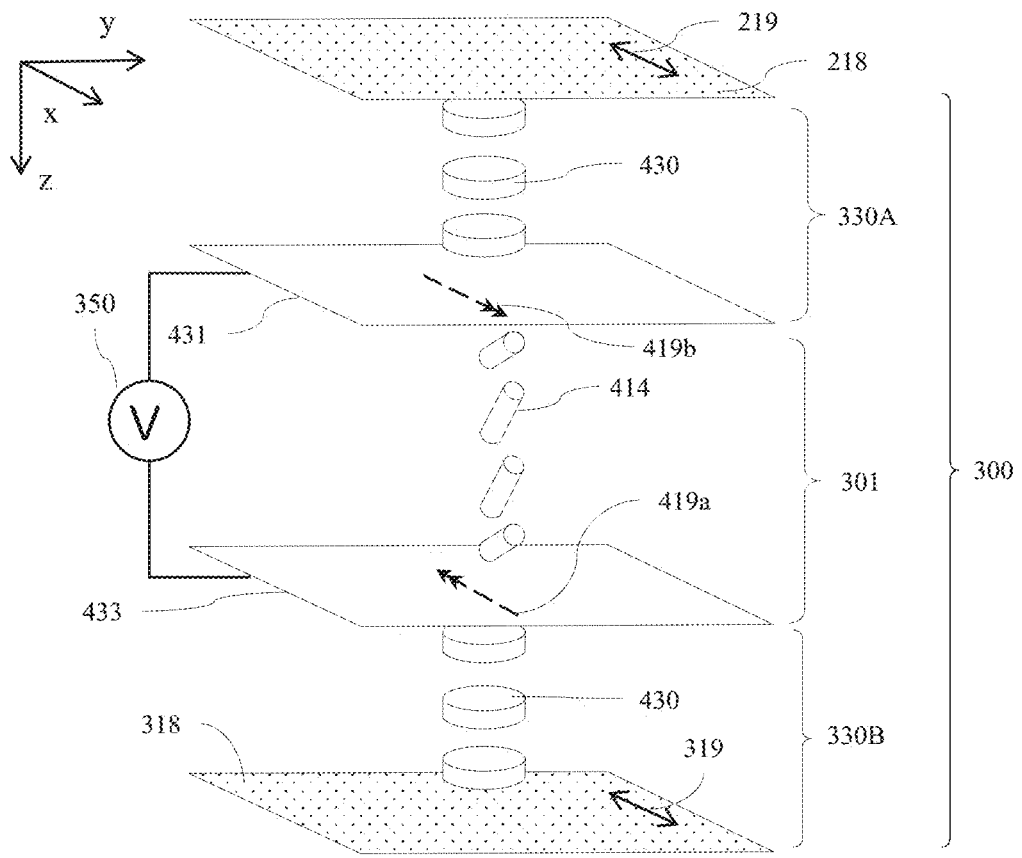
FIG. 15A is a schematic diagram illustrating in perspective side view an arrangement of a switchable compensated retarder in a privacy mode of operation comprising a homeotropically aligned switchable liquid crystal retarder arranged between first and second C-plate passive compensation retarders.

FIG. 15A is a schematic diagram illustrating in perspective side view an arrangement of a switchable compensated retarder in a privacy mode of operation comprising a homogeneously aligned switchable liquid crystal retarder 301 arranged between first and second C-plate passive compensation retarders 330A, 330B, further illustrated in TABLE 7.

TABLE 7

| FIG. | Mode | Passive compensation retarder(s) Type | Δn.d/ nm | Active LC retarder Alignment layers | Pretilt/ deg | Δn.d/ nm | Δε | Voltage/ V |
|---|---|---|---|---|---|---|---|---|
| 15B | Wide | Negative C, 330A | −275 | Homogeneous | 2 | 750 | 13.2 | 5.0 |
| 15A & 15C | Privacy | Negative C, 330B | −275 | Homogeneous | 2 | | | 2.6 |
| 17A & 17B | Wide | A-plate, 330A | 575 | Homogeneous | 2 | 750 | 13.2 | 5.0 |
| 17C | Privacy | A-plate, 330B | 575 | Homogeneous | 2 | | | 2.6 |

Figure 15B:
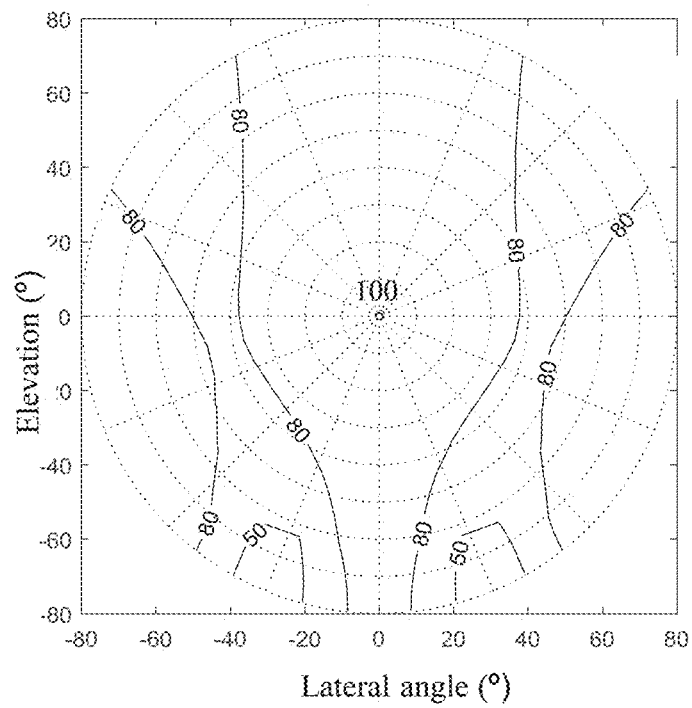
FIG. 15B and FIG. 15C are schematic graphs illustrating the variation of output transmission with polar direction for transmitted light rays in the optical stack of FIG. 15A in a wide angle mode and a privacy mode of operation respectively.
Figure 15C:
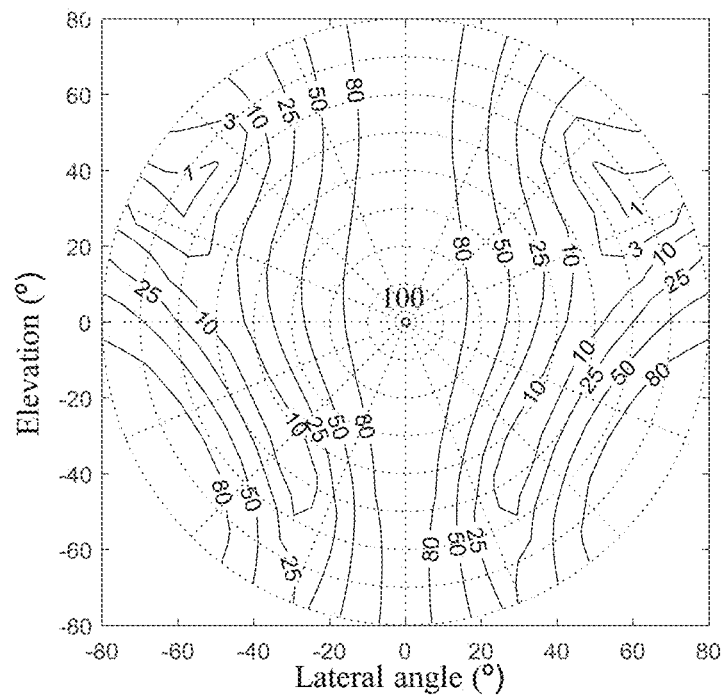

FIG. 15B and FIG. 15C are schematic graphs illustrating the variation of output transmission with polar direction for transmitted light rays in the optical stack of FIG. 15A in a wide angle mode and a privacy mode of operation respectively.

The passive compensation retarder 330 comprises first and second C-plates 330A, 330B; and the switchable liquid crystal layer 301 is provided between the first and second C-plates 330A, 330B.

The passive compensation retarder 330A, 330B comprises two passive retarders having an optical axis perpendicular to the plane of the passive retarders, and the switchable liquid crystal retarder 301 is provided between the two passive retarders. The first and second substrates 312, 316 of FIG. 1A thus each comprise one of the two passive retarders 330A, 330B.

In combination the two passive retarders 330A, 330B have a total retardance for light of a wavelength of 550 nm in a range −300 nm to −800 nm, preferably in a range from −350 nm to −700 nm and most preferably in a range from −400 nm to −600 nm.

Figure 16A:
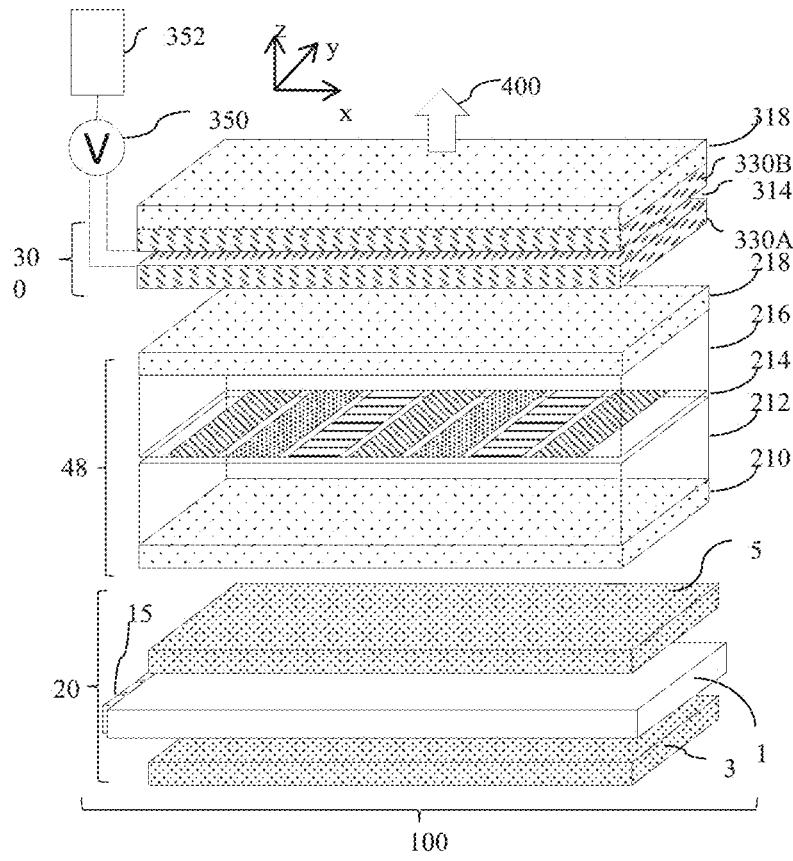
FIG. 16A is a schematic diagram illustrating in perspective side view a display comprising a switchable liquid crystal retarder arranged between first and second substrates each comprising C-plate passive compensation retarders.
Figure 16B:
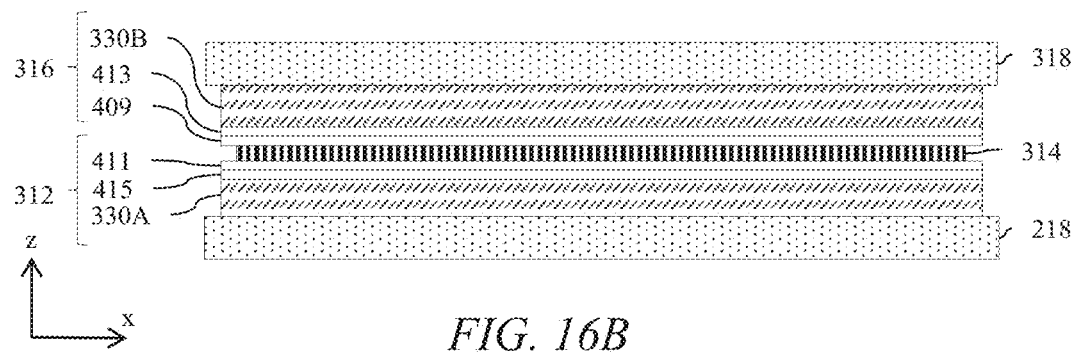
FIG. 16B is a schematic diagram illustrating in side view part of a display comprising a switchable liquid crystal retarder arranged between first and second substrates each comprising C-plate passive compensation retarders.

FIG. 16A is a schematic diagram illustrating in perspective side view a display comprising a switchable liquid crystal retarder 301 arranged between first and second substrates each comprising C-plate passive compensation retarders 330A, 330B; and FIG. 16B is a schematic diagram illustrating in side view part of a display comprising a switchable liquid crystal retarder 301 arranged between first and second substrates each comprising C-plate passive compensation retarders 330A, 330B.

The first C-plate 330A has a transparent electrode layer 415 and liquid crystal alignment layer 411 formed on one side and the second C-plate 330B has a transparent electrode layer 413 and liquid crystal alignment layer 409 formed on one side.

The layer 314 of liquid crystal material is provided between first and second substrates 312, 316, and the first and second substrates 312, 316 each comprises one of the first and second C-plates 330A, 330B. The C-plates may be provided in double stretched COP films that are ITO coated to provide electrodes 413, 415 and have liquid crystal alignment layers 409, 411 formed thereon.

Advantageously, the number of layers may be reduced in comparison to the arrangement of FIG. 1, reducing thickness, cost and complexity. Further the C-plates 330A, 330B may be flexible substrates, and may provide a flexible privacy display.

It would be desirable to provide a layer 314 of liquid crystal material between first and second A-plate substrates.

Figure 17A:
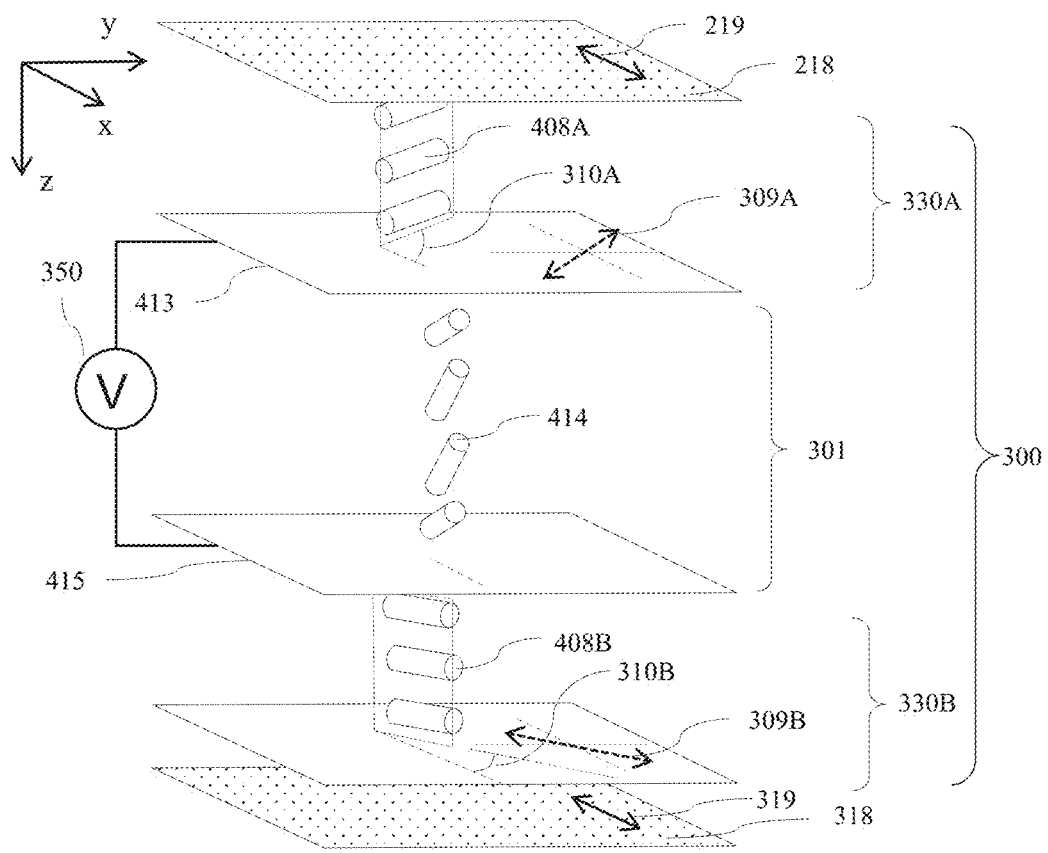
FIG. 17A is a schematic diagram illustrating in perspective side view an arrangement of a switchable compensated retarder in a wide angle mode of operation comprising a homogeneously aligned switchable liquid crystal retarder arranged between first and second crossed A-plate passive compensation retarders.
Figure 17B:
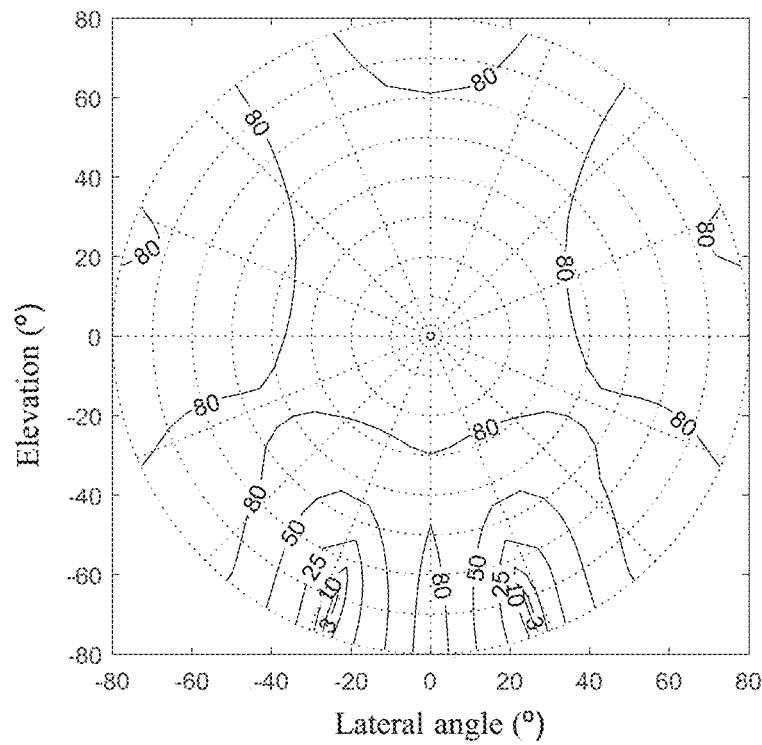
FIG. 17B and FIG. 17C are schematic graphs illustrating the variation of output transmission with polar direction for transmitted light rays for the arrangement of FIG. 17A in wide angle and privacy modes respectively.
Figure 17C:
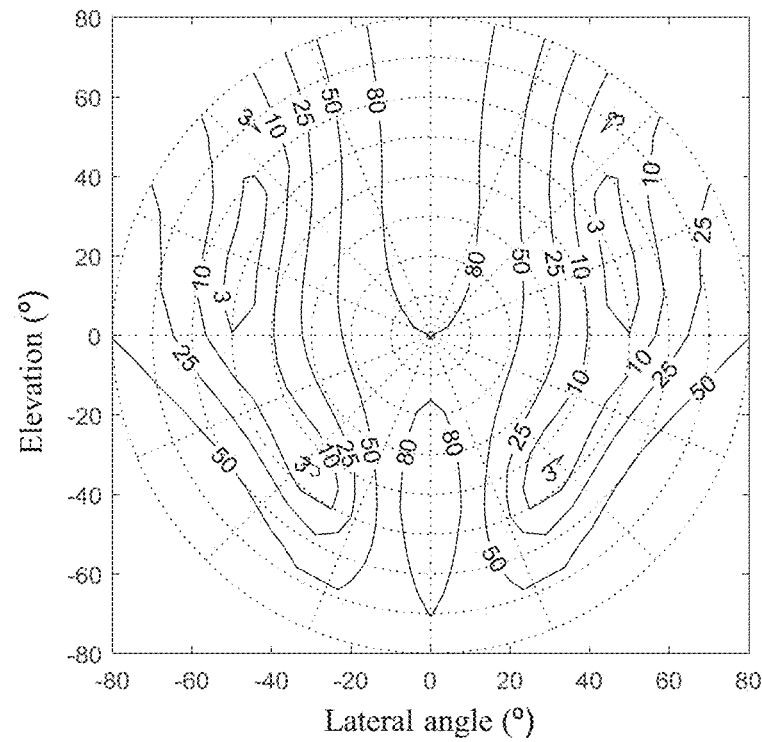

FIG. 17A is a schematic diagram illustrating in perspective side view an arrangement of a switchable compensated retarder 300 in a wide angle mode of operation, comprising a homogeneously aligned switchable liquid crystal retarder 301 arranged between first and second crossed A-plate passive compensation retarders 330A, 330B, as described above; and FIG. 17B and FIG. 17C are schematic graphs illustrating the variation of output transmission with polar direction for transmitted light rays for the structure of FIG. 17A when driven in wide angle and privacy modes of operation respectively comprising the further illustrative embodiments illustrated in TABLE 7.

In comparison to the arrangement of FIG. 15A, advantageously A-plates may be manufactured at reduced cost compared to C-plates.

Hybrid aligned structures comprising both homogeneous and homeotropic alignment layers will now be described.

Figure 18A:
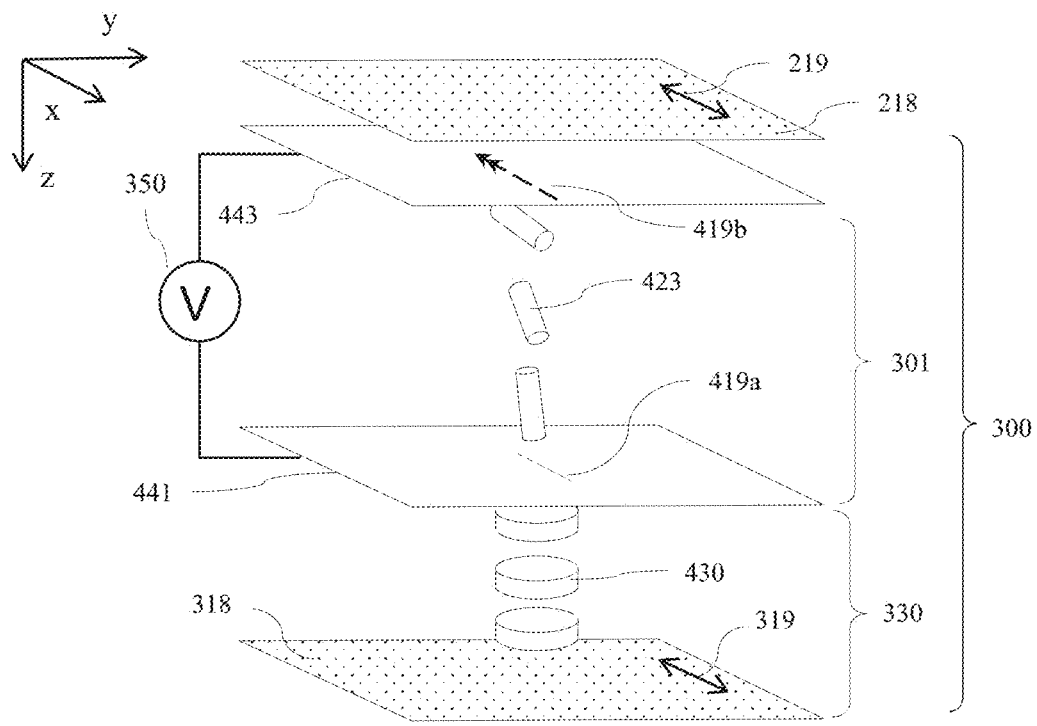
FIG. 18A is a schematic diagram illustrating in perspective side view an arrangement of a switchable compensated retarder in a privacy mode of operation comprising a homogeneously and homeotropically aligned switchable liquid crystal retarder and a passive negative C-plate retarder.

FIG. 18A is a schematic diagram illustrating in perspective side view an arrangement of a switchable retarder in a privacy mode of operation comprising a homogeneously and homeotropically aligned switchable liquid crystal retarder 301 comprising liquid crystal material 423 and a passive negative C-plate retarder 330.

Figure 18B:
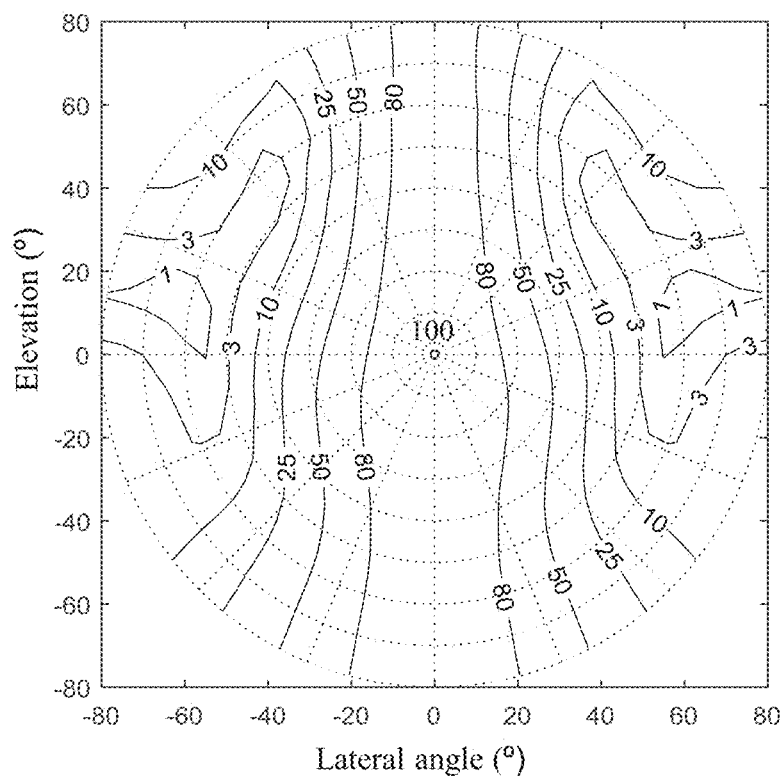
FIG. 18B is a schematic graph illustrating the variation of output transmission with polar direction for transmitted light rays in FIG. 18A in a privacy mode of operation.
Figure 18C:
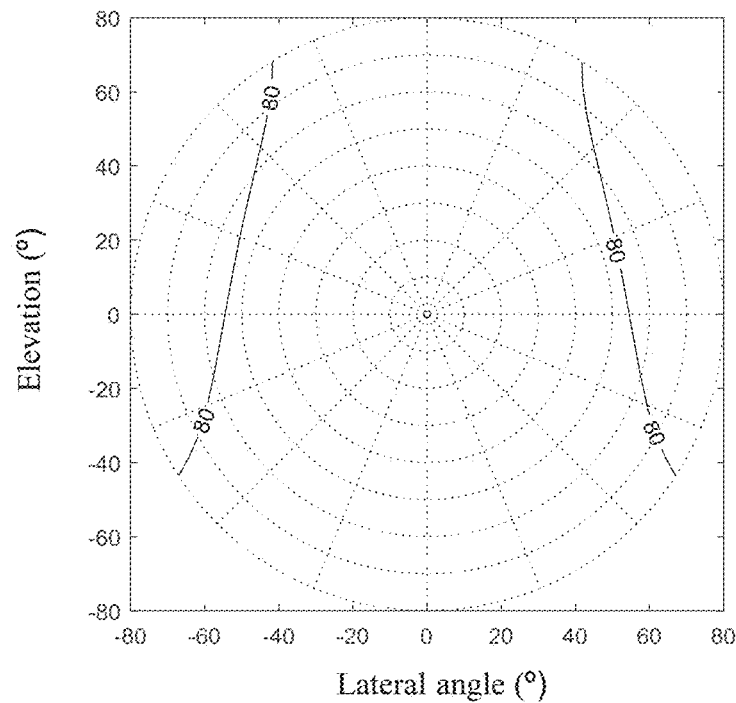
FIG. 18C is a schematic graph illustrating the variation of output transmission with polar direction for transmitted light rays in FIG. 18A in a wide angle mode of operation.

FIGS. 18B-18C are schematic graphs illustrating the variation of output transmission with polar direction for transmitted light rays in FIG. 18A in a wide angle and privacy mode of operation respectively, and provided by the arrangement of TABLE 8.

TABLE 8

| FIG. | Mode | Passive compensation retarder(s) Type | Δn.d/ nm | Active LC retarder Alignment layers | Pretilt/ deg | Δn.d/ nm | Δε | Voltage/ V |
|---|---|---|---|---|---|---|---|---|
| 18C | Wide | Negative C | −1100 | Homogeneous | 2 | 1300 | +4.3 | 15.0 |
| 18A | Privacy | | | Homeotropic | 88 | | | 2.8 |
| Not shown | Wide | Crossed A | +1100 @ 45° | Homeotropic | 2 | 1300 | +4.3 | 15.0 |
| Not shown | Privacy | | +1100 @ 135° | Homogeneous | 88 | | | 2.8 |

The hybrid aligned switchable liquid crystal retarder 301 has variable tilt such that for a given material and cell thickness choice, reduced effective birefringence is provided. Thus the retarder design must be adjusted to compensate in comparison to the arrangements wherein the alignment layers are the same. The switchable liquid crystal retarder 330 comprises a first surface alignment layer 441 disposed on a first side of the layer of liquid crystal material 423, and a second surface alignment layer 443 disposed on the second side of the layer of liquid crystal material 423 opposite the first side. The first surface alignment layer 441 is a homeotropic alignment layer arranged to provide homeotropic alignment in the adjacent liquid crystal material 423 and the second surface alignment layer 443 is a homogeneous alignment layer arranged to provide homogeneous alignment in the adjacent liquid crystal material 423.

Further, the optimum designs of retarders are related to the relative location of the passive compensation retarder 330 with respect to the homeotropic and homogeneous alignment layers.

When the surface alignment layer 443 arranged to provide homogeneous alignment is between the layer of liquid crystal material 423 and the compensation retarder 330, the layer of liquid crystal material 423 has a retardance for light of a wavelength of 550 nm in a range from 500 nm to 1800 nm, preferably in a range from 700 nm to 1500 nm and most preferably in a range from 900 nm to 1350 nm. When the surface alignment layer 443 arranged to provide homogeneous alignment is between the layer of liquid crystal material 423 and the compensation retarder 330, the passive compensation retarder may comprise a retarder 330 having its optical axis perpendicular to the plane of the retarder as shown in FIG. 18A, the passive retarder 330 having a retardance for light of a wavelength of 550 nm in a range from −300 nm to −1600 nm, preferably in a range from −500 nm to −1300 nm and most preferably in a range from −700 nm to −1150 nm; or alternatively the passive compensation retarder may comprise a pair of retarders (not shown) which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm.

When the surface alignment layer 441 arranged to provide homeotropic alignment is between the layer of liquid crystal material 423 and the compensation retarder 330, the layer of liquid crystal material 423 has a retardance for light of a wavelength of 550 nm in a range from 700 nm to 2000 nm, preferably in a range from 1000 nm to 1700 nm and most preferably in a range from 1200 nm to 1500 nm. When the surface alignment layer 441 arranged to provide homeotropic alignment is between the layer of liquid crystal material 423 and the compensation retarder 330, the passive compensation retarder may comprise a retarder 330 having its optical axis perpendicular to the plane of the retarder as shown in FIG. 18A, the passive retarder having a retardance for light of a wavelength of 550 nm in a range from −400 nm to −1800 nm, preferably in a range from −700 nm to −1500 nm and most preferably in a range from −900 nm to −1300 nm; or alternatively the passive compensation retarder may comprise a pair of retarders (not shown) which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

In comparison to the arrangement of FIG. 5A, the privacy mode of operation may advantageously achieve increased resilience to the appearance of material flow when the liquid crystal retarder is pressed.

By way of comparison with the present embodiments, the performance of retarders between parallel polarisers when arranged in series will now be described. First, the field of view of a homogeneously aligned liquid crystal retarder 301 will now be described for two different drive voltages.

Figure 19A:
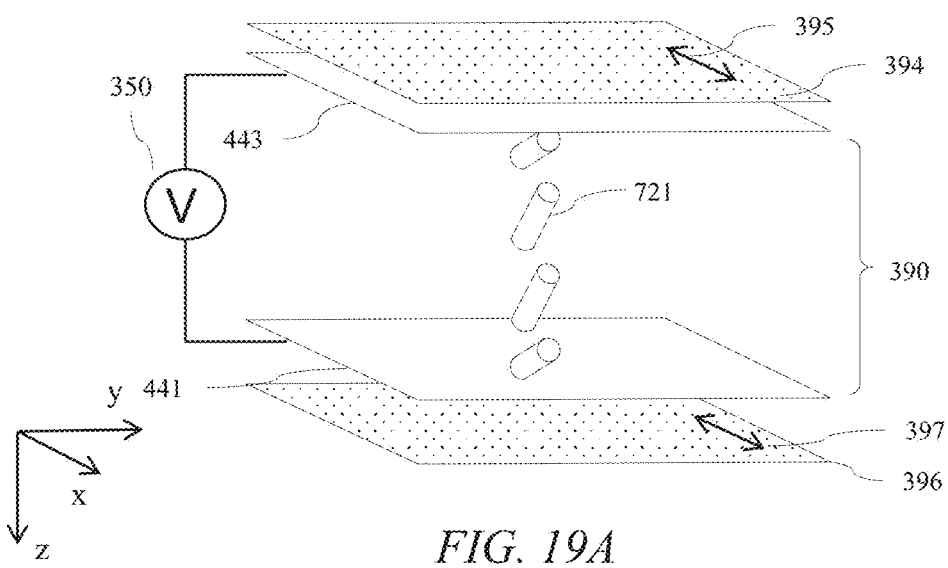
FIG. 19A is a schematic diagram illustrating in perspective side view an arrangement of a homogeneously aligned switchable liquid crystal retarder.
Figure 19B:
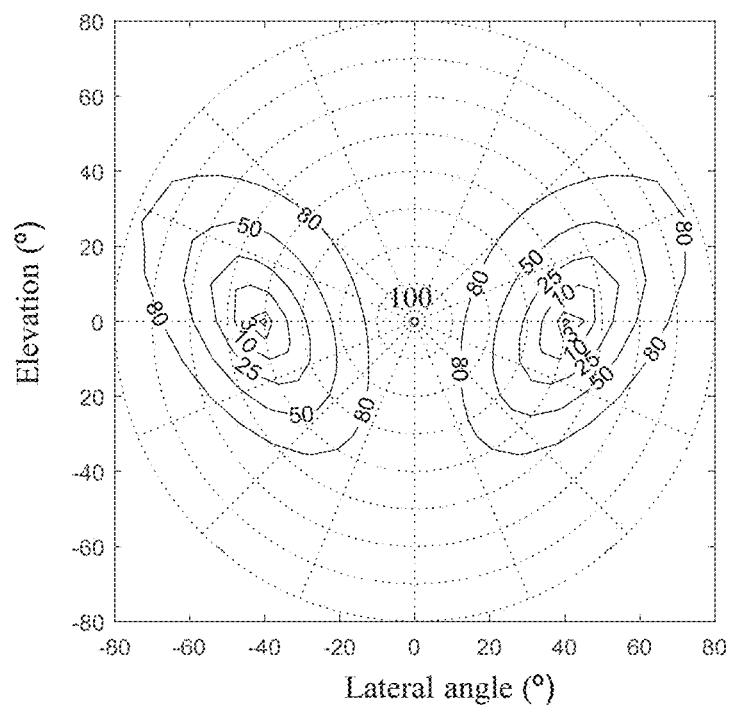
FIG. 19B is a schematic graph illustrating the variation of output transmission with polar direction for transmitted light rays in FIG. 19A for a first applied voltage.
Figure 19C:
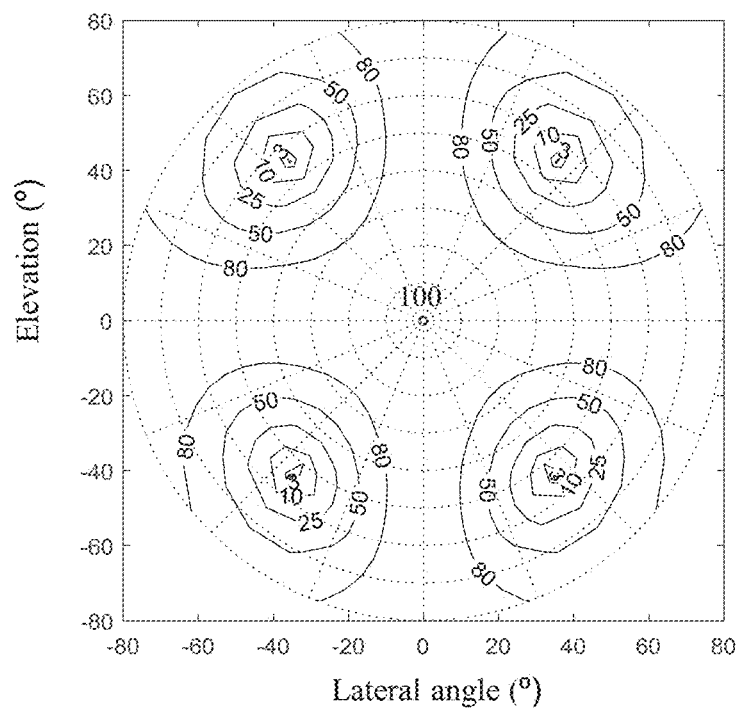
FIG. 19C is a schematic graph illustrating the variation of output transmission with polar direction for transmitted light rays in FIG. 19A for a second applied voltage that is greater than the first applied voltage.

FIG. 19A is a schematic diagram illustrating in perspective side view an arrangement of a homogeneously aligned switchable liquid crystal retarder 390; FIG. 19B is a schematic graph illustrating the variation of output transmission with polar direction for transmitted light rays in FIG. 19A for a first applied voltage, and FIG. 19C is a schematic graph illustrating the variation of output transmission with polar direction for transmitted light rays in FIG. 19A for a second applied voltage that is greater than the first applied voltage, comprising the structure illustrated in TABLE 9. The homogeneously aligned switchable liquid crystal retarder 390 corresponds to the switchable liquid crystal retarder 330 described above and may be applied as the switchable liquid crystal retarder in any of the devices disclosed herein.

Figure 19D:
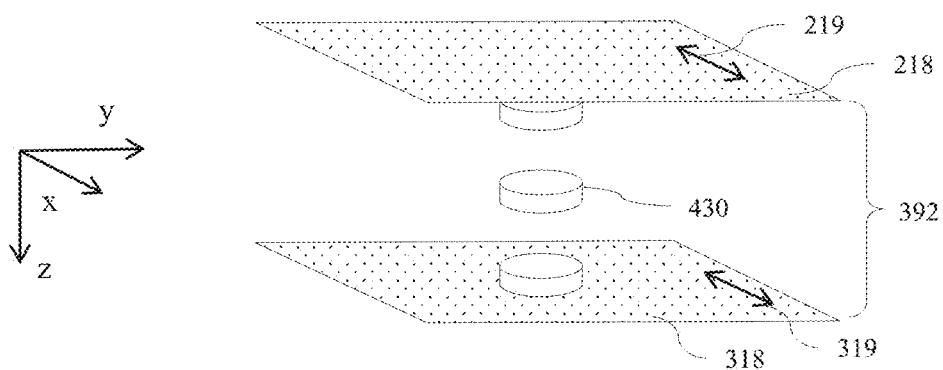
FIG. 19D is a schematic diagram illustrating in perspective side view a C-plate arranged between parallel polarisers.
Figure 19E:
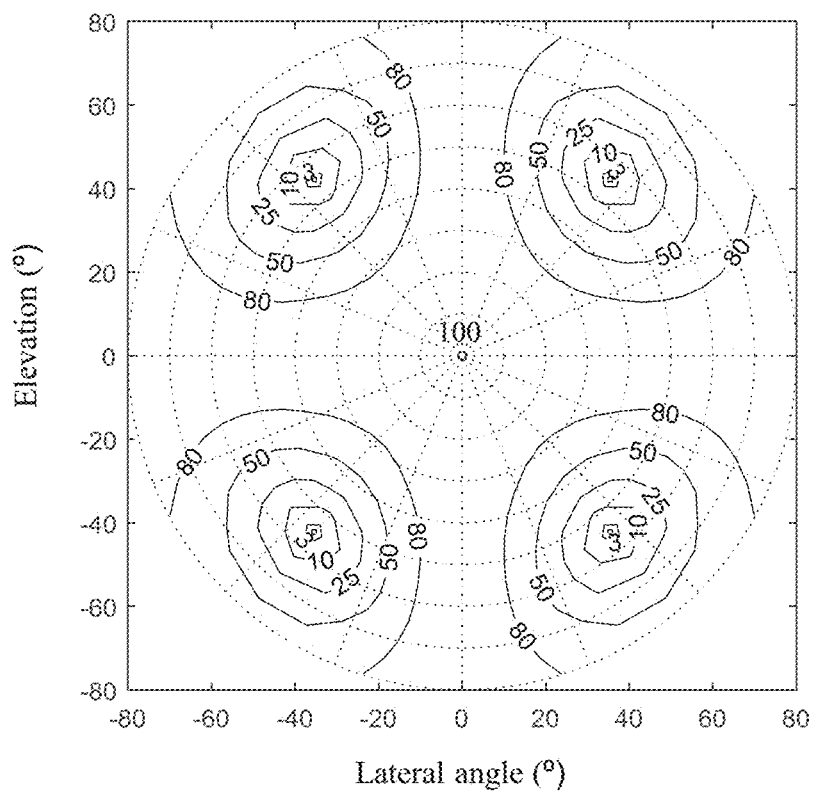
FIG. 19E is a schematic graph illustrating the variation of output transmission with polar direction for transmitted light rays in FIG. 19D.

FIG. 19D is a schematic diagram illustrating in perspective side view a passive C-plate retarder 392 arranged between parallel polarisers; and FIG. 19E is a schematic graph illustrating the variation of output transmission with polar direction for transmitted light rays in FIG. 19D, comprising the structure illustrated in TABLE 9. The passive C-plate retarder 392 corresponds to the passive compensation retarder 330 and may be applied as the at least one passive compensation retarder in any of the devices disclosed herein.

TABLE 9

| | Passive compensation retarder(s) | | | Active LC retarder | | | | |
|---|---|---|---|---|---|---|---|---|
| FIG. | Type | Δn.d/ nm | Central polariser? | Alignment layers | Pretilt/ deg | Δn.d/ nm | Δε | Voltage/ V |
| 19A & 19B 19C | — | — | — | Homogeneous Homogeneous | 1 | 900 | +15 | 2.4 20.0 |
| 19D & 19E | Negative C | −700 | — | — | — | — | — | — |
| 20A & 20B 20C | Negative C | −700 | Yes | Homogeneous Homogeneous | 1 | 900 | +15 | 2.4 20.0 |
| 21A & 21B 21C | Negative C | −700 | No | Homogeneous Homogeneous | 1 | 900 | +15 | 2.4 20.0 |

Figure 20A:
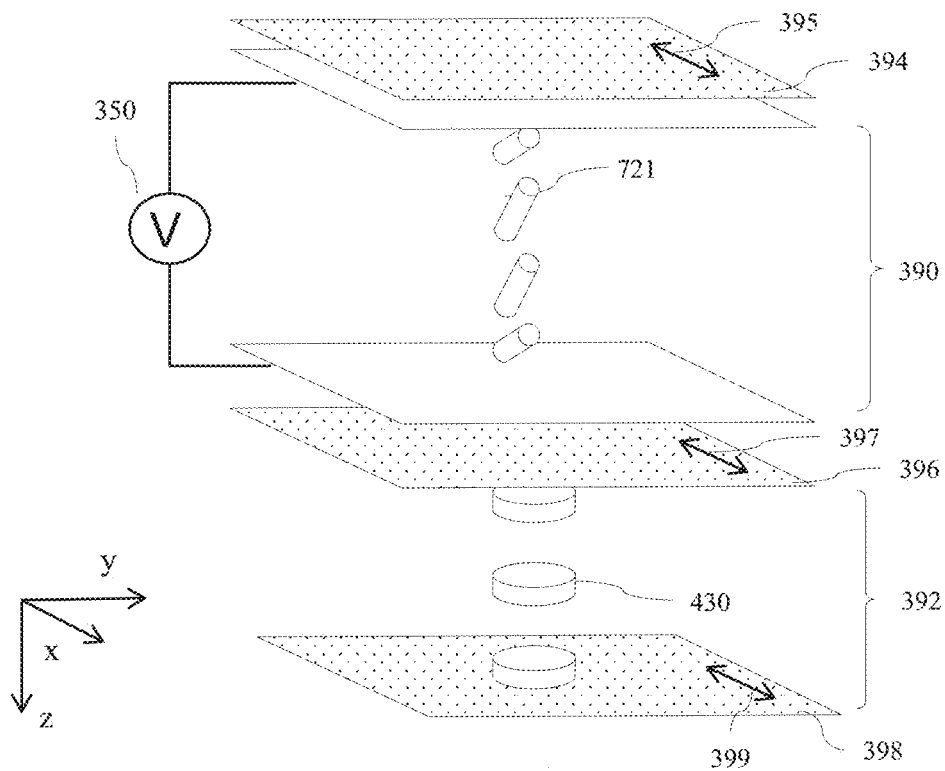
FIG. 20A is a schematic diagram illustrating in perspective side view an arrangement of a homogeneously aligned switchable liquid crystal retarder arranged between parallel polarisers in series with a C-plate arranged between parallel polarisers.
Figure 20B:
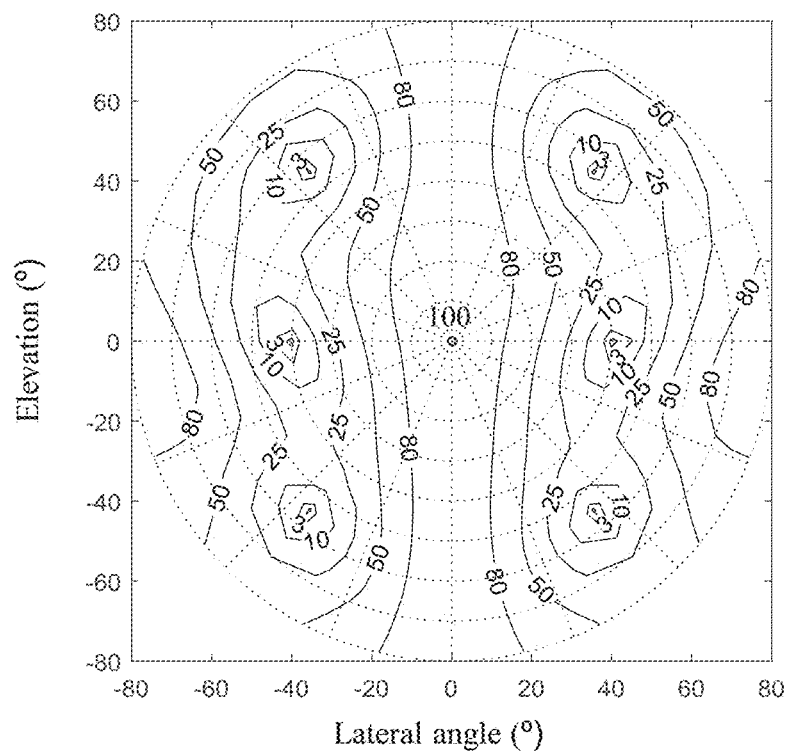
FIG. 20B is a schematic graph illustrating the variation of output transmission with polar direction for transmitted light rays in FIG. 20A for a first applied voltage.
Figure 20C:
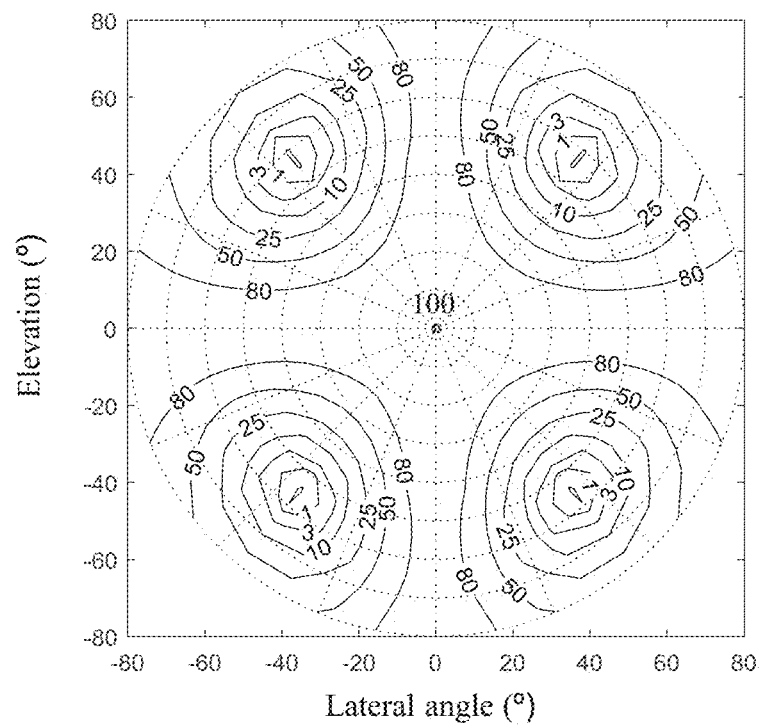
FIG. 20C is a schematic graph illustrating the variation of output transmission with polar direction for transmitted light rays in FIG. 20A for a second applied voltage that is greater than the first applied voltage.

FIG. 20A is a schematic diagram illustrating in perspective side view an arrangement of a homogeneously aligned switchable liquid crystal retarder 390 arranged between parallel polarisers 394, 396 in series with a field-of-view control passive retarder comprising a C-plate retarder 392 arranged between parallel polarisers 396, 398; FIG. 20B is a schematic graph illustrating the variation of output transmission with polar direction for transmitted light rays in FIG. 20A for a first applied voltage; FIG. 20C is a schematic graph illustrating the variation of output transmission with polar direction for transmitted light rays in FIG. 20A for a second applied voltage that is greater than the first applied voltage, comprising the structure illustrated in TABLE 9.

Figure 21A:
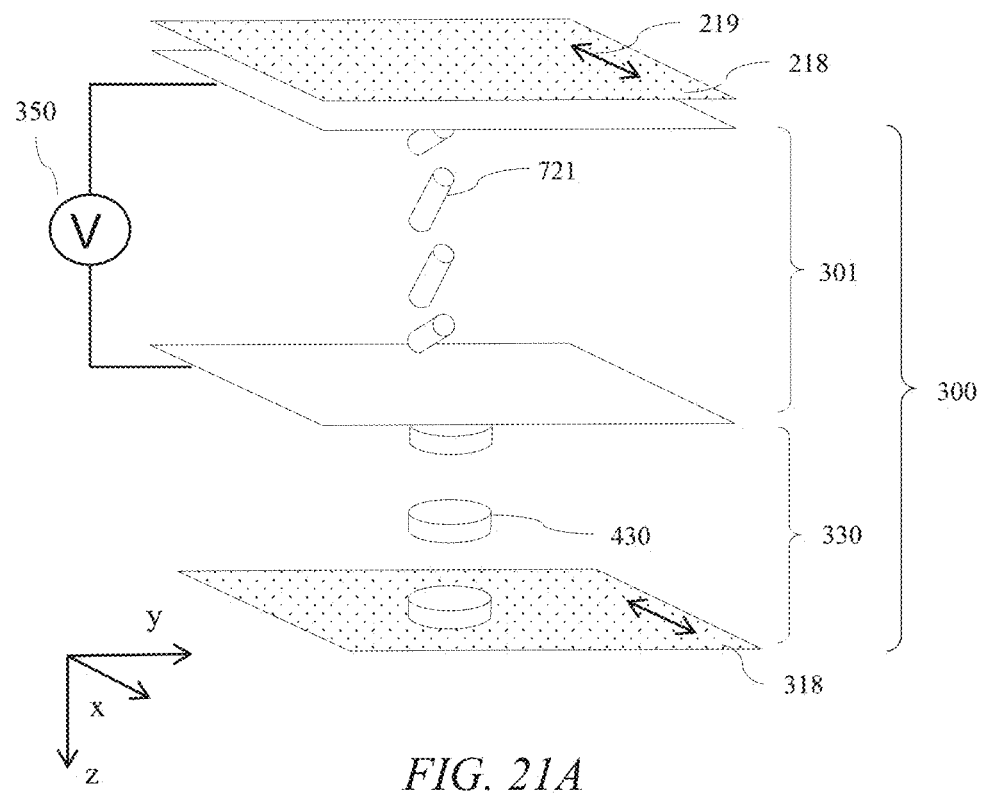
FIG. 21A is a schematic diagram illustrating in perspective side view an arrangement of a homogeneously aligned switchable liquid crystal retarder in series with a C-plate compensation retarder wherein the homogeneously aligned switchable liquid crystal and C-plate compensation retarder are arranged between a single pair of parallel polarisers.
Figure 21B:
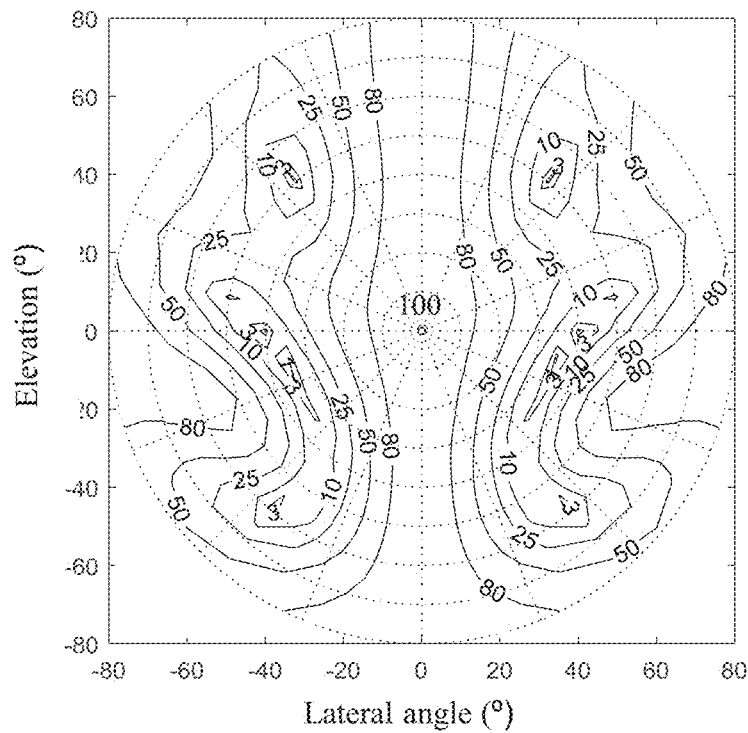
FIG. 21B is a schematic graph illustrating the variation of output transmission with polar direction for transmitted light rays in FIG. 21A for a first applied voltage.
Figure 21C:
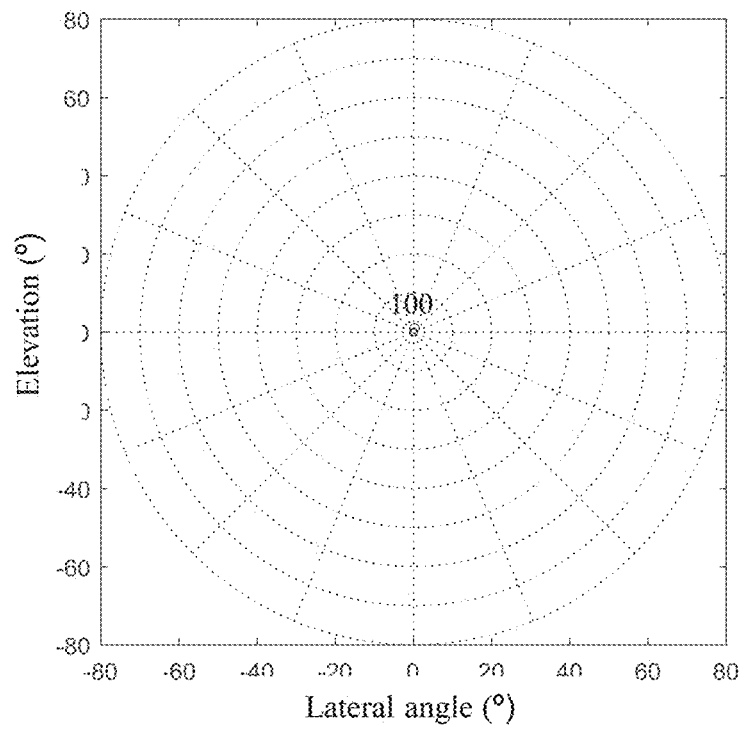
FIG. 21C is a schematic graph illustrating the variation of output transmission with polar direction for transmitted light rays in FIG. 21A for a second applied voltage that is greater than the first applied voltage.

FIG. 21A is a schematic diagram illustrating in perspective side view an arrangement of a homogeneously aligned switchable liquid crystal retarder 301 in series with a C-plate compensation retarder 330 wherein the homogeneously aligned switchable liquid crystal material 712 and C-plate compensation retarder 330 are arranged between a single pair of parallel polarisers; FIG. 21B is a schematic graph illustrating the variation of output transmission with polar direction for transmitted light rays in FIG. 21A for a first applied voltage; and FIG. 21C is a schematic graph illustrating the variation of output transmission with polar direction for transmitted light rays in FIG. 21A for a second applied voltage that is greater than the first applied voltage, comprising the structure illustrated in TABLE 9.

Unexpectedly, the optimum conditions for maximum field-of-view operation is provided by equal and opposite net retardation of the compensation retarder 330 in comparison to the switchable liquid crystal retarder 301 in its undriven state. An ideal compensation retarder 330 and switchable liquid crystal retarder 301 may achieve (i) no modification of the wide angle mode performance from the input light and (ii) optimal reduction of lateral viewing angle for off-axis positions for all elevations when arranged to provide a narrow angle state. This teaching may be applied to all the display devices disclosed herein.

It may be desirable to increase the reduction of luminance for off-axis viewing positions. In particular it would be desirable to provide increased privacy reduction in a liquid crystal display with a wide angle backlight.

Figure 22A:
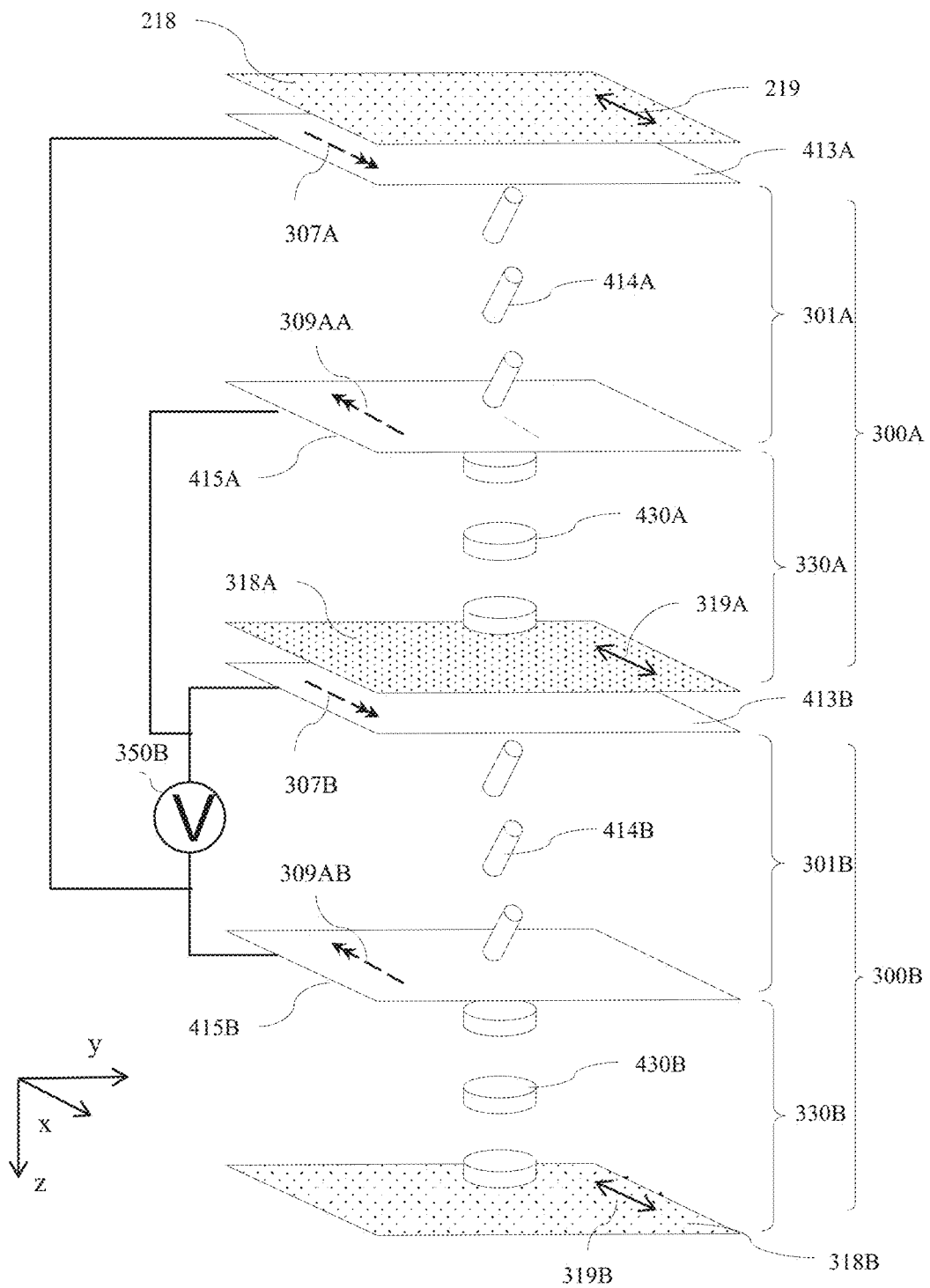
FIG. 22A is a schematic diagram illustrating in perspective side view an arrangement of a switchable compensated retarder in a privacy mode of operation comprising a negative C-plate passive compensation retarder and homeotropically aligned switchable liquid crystal retarder arranged between the output polariser and additional polariser; and a negative C-plate passive compensation retarder and homeotropically aligned switchable liquid crystal retarder arranged between the first-mentioned additional polariser and further additional polariser in a privacy mode of operation.

FIG. 22A is a schematic diagram illustrating in perspective side view (and noting the reversed view in which the z-axis along which output light is directed is downwards) an arrangement of a switchable retarder in a privacy mode of operation, comprising: a first switchable compensated retarder 300A (in this case, a negative C-plate passive compensation retarder 330A and homeotropically aligned switchable liquid crystal retarder 301A, but this is merely an example and may be replaced by any of the other arrangements of plural retarders disclosed herein) arranged between the output display polariser 218 and an additional polariser 318A; and a further switchable compensated retarder 300B (in this case, a negative C-plate passive compensation retarder 330B and homeotropically aligned switchable liquid crystal retarder 301B, but this is merely an example and may be replaced by any of the other arrangements of plural retarders disclosed herein) arranged between the first-mentioned additional polariser 318A and a further additional polariser 318B with electric vector transmission direction 319B.

As an alternative, the first-mentioned additional polariser 318A may be arranged on the input side of the input display polariser 210, in which case the further additional polariser 318B may be arranged on the input side of the input display polariser 210 between the first-mentioned additional polariser 318A and the backlight 20, and the further switchable compensated retarder 300B may be arranged between the further additional polariser 318B and the first-mentioned additional polariser 318A.

In both of these alternatives, each of the first plural retarders 300A and the further plural retarders 300B are arranged between a respective pair of polarisers and so have an effect similar to that of the corresponding structure in the devices described above.

The pretilt directions 307A. 309AA of the alignment layers of the further switchable liquid crystal retarder 301A may have a component in the plane of the liquid crystal layer that is aligned parallel or antiparallel or orthogonal to the pretilt directions of the alignment layers 3071, 309AB of the first switchable liquid crystal retarder 301B. In a wide angle mode of operation, both switchable liquid crystal retarders 301A, 301B are driven to provide a wide viewing angle. In a privacy mode of operation, switchable liquid crystal retarders 301B, 301A may cooperate to advantageously achieve increased luminance reduction and thus improved privacy in a single axis.

The retardation provided by the first switchable liquid crystal retarder 301B and further liquid crystal retarders 301A may be different. The switchable liquid crystal retarder 301B and further switchable liquid crystal retarder 301A may be driven by a common voltage and the liquid crystal material 408B in the first switchable liquid crystal retarder 301B may be different to the liquid crystal material 408A in the further switchable liquid crystal retarder 301A. Chromatic variation of the polar luminance profiles illustrated elsewhere herein may be reduced, so that advantageously off-axis color appearance is improved.

Alternatively, switchable liquid crystal retarders 301B, 301A may have orthogonal alignments so that reduced luminance is achieved in both horizontal and vertical directions, to advantageously achieve landscape and portrait privacy operation.

Alternatively, the layers 301A, 301B may be provided with different drive voltages.

Advantageously increased control of roll-off of luminance profile may be achieved or switching between landscape and privacy operation may be provided.

The retardance control layer 330B may comprise a passive compensation retarder 330A arranged between the first additional polariser 318A and the further additional polariser 318B. More generally, the switchable liquid crystal retarder 301A may be omitted and a fixed luminance reduction may be provided by passive compensation retarders 330A. For example, luminance reduction in viewing quadrants may be provided by means of layer 330A alone. Advantageously increased area of the polar region for luminance reduction may be achieved. Further, backlights that have a wider angle of illumination output than collimated backlights may be provided, increasing the visibility of the display in wide angle mode of operation.

Figure 22B:
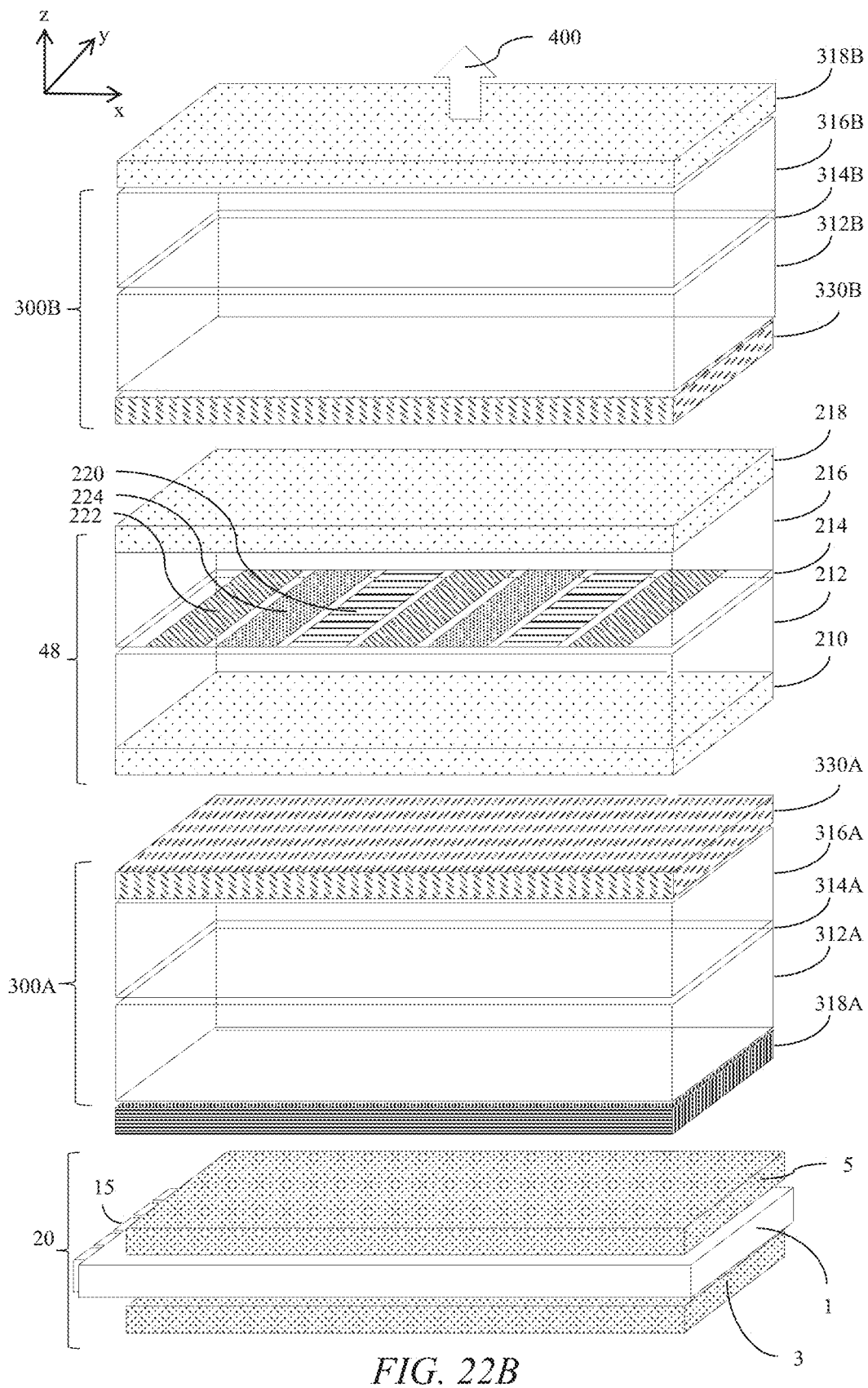
FIG. 22B is a schematic diagram illustrating in perspective side view an arrangement of first switchable compensated retarder arranged on the input of a liquid crystal display and a second switchable compensated retarder arranged on the output of a liquid crystal display.

FIG. 22B is a schematic diagram illustrating in perspective side view an arrangement of first switchable compensated retarder arranged on the input of a liquid crystal display and a second switchable compensated retarder arranged on the output of a liquid crystal display.

The first-mentioned additional polariser 318A is arranged on the input side of the input display polariser 210 between the input display polariser 210 and the backlight 20, and the display device further comprises: a further additional polariser 318B arranged on the output side of the output display polariser 218; and further retarders 301B, 330B arranged between the further additional polariser 318B and the output display polariser 218. The further retarders comprise a further switchable liquid crystal retarder 301B comprising a layer of liquid crystal material 414B and electrodes 413B, 415B on opposite sides of the layer of liquid crystal material 414B, the layer of liquid crystal material 414B being switchable between two orientation states by means of a voltage being applied across the electrodes 413B, 415B.

Figure 22C:
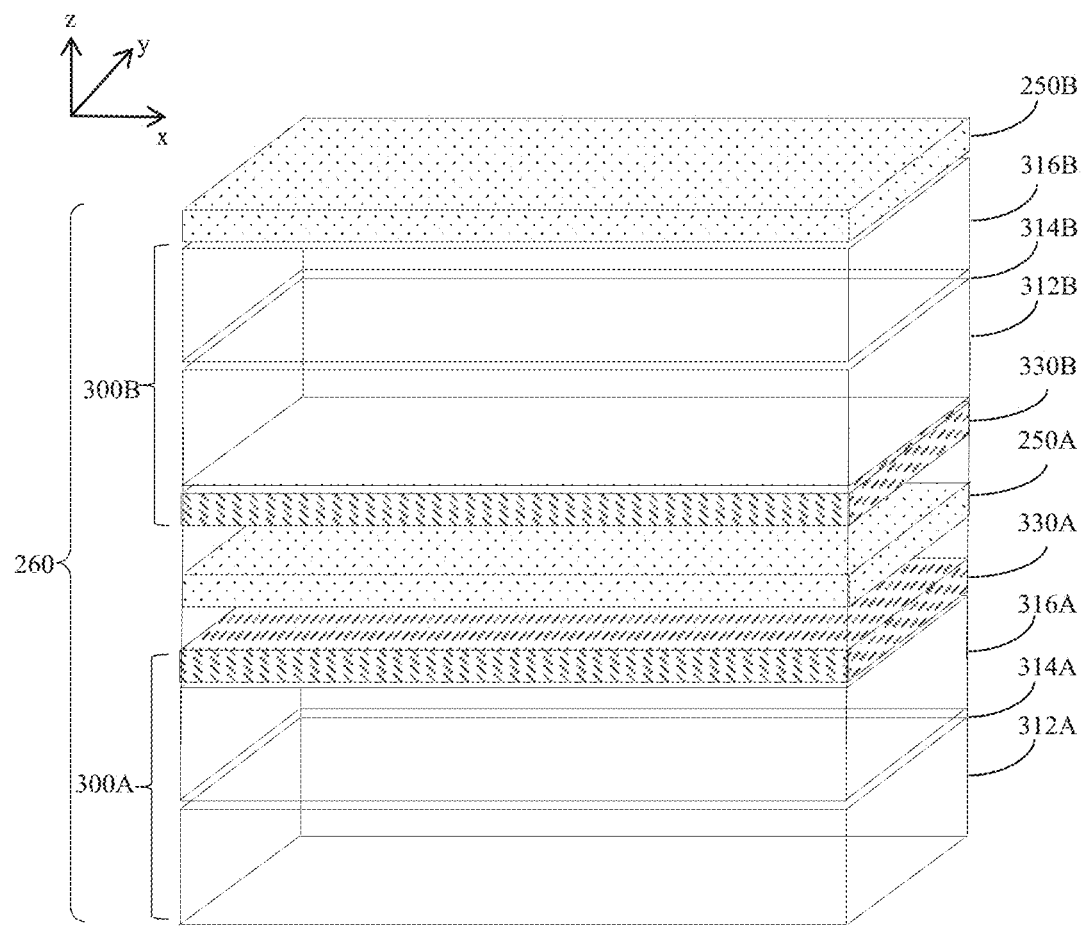
FIG. 22C is a schematic diagram illustrating in side perspective view a view angle control optical element comprising a first passive compensation retarder, a first switchable liquid crystal retarder, a first control polariser, a second passive compensation retarder, a second switchable liquid crystal retarder and a second control polariser.

FIG. 22C is a schematic diagram illustrating in side perspective view a view angle control optical element comprising a first passive compensation retarder, a first switchable liquid crystal retarder, a first control polariser 250, a second passive compensation retarder, a second switchable liquid crystal retarder and a second control polariser 250. Such an element may achieve similar performance to the arrangement of FIG. 22B when provided for display device 100 comprising spatial light modulator 48.

It may be desirable to provide both entertainment and night-time modes of operation in an automotive vehicle.

Figure 22D:
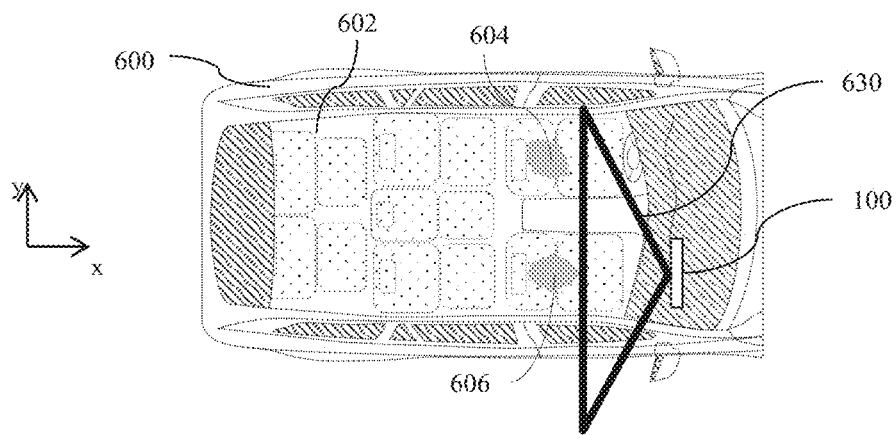
FIG. 22D is a schematic diagram illustrating in top view an automotive vehicle with a switchable directional display arranged within the vehicle cabin for day-time and/or sharing modes of operation.
Figure 22E:
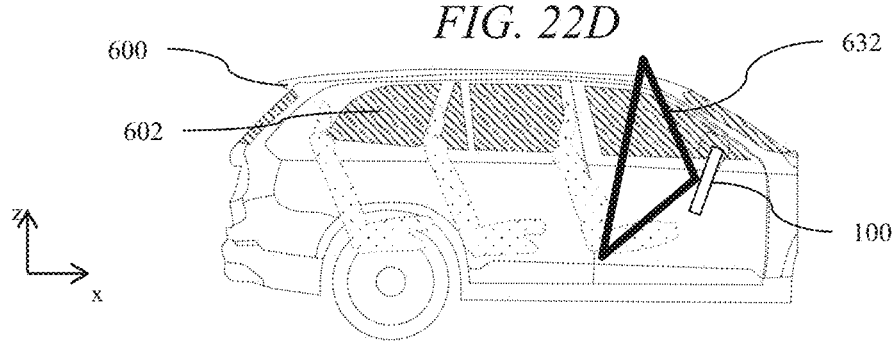
FIG. 22E is a schematic diagram illustrating in side view an automotive vehicle with a switchable directional display arranged within the vehicle cabin for day-time and/or sharing modes of operation.

FIG. 22D is a schematic diagram illustrating in top view an automotive vehicle with a switchable directional display such as that illustrated in FIG. 22B arranged within the vehicle cabin 602 for day-time and/or sharing modes of operation; and FIG. 22E is a schematic diagram illustrating in side view an automotive vehicle with a switchable directional display arranged within the vehicle cabin 602 for day-time and/or sharing modes of operation. Light cone 630, 632 is provided with a wide angular field of view and thus the display is advantageously visible by multiple occupants.

Figure 22F:
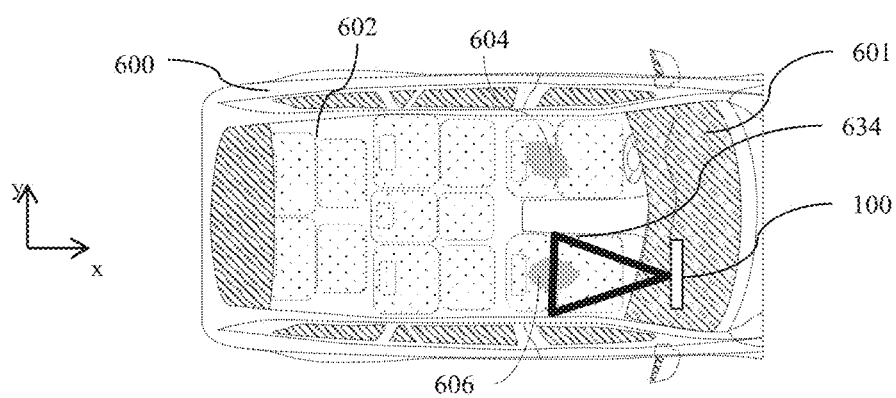
FIG. 22F is a schematic diagram illustrating in top view an automotive vehicle with a switchable directional display arranged within the vehicle cabin for night-time and/or entertainment modes of operation.
Figure 22G:
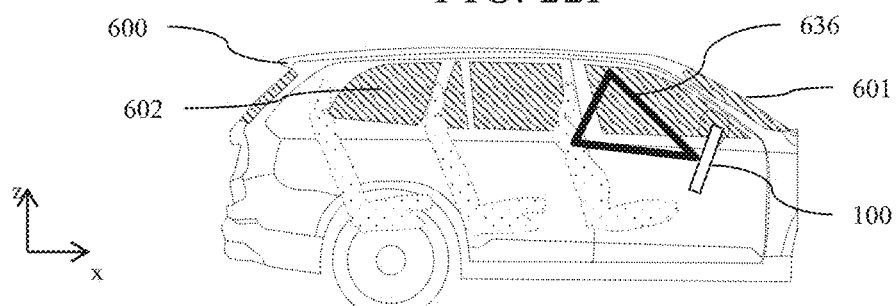
FIG. 22G is a schematic diagram illustrating in side view an automotive vehicle with a switchable directional display arranged within the vehicle cabin for night-time and/or entertainment modes of operation.

FIG. 22F is a schematic diagram illustrating in top view an automotive vehicle with a switchable directional display such as that illustrated in FIG. 22B arranged within the vehicle cabin 602 for night-time and/or entertainment modes of operation; FIG. 22G is a schematic diagram illustrating in side view an automotive vehicle with a switchable directional display arranged within the vehicle cabin 602 for night-time and/or entertainment modes of operation. Light cone 634, 636 is provided with a narrow angular field of view and thus the display is advantageously visible only by a single occupant. Advantageously stray light for night-time operation is reduced, increasing driver safety. Further, reflections of the display from windscreen 601 are reduced, minimising distraction to the driver 604.

It would be desirable to provide a reduced field of view for light cones that are provided by wide angle illumination backlights and emissive spatial light modulators and at low cost.

Figure 23A:
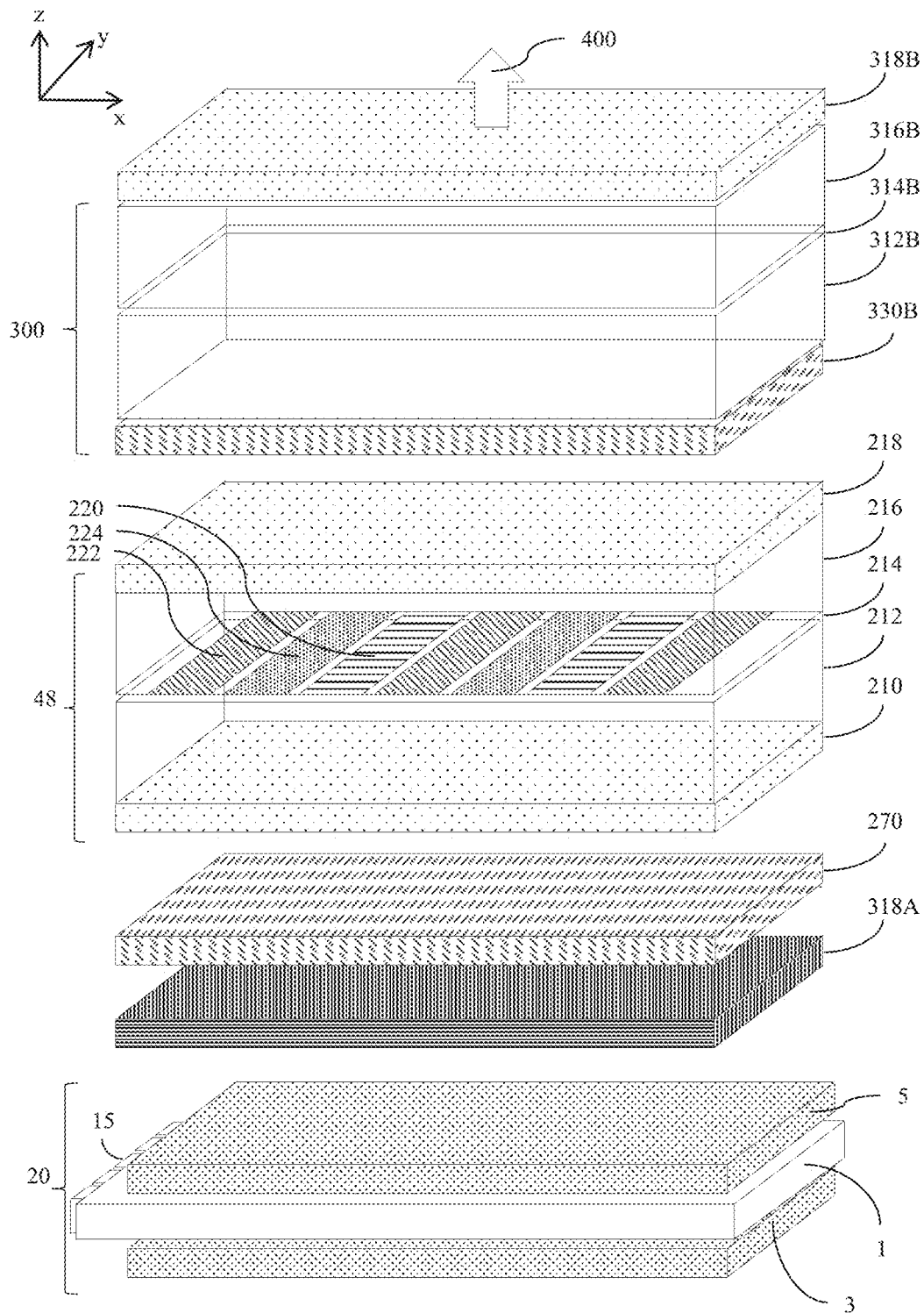
FIG. 23A is a schematic diagram illustrating in perspective side view an arrangement of a reflective additional polariser and a passive retarder arranged on the input of a liquid crystal display and a switchable compensated retarder and additional polariser arranged on the output of a liquid crystal display.

FIG. 23A is a schematic diagram illustrating in perspective side view an arrangement of a reflective additional polariser 318A and a passive retarder 270 arranged on the input of a spatial light modulator 48. On the output of the spatial light modulator 48, there are plural retarders 300 similar to those in the device of FIG. 22B. In comparison to the arrangement of FIG. 22B, passive retarder 270 is provided in place of the rear compensated switchable liquid crystal retarder 300A. Advantageously the cost and thickness is reduced, while achieving low off-axis illumination in privacy mode of operation and acceptable viewing angle in wide mode of operation.

Figure 23B:
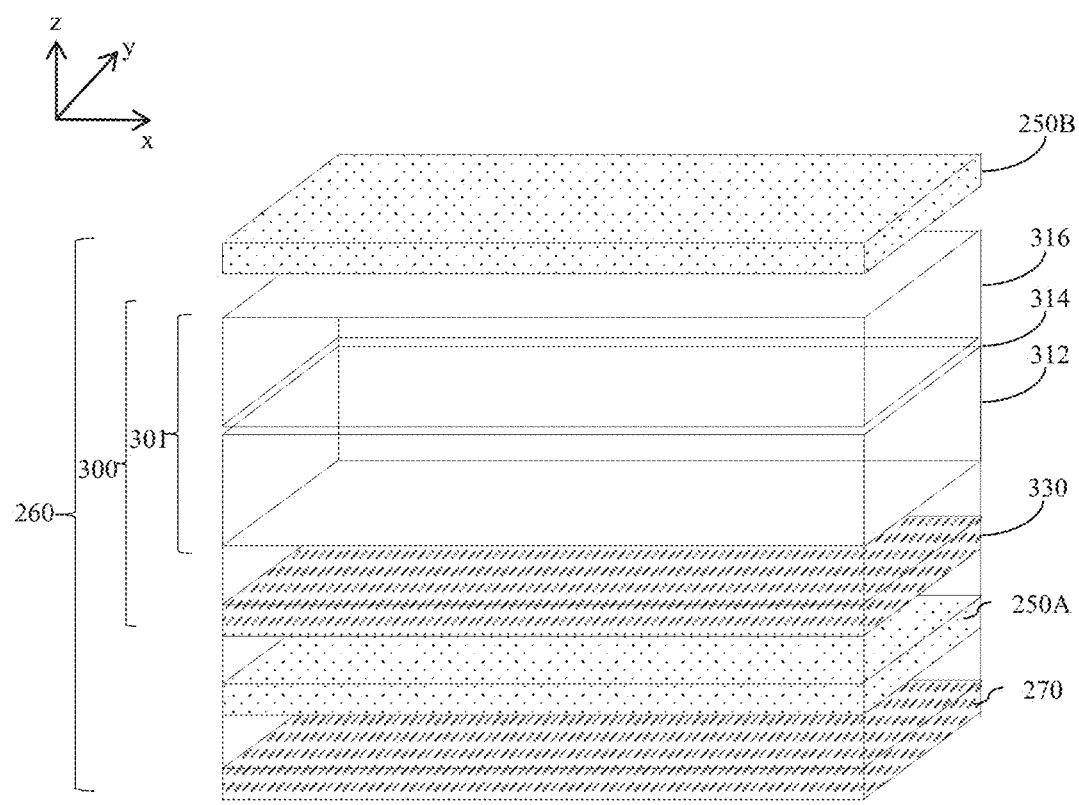
FIG. 23B is a schematic diagram illustrating in side perspective view a view angle control optical element comprising a passive retarder, a first control polariser, a passive compensation retarder, a switchable liquid crystal retarder and a second control polariser.

FIG. 23B is a schematic diagram illustrating in side perspective view a view angle control optical element comprising a passive retarder 270, a first control polariser 250A, a passive compensation retarder 330, a switchable liquid crystal retarder 301 and a second control polariser 250B. This arranged on front of a spatial light modulator 48 to provide a display device.

Various passive retarders 270 will now be described, any of which may be applied in any of the above devices.

Figure 24A:
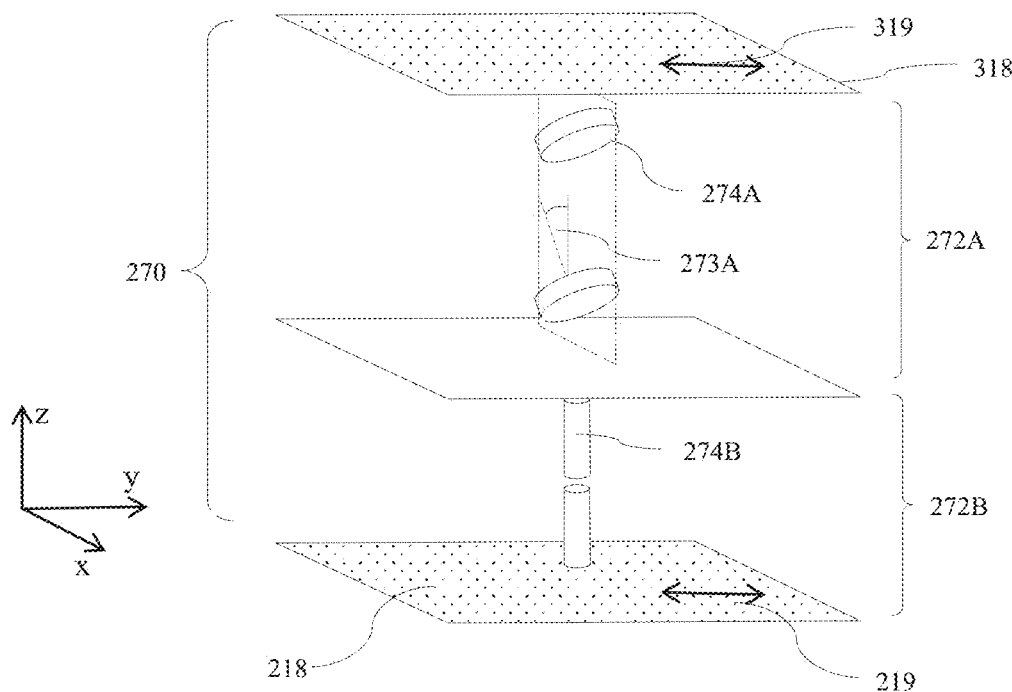
FIG. 24A is a schematic diagram illustrating in side perspective view an optical stack of a passive retarder comprising a negative O-plate tilted in a plane orthogonal to the display polariser electric vector transmission direction and a negative C-plate and arranged to provide field-of-view modification of a display device.
Figure 24B:
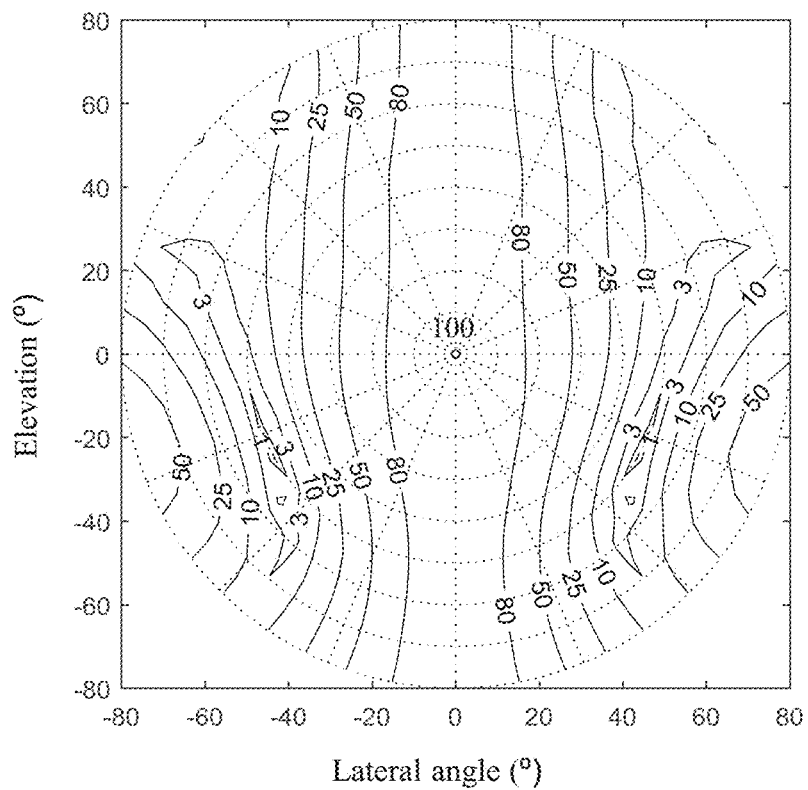
FIG. 24B is a schematic graph illustrating the variation of output transmission with polar direction for transmitted light rays in the passive retarder of FIG. 24A.

FIG. 24A is a schematic diagram illustrating in side perspective view an optical stack of a passive retarder 270 comprising a negative O-plate retarder 272A tilted in a plane orthogonal to the display polariser electric vector transmission direction and a negative C-plate retarder 272B and arranged to provide field-of-view modification of a display device; and FIG. 24B is a schematic graph illustrating the variation of output transmission with polar direction for transmitted light rays in the passive retarder of FIG. 24A, comprising the structure illustrated in TABLE 10.

TABLE 10

| | | | Passive retarder | | |
|---|---|---|---|---|---|
| FIGS. | Layer | Type | Out of plane angle/° | In plane angle/° | Δn.d/nm |
| 24A & 24B | 272A | Negative O | 65 | 90 | −550 |
| | 272B | Positive C | 90 | 0 | +500 |

The passive retarder 270 thus comprises a passive retarder 272A that is a negative O-plate which has an optical axis with a component in the plane of the passive retarder 272A and a component perpendicular to the plane of the passive retarder 272A. Further the component in the plane of the passive retarder extends at 90°, with respect to an electric vector transmission direction that is parallel to the electric vector transmission 219 of the display polariser 218. The passive retarder 272B comprises a passive retarder having an optical axis perpendicular to the plane of the passive retarder.

Advantageously luminance may be reduced for lateral viewing directions. A mobile display may be comfortably rotated about a horizontal axis while achieving privacy for off-axis snoopers in a lateral direction.

Figure 24C:
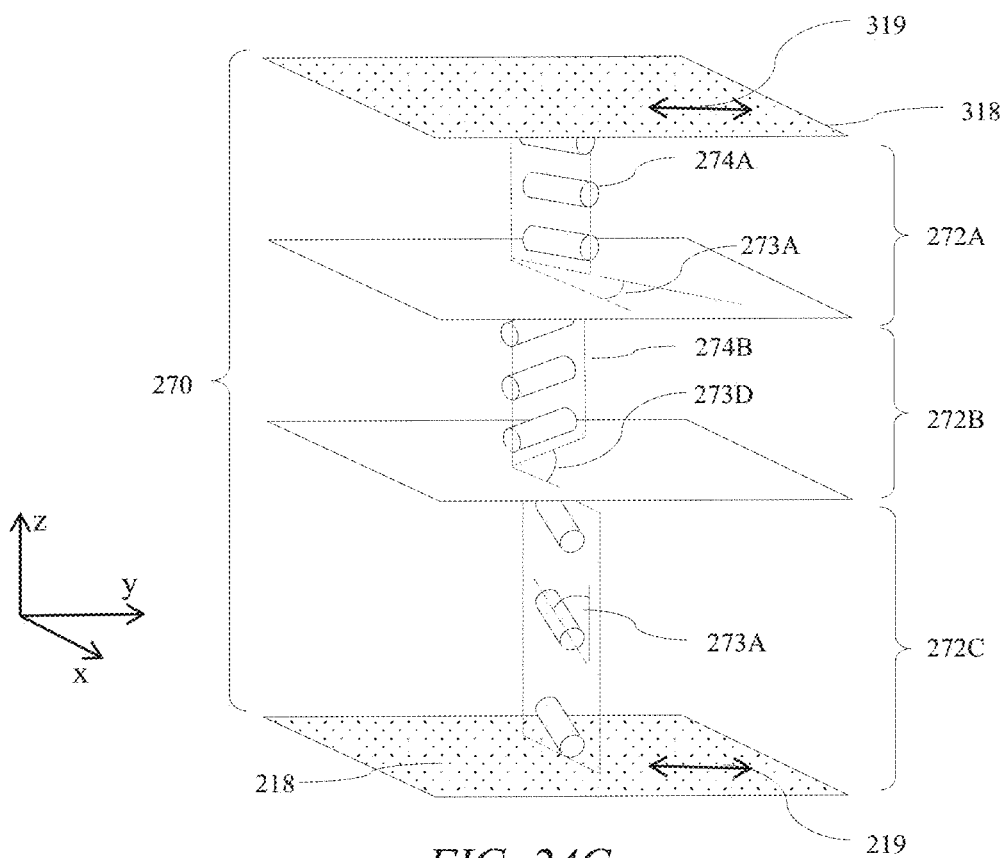
FIG. 24C is a schematic diagram illustrating in side perspective view an optical stack of a passive retarder comprising crossed A-plates and a positive O-plate.
Figure 24D:
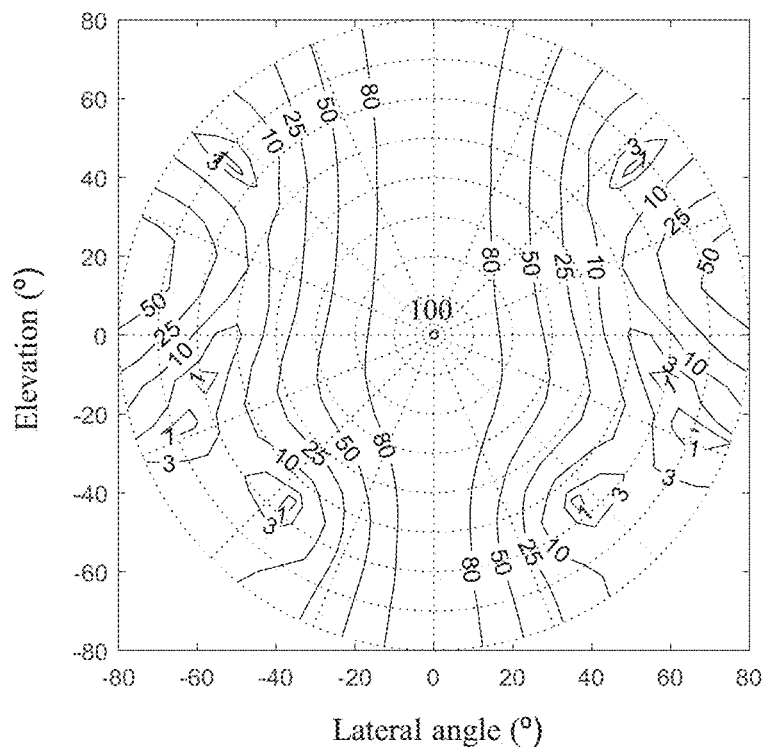
FIG. 24D is a schematic graph illustrating the variation of output transmission with polar direction for transmitted light rays in the passive retarder of FIG. 24C.

FIG. 24C is a schematic diagram illustrating in side perspective view an optical stack of a passive retarder 270 comprising crossed A-plates and a positive O-plate; and FIG. 24D is a schematic graph illustrating the variation of output transmission with polar direction for transmitted light rays in the passive retarder of FIG. 24C, comprising the structure illustrated in TABLE 11.

TABLE 11

| | | | Passive retarder | | |
|---|---|---|---|---|---|
| FIGS. | Layer | Type | Out of plane angle/° | In plane angle/° | Δn.d/nm |
| 24C & 24D | 272A | Positive A | 0 | 45 | +500 |
| | 272B | Positive A | 0 | 135 | +500 |
| | 272C | Positive O | 65 | 90 | +550 |

The passive retarder 270 thus comprises passive retarders 272A, 272B that are crossed A-plates and retarder 272C which has an optical axis with a component in the plane of the passive retarder 272C and a component perpendicular to the plane of the passive retarder 272C. The component in the plane of the passive retarder extends at 90°, with respect to an electric vector transmission direction that is parallel to the electric vector transmission 219 of the display polariser 218. Advantageously luminance may be reduced for lateral viewing directions. A mobile display may be comfortably rotated about a horizontal axis while achieving privacy for off-axis snoopers in a lateral direction.

It may be desirable to provide reduction of luminance in both lateral and elevation directions.

Figure 24E:
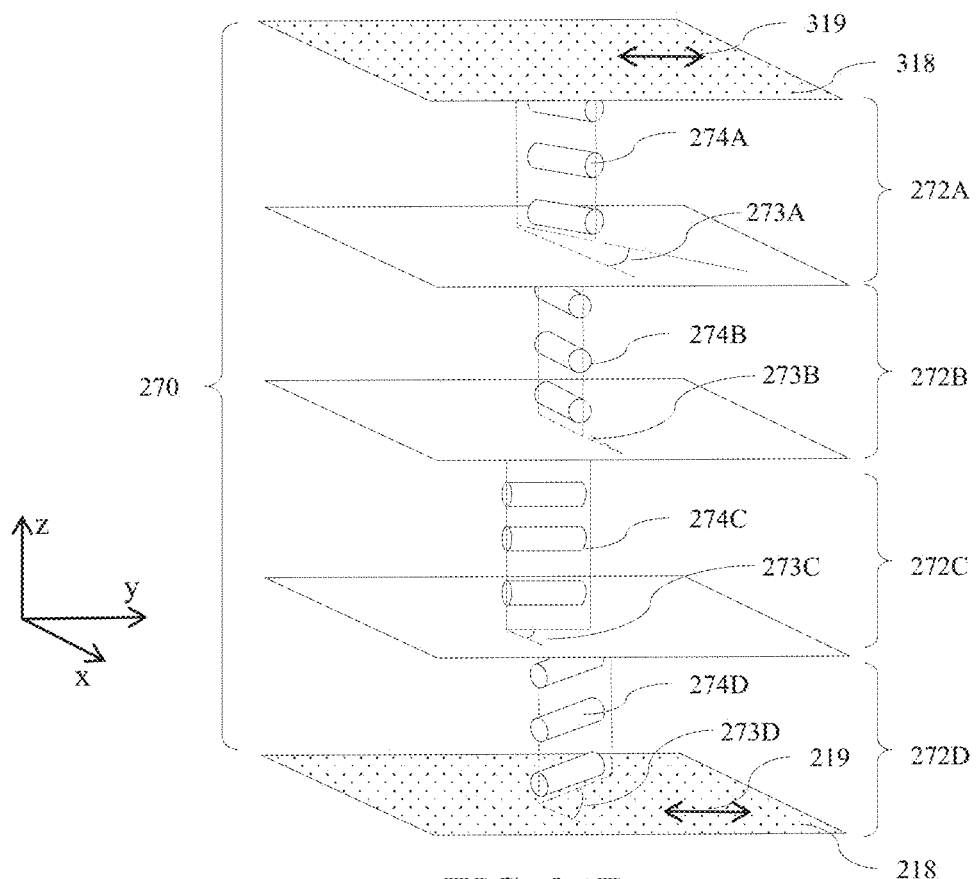
FIG. 24E is a schematic diagram illustrating in side perspective view an optical stack of a passive retarder comprising two pairs of crossed A-plates.
Figure 24F:
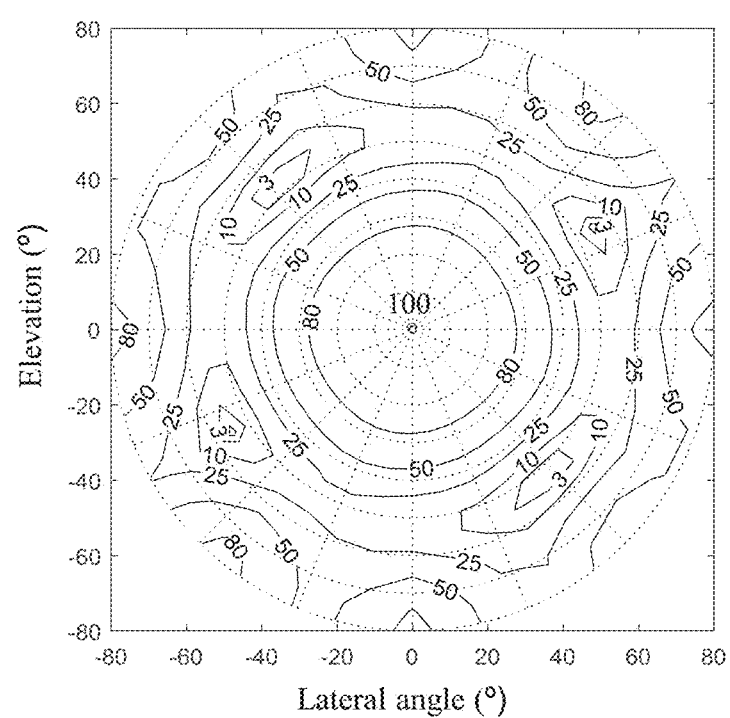
FIG. 24F is a schematic graph illustrating the variation of output transmission with polar direction for transmitted light rays in the passive retarder of FIG. 24E.

FIG. 24E is a schematic diagram illustrating in side perspective view an optical stack of a passive retarders 272A-D comprising two pairs of crossed A-plates; and FIG. 24F is a schematic graph illustrating the variation of output transmission with polar direction for transmitted light rays in the passive retarder of FIG. 24E, comprising the structure illustrated in TABLE 12.

TABLE 12

| | | | Passive control retarder | | |
|---|---|---|---|---|---|
| FIGS. | Layer | Type | Out of plane angle/° | In plane angle/° | Δn.d/nm |
| 24E, 24F | 272A | Positive A | 0 | 45 | 700 |
| | 272B | | | 90 | |
| | 272C | | | 0 | |
| | 272D | | | 135 | |

The retarder 270 thus comprises a pair of passive retarders 272A, 272D which have optical axes in the plane of the retarders that are crossed. The pair of retarders each comprise plural A-plates having respective optical axes aligned at different angles from each other. The pair of passive retarders 272B, 272C have optical axes that each extend at 900 and 0°, respectively, with respect to an electric vector transmission direction that is parallel to the electric vector transmission 211 of the display polariser 210.

The pair of passive retarders 272A, 272D have optical axes that extend at 45° and at 135°, respectively, with respect to an electric vector transmission direction 211 that is parallel to the electric vector transmission of the display polariser 218.

The display further comprises an additional pair of passive retarders 272B, 272C disposed between the first-mentioned pair of passive retarders 272A, 272D and which have optical axes in the plane of the retarders that are crossed. The additional pair of passive retarders 272B, 272C have optical axes that each extend at 0° and at 90°, respectively, with respect to an electric vector transmission direction 211, 317 that is parallel to the electric vector transmission of the display polariser 210, 316.

The retardance of each A-plate for light of a wavelength of 550 nm may be in a range from 600 nm to 850 nm, preferably in a range from 650 nm to 730 nm, and most preferably in a range from 670 nm to 710 nm. The color change of absorbed light from a central viewing location to an off-axis viewing location may be advantageously reduced.

In further illustrative embodiments, preferably the angle 273A is at least 40° and at most 50°, more preferably at least 42.5° and at most 47.5° and most preferably at least 44° and at most 46°. Preferably the angle 273D is at least 130° and at most 140°, more preferably at least 132.5° and at most 137.5° and most preferably at least 134° and at most 136°.

In further illustrative embodiments, the inner retarder pair 272B, 272C may have looser tolerances than the outer retarder pair 272A, 272D. Preferably the angle 273B is at least −10° and at most 10°, more preferably at least −5° and at most 5° and most preferably at least −2° and at most 2°. Preferably the angle 273C is at least 800 and at most 100°, more preferably at least 85° and at most 95° and most preferably at least 88° and at most 92°.

The present embodiment provides a transmission profile that has some rotational symmetry. Advantageously a privacy display may be provided with reduced visibility of image from a wide field of view for lateral or elevated viewing positions of a snooper. Further, such an arrangement may be used to achieve enhanced privacy operation for landscape and portrait operation of a mobile display. Such an arrangement may be provided in a vehicle to reduce stray light to off-axis passengers, and also to reduce light falling on windscreen and other glass surfaces in the vehicle.

It would be desirable to provide improved image appearance by means of adding camouflage to the private image seen by the snooper 47 in privacy mode of operation.

FIG. 25A is a schematic diagram illustrating in perspective side view an arrangement of a switchable retarder in a privacy mode of operation comprising a negative C-plate passive compensation retarder and homeotropically aligned switchable liquid crystal retarder further comprising a patterned electrode 415 layer. Thus the electrodes 415a, 415b, 415c are patterned to provide at least two pattern regions.

At least one of the electrodes 413, 415 may be patterned, in this example electrode 415 is patterned with regions 415a, 415b, 415c and driven by respective voltage drivers 350a, 350b, 350c with voltages Va, Vb, Vc. Gaps 417 may be provided between the electrode regions 415a, 415b, 415c. The tilt of the material 414a, 414b, 414c may thus be adjusted independently to reveal a camouflage pattern with different luminance levels for off-axis viewing.

Thus the switchable liquid crystal retarder arranged between the output display polariser 218 and the additional absorbing polariser 318 is controlled by means of addressing electrodes 415a, 415b, 415c and uniform electrode 413. The addressing electrodes may be patterned to provide at least two pattern regions comprising electrode 415a and gap 417.

FIG. 25B is a schematic diagram illustrating in perspective front view illumination of a primary viewer and a snooper by a camouflaged luminance controlled privacy display. Display device 100 may have dark image data 601 and white background data 603 that is visible to the primary viewer 45 in viewing window 26p. By way of comparison snooper 47 may see the camouflaged image as illustrated in FIG. 25C which is a schematic diagram illustrating in perspective side view illumination of a snooper by a camouflaged luminance controlled privacy display. Thus in white background regions 603, a camouflage structure may be provided that has mixed luminance of the white region 603. The pattern regions of the electrodes 415a, 415b, 415c are thus camouflage patterns. At least one of the pattern regions is individually addressable and is arranged to operate in a privacy mode of operation.

The pattern regions may be arranged to provide camouflage for multiple spatial frequencies by means of control of which patterns are provided during privacy mode of operation. In an illustrative example, a presentation may be provided with 20 mm high text. A camouflage pattern with similar pattern size may be provided with a first control of an electrode pattern. In a second example a photo may be provided with large area content that is most visible to a snooper 47. The spatial frequency of the camouflage pattern may be reduced to hide the larger area structures, by combining first and second electrode regions to provide the voltage and achieve a resultant lower spatial frequency pattern.

Advantageously a controllable camouflage structure may be provided by means of adjustment of the voltages Va, Vb, Vc across the layer 892. Substantially no visibility of the camouflage structure may be seen for head-on operation. Further the camouflage image may be removed by providing Va, Vb and Vc to be the same.

It would be desirable to provide off-axis luminance to snoopers with luminance that is for example less than 1%. Directional backlights that provide low off-axis luminance may be used together with the compensated switchable liquid crystal retarders of the present embodiments will now be described. Directional backlights will now be further described.

Similar patterning may be applied in any of the devices described herein.

It would be desirable to provide further reduction of off-axis luminance by means of directional illumination from the spatial light modulator 48. Directional illumination of the spatial light modulator 48 by directional backlights 20 will now be described.

Figure 26A:
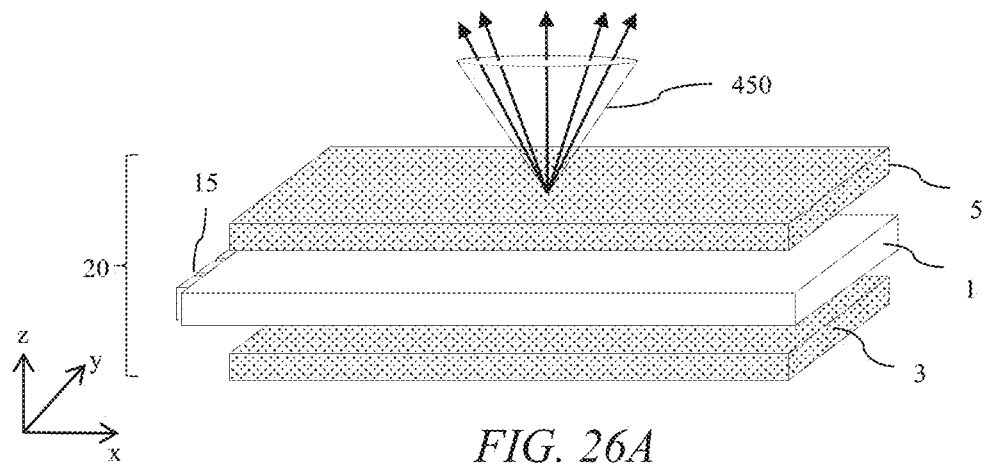
FIG. 26A is a schematic diagram illustrating in front perspective view a directional backlight.
Figure 26B:
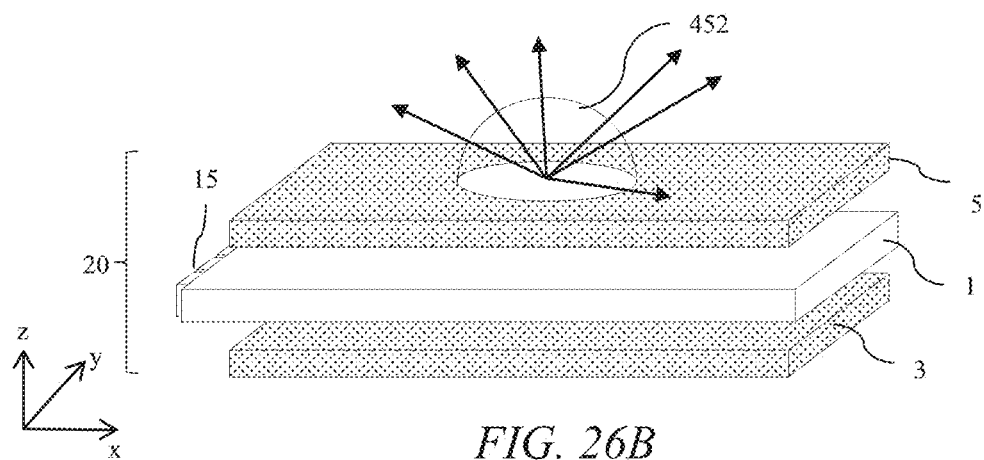
FIG. 26B is a schematic diagram illustrating in front perspective view a non-directional backlight.

FIG. 26A is a schematic diagram illustrating in front perspective view a directional backlight 20, and FIG. 26B is a schematic diagram illustrating in front perspective view a non-directional backlight 20, either of which may be applied in any of the devices described herein. Thus a directional backlight 20 as shown in FIG. 26A provides a narrow cone 450, whereas a non-directional backlight 20 as shown in FIG. 26B provides a wide angular distribution cone 452 of light output rays.

Figure 26C:
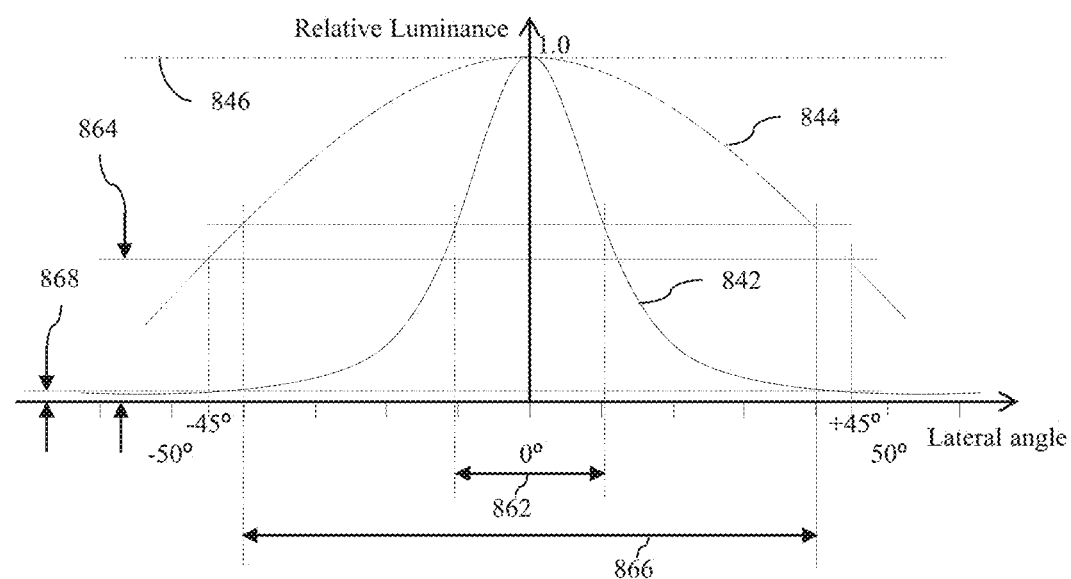
FIG. 26C is a schematic graph illustrating variation with luminance with lateral viewing angle of displays with different fields of view.

FIG. 26C is a schematic graph illustrating variation with luminance with lateral viewing angle for various different backlight arrangements. The graph of FIG. 26C may be a cross section through the polar field-of-view profiles described herein.

A Lambertian backlight has a luminance profile 846 that is independent of viewing angle.

A typical wide angle backlight has a roll-off at higher angles such that the full width half maximum 866 of relative luminance may be greater than 40°, preferably greater than 60° and most preferably greater than 80°. Further the relative luminance 864 at +/−45°, is preferably greater than 7.5%, more preferably greater than 10% and most preferably greater than 20%.

By way of comparison a directional backlight 20 has a roll-off at higher angles such that the full width half maximum 862 of relative luminance may be less than 60°, preferably less than 40° and most preferably less than 20°. Further the backlight 20 may provide a luminance at polar angles to the normal to the spatial light modulator 48 greater than 45 degrees that is at most 33% of the luminance along the normal to the spatial light modulator 48, preferably at most 20% of the luminance along the normal to the spatial light modulator 48, and most preferably at most 10% of the luminance along the normal to the spatial light modulator 48.

Scatter and diffraction in the spatial light modulator 48 may degrade privacy mode operation when the switchable retarder 300 is arranged between the input display polariser 210 and additional polariser 318. The luminance at polar angles to the normal to the spatial light modulator greater than 45 degrees may be increased in arrangements wherein the switchable retarder 300 is arranged between the output display polariser 218 and additional polariser 318 in comparison to arrangements wherein the switchable retarder 300 is arranged between the input display polariser 210 and additional polariser 318.

Advantageously lower off-axis luminance may be achieved for the arrangement of FIG. 1A in comparison to FIG. 2A for the same backlight 20.

In an illustrative embodiment of FIG. 1A, the luminance at polar angles to the normal to the spatial light modulator 48 greater than 45 degrees may be at most 18% whereas in an illustrative embodiment of FIG. 2A, the luminance at polar angles to the normal to the spatial light modulator 48 greater than 45 degrees may be at most 10%. Advantageously the embodiment of FIG. 1A may provide a wider viewing freedom in wide angle mode of operation while achieving similar viewing freedom to the embodiment of FIG. 2A in privacy mode of operation.

Such luminance profiles may be provided by the directional backlights 20 described below or may also be provided by wide angle backlights in combination with further additional polariser 318B and passive retarders 270 or additional compensated switching liquid crystal retarder 300B.

Figure 27A:
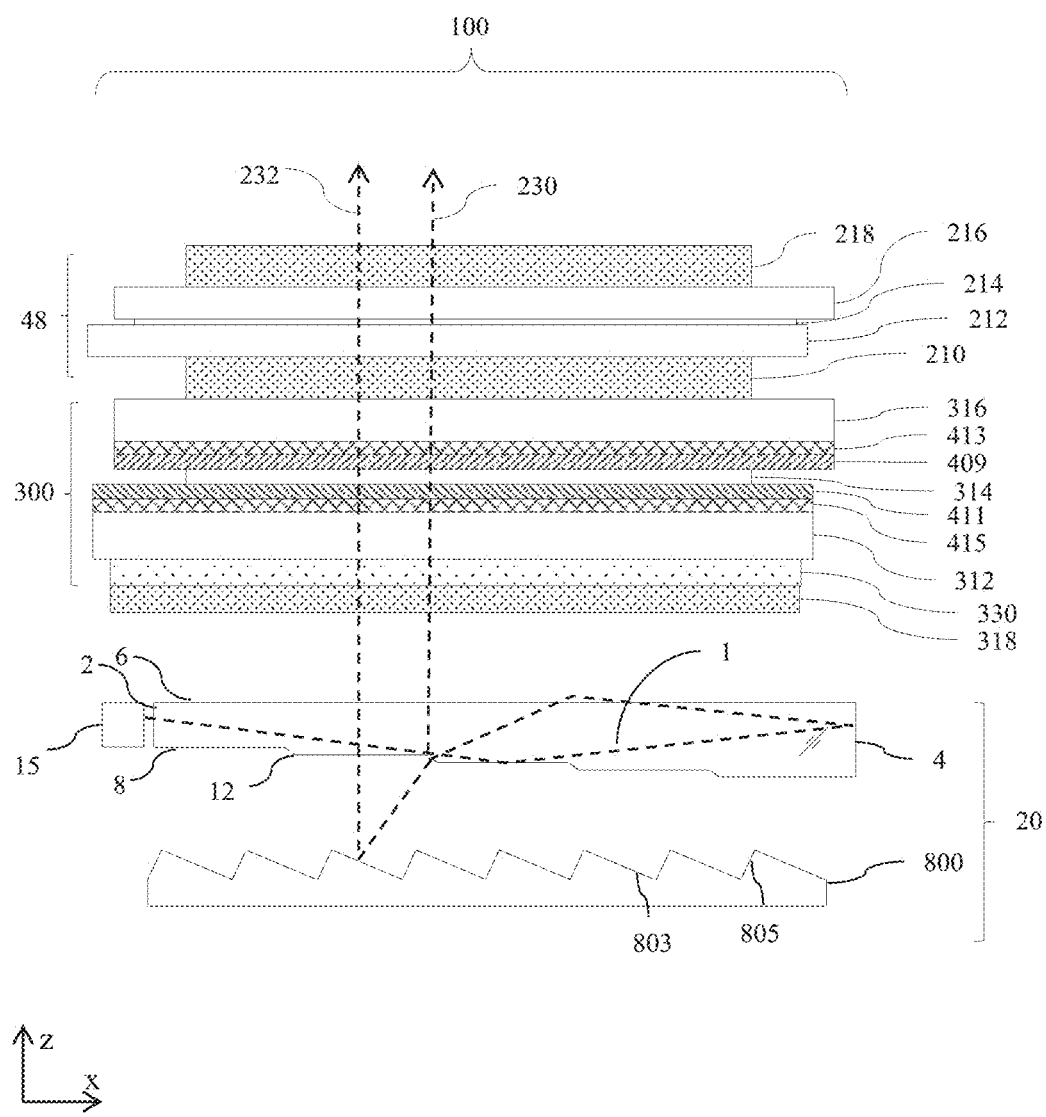
FIG. 27A is a schematic diagram illustrating in side view a switchable directional display apparatus comprising an imaging waveguide and switchable liquid crystal retarder.
Figure 27B:
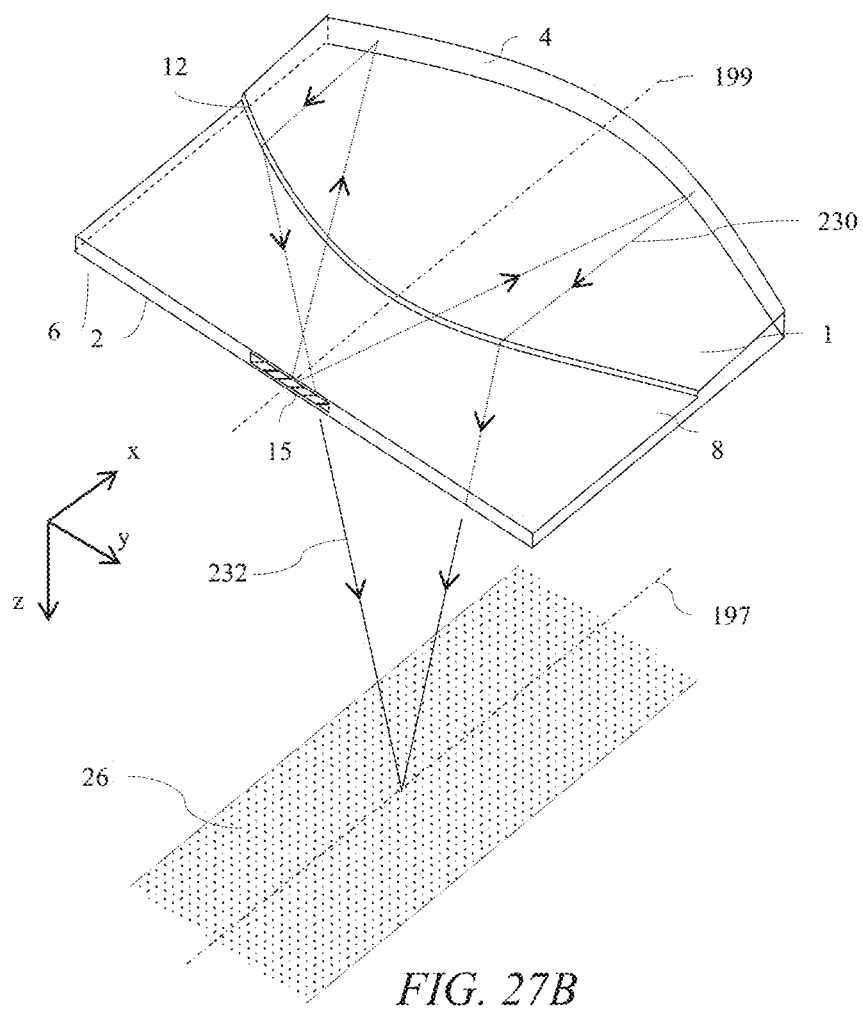
FIG. 27B is a schematic diagram illustrating in rear perspective view operation of an imaging waveguide in a narrow angle mode of operation.

FIG. 27A is a schematic diagram illustrating in side view a switchable directional display apparatus 100 comprising a switchable liquid crystal retarder 300 and backlight 20. The backlight 20 of FIG. 27A may be applied in any of the devices described herein and which comprises an imaging waveguide 1 illuminated by a light source array 15 through an input end 2. FIG. 27B which is a schematic diagram illustrating in rear perspective view operation of the imaging waveguide 1 of FIG. 27A in a narrow angle mode of operation.

The imaging waveguides 1 is of the type described in U.S. Pat. No. 9,519,153, which is herein incorporated by reference in its entirety. The waveguide 1 has an input end 2 extending in a lateral direction along the waveguide 1. An array of light sources 15 are disposed along the input end 2 and input light into the waveguide 1.

The waveguide 1 also has opposed first and second guide surfaces 6, 8 extending across the waveguide 1 from the input end 2 to a reflective end 4 for guiding light input at the input end 2 forwards and back along the waveguide 1. The second guide surface 8 has a plurality of light extraction features 12 facing the reflective end 4 and arranged to deflect at least some of the light guided back through the waveguide 1 from the reflective end 4 from different input positions across the input end 2 in different directions through the first guide surface 6 that are dependent on the input position.

In operation, light rays are directed from light source array 15 through an input end and are guided between first and second guiding surfaces 6, 8 without loss to a reflective end 4. Reflected rays are incident onto facets 12 and output by reflection as light rays 230 or transmitted as light rays 232. Transmitted light rays 232 are directed back through the waveguide 1 by facets 803, 805 of rear reflector 800. Operation of rear reflectors are described further in U.S. Pat. No. 10,054,732, which is herein incorporated by reference in its entirety.

As illustrated in FIG. 27B, optical power of the curved reflective end 4 and facets 12 provide an optical window 26 that is transmitted through the spatial light modulator 48 and has an axis 197 that is typically aligned to the optical axis 199 of the waveguide 1. Similar optical window 26 is provided by transmitted light rays 232 that are reflected by the rear reflector 800.

Figure 27C:
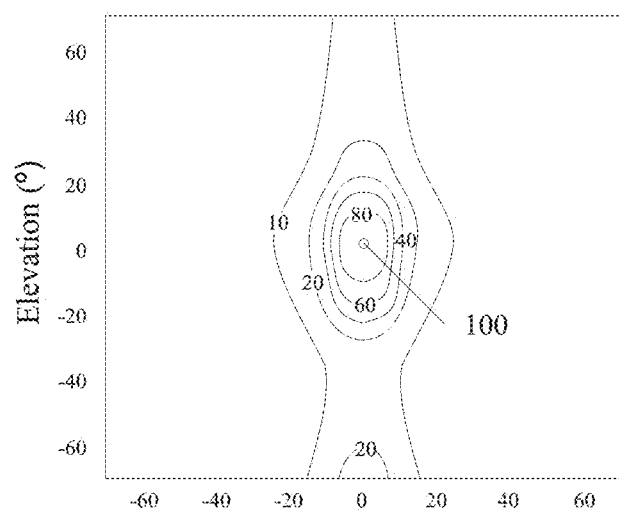
FIG. 27C is a schematic graph illustrating a field-of-view luminance plot of the output of FIG. 27B when used in a display apparatus with no switchable liquid crystal retarder.

FIG. 27C is a schematic graph illustrating field-of-view luminance plot of the output of FIG. 27B when used in a display apparatus with no switchable liquid crystal retarder.

Thus for off-axis viewing positions observed by snoopers 47 may have reduced luminance, for example between 1% and 3% of the central peak luminance at an elevation of 0 degrees and lateral angle of +/−45 degrees. Further reduction of off-axis luminance is achieved by the plural retarders 301, 330 of the present embodiments.

Another type of directional backlight with low off-axis luminance will now be described.

Figure 28A:
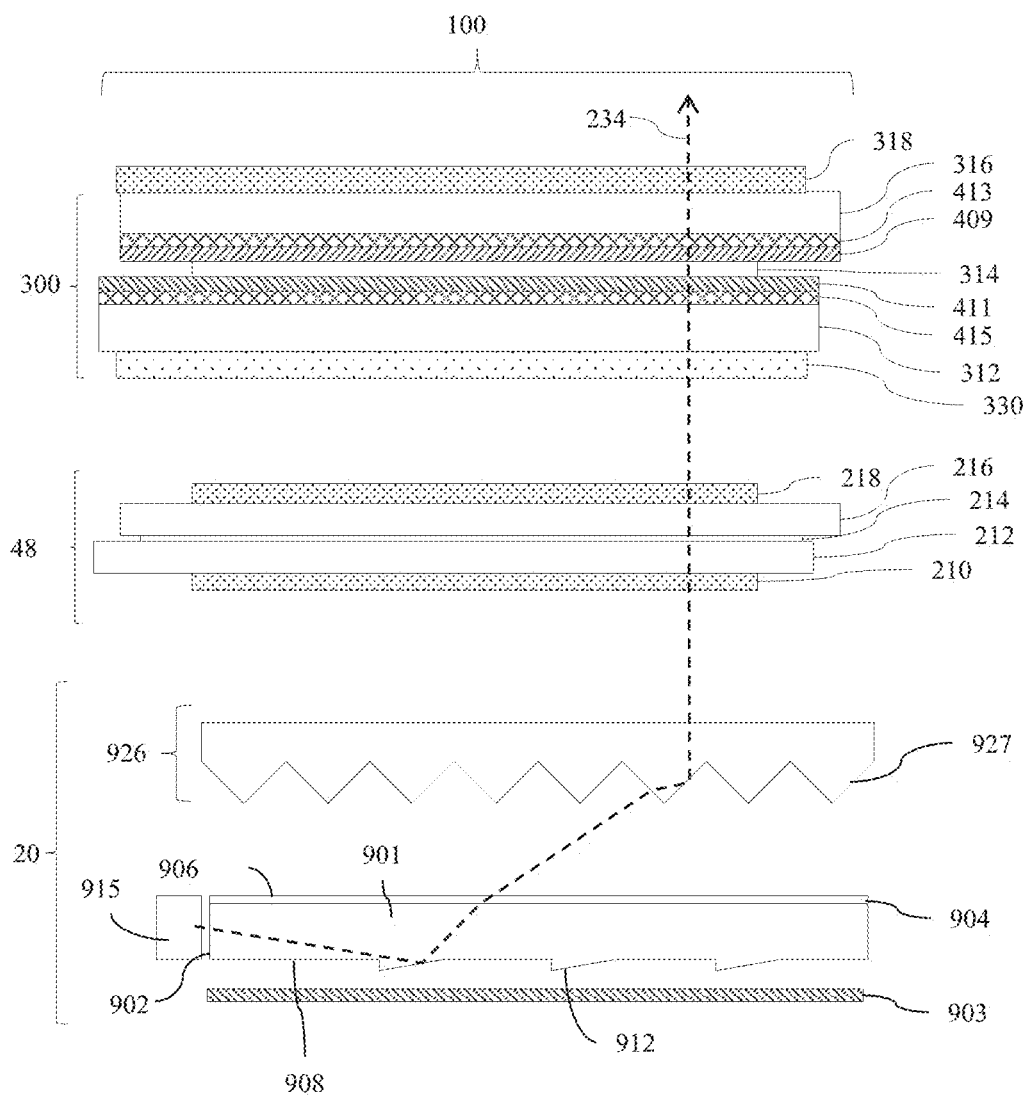
FIG. 28A is a schematic diagram illustrating in side view a switchable directional display apparatus comprising a switchable collimating waveguide and a switchable liquid crystal retarder operating in a privacy mode of operation.

FIG. 28A is a schematic diagram illustrating in side view a switchable directional display apparatus comprising a backlight 20 including a switchable collimating waveguide 901 and a switchable liquid crystal retarder 300 and additional polariser 318. The backlight 20 of FIG. 28A may be applied in any of the devices described herein and is arranged as follows.

The waveguide 901 has an input end 902 extending in a lateral direction along the waveguide 901. An array of light sources 915 are disposed along the input end 902 and input light into the waveguide 1. The waveguide 901 also has opposed first and second guide surfaces 906, 908 extending across the waveguide 1 from the input end 2 to a reflective end 4 for guiding light input at the input end 2 forwards and back along the waveguide 1. In operation, light is guided between the first and second guiding surface 906, 908.

The first guiding surface 906 may be provided with a lenticular structure 904 comprising a plurality of elongate lenticular elements 905 and the second guiding surface 908 may be provided with prismatic structures 912 which are inclined and act as light extraction features. The plurality of elongate lenticular elements 905 of the lenticular structure 904 and the plurality of inclined light extraction features deflect input light guided through the waveguide 901 to exit through the first guide surface 906.

A rear reflector 903 that may be a planar reflector is provided to direct light that is transmitted through the surface 908 back through the waveguide 901.

Output light rays that are incident on both the prismatic structures 912 and lenticular elements 905 of the lenticular structure 904 are output at angles close to grazing incidence to the surface 906. A prismatic turning film 926 comprising facets 927 is arranged to redirect output light rays 234 by total internal reflection through the spatial light modulator 48 and compensated switchable liquid crystal retarder 300.

Figure 28B:
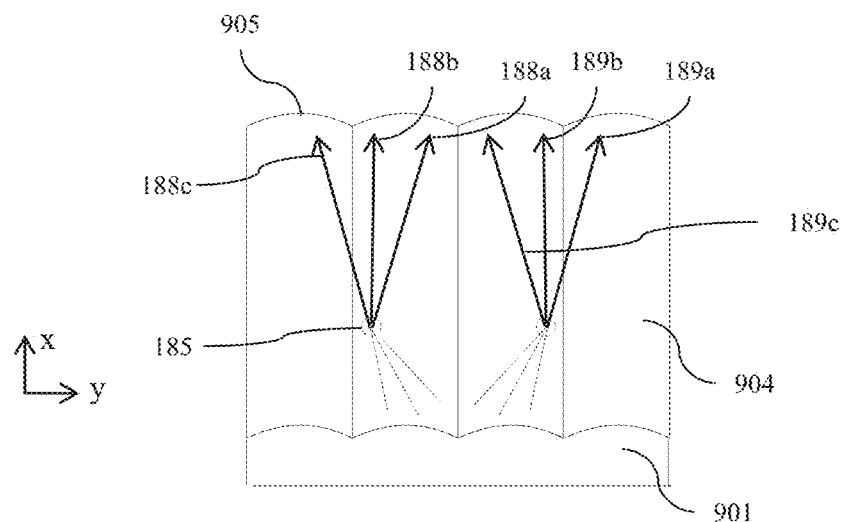
FIG. 28B is a schematic diagram illustrating in top view output of a collimating waveguide.

FIG. 28B is a schematic diagram illustrating in top view output of the collimating waveguide 901. Prismatic structures 912 are arranged to provide light at angles of incidence onto the lenticular structure 904 that are below the critical angle and thus may escape. On incidence at the edges of a lenticular surface, the inclination of the surface provides a light deflection for escaping rays and provides a collimating effect. Light ray 234 may be provided by light rays 188$a$-$c$ and light rays 189$a$-$c$, with incidence on locations 185 of the lenticular structure 904 of the collimated waveguide 901.

Figure 28C:
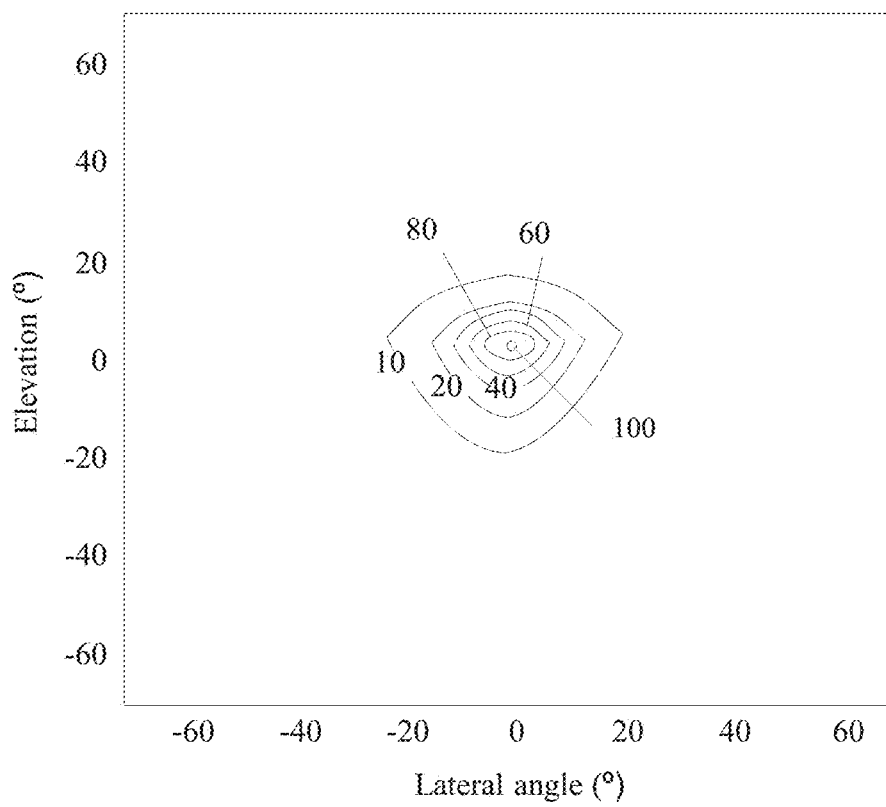
FIG. 28C is a schematic graph illustrating an iso-luminance field-of-view polar plot for the display apparatus of FIG. 28A.

FIG. 28C is a schematic graph illustrating an iso-luminance field-of-view polar plot for the display apparatus of FIG. 28A. Thus a narrow output light cone may be provided, with size determined by the structures 904, 912 and the turning film 926.

Advantageously in regions in which snoopers may be located with lateral angles of 45 degrees or greater for example, the luminance of output from the display is small, typically less than 2%. It would be desirable to achieve further reduction of output luminance. Such further reduction is provided by the compensated switchable liquid crystal retarder 300 and additional polariser 318 as illustrated in FIG. 28A. Advantageously a high performance privacy display with low off-axis luminance may be provided over a wide field of view.

Directional backlights such as the types described in FIG. 27A and FIG. 28A together with the plural retarders 301, 330 of the present embodiments may achieve off-axis luminance of less than 1.5%, preferably less than 0.75% and most preferably less than 0.5% may be achieved for typical snooper 47 locations. Further, high on-axis luminance and uniformity may be provided for the primary user 45. Advantageously a high performance privacy display with low off-axis luminance may be provided over a wide field of view, that may be switched to a wide angle mode by means of control of the switchable retarder 301 by means of control system 352 illustrated in FIG. 1A.

The operation of retarder layers between parallel polarisers for off-axis illumination will now be described further. In the various devices described above, retarders are arranged between a pair of polarisers (typically the additional polariser 318 and one of the input polariser 210 and output polariser 218) in various different configurations. In each case, the retarders are configured so that they not affect the luminance of light passing through the pair of polarisers and the plural retarders along an axis along a normal to the plane of the retarders but they do reduce the luminance of light passing through the pair of polarisers and the plural retarders along an axis inclined to a normal to the plane of the retarders, at least in one of the switchable states of the compensated switchable retarder 300. There will now be given a description of this effect in more detail, the principles of which may be applied in general to all of the devices described above.

Figure 29A:
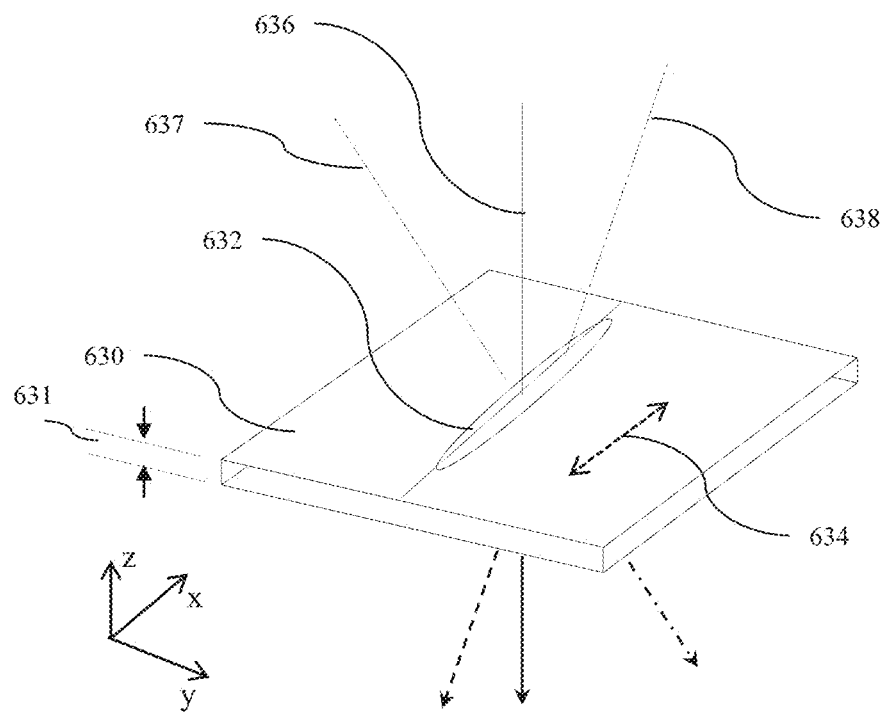
FIG. 29A is a schematic diagram illustrating in perspective view illumination of a retarder layer by off-axis light.

FIG. 29A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 29B:
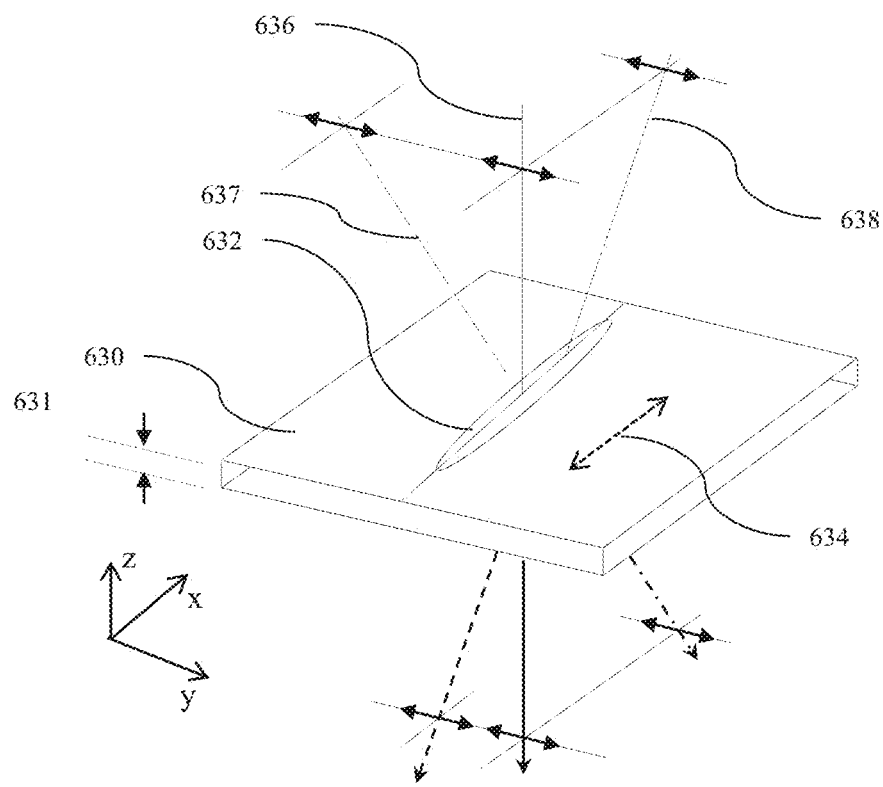
FIG. 29B is a schematic diagram illustrating in perspective view illumination of a retarder layer by off-axis light of a first linear polarization state at 0 degrees.
Figure 29C:
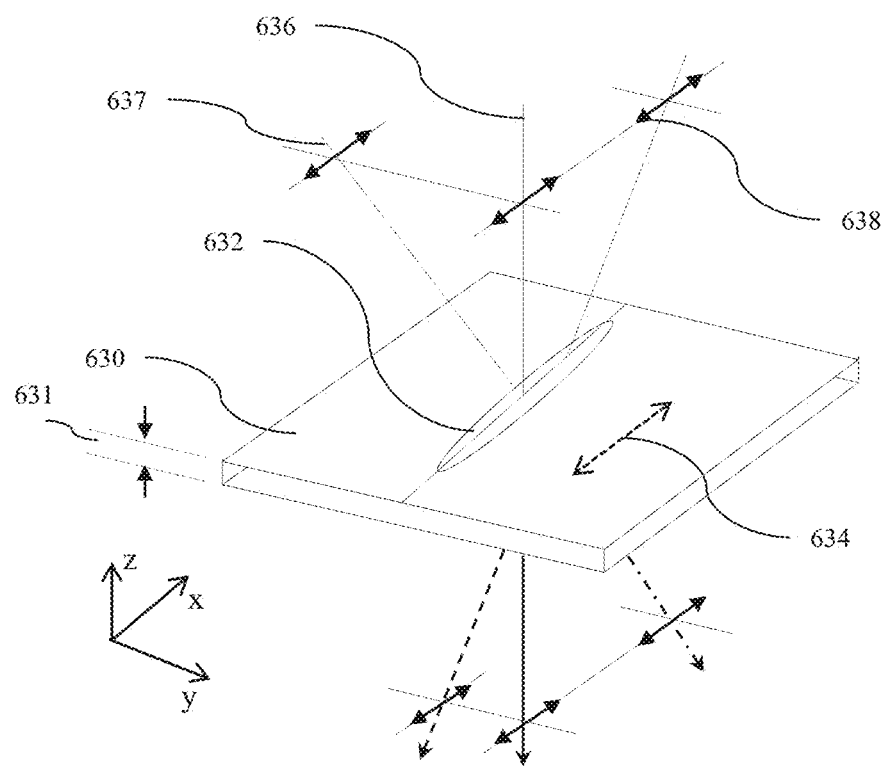
FIG. 29C is a schematic diagram illustrating in perspective view illumination of a retarder layer by off-axis light of a first linear polarization state at 90 degrees.

FIG. 29B is a schematic diagram illustrating in perspective view illumination of a retarder layer by off-axis light of a third linear polarization state at 90 degrees to the x-axis and FIG. 29C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by a switchable liquid crystal retarder and by plural retarders in the devices described above.

Figure 29D:
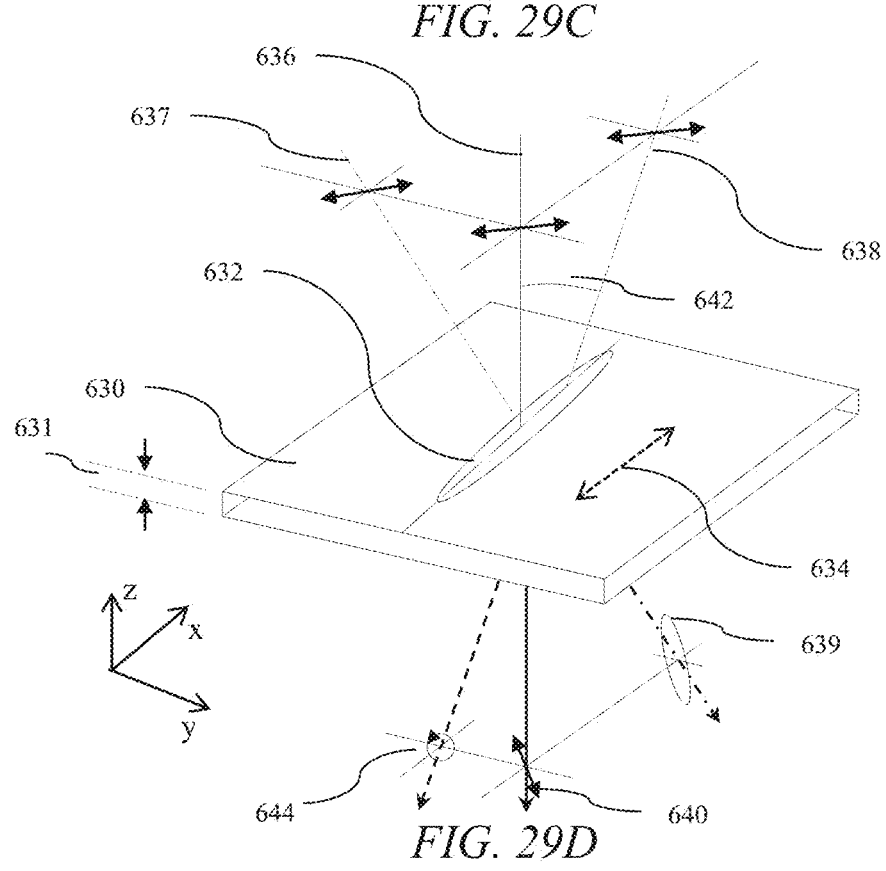
FIG. 29D is a schematic diagram illustrating in perspective view illumination of a retarder layer by off-axis light of a first linear polarization state at 45 degrees.

FIG. 29D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 29D relates to the retarder 630 that is passive, a similar effect is achieved by a switchable liquid crystal retarder, and in the plural retarders described above, in a switchable state of the switchable liquid crystal retarder corresponding to the privacy mode.

To illustrate the off-axis behavior of retarder stacks, the angular luminance control of C-plates 308A, 308B between an additional polariser 318 and output display polariser 218 will now be described for various off-axis illumination arrangements with reference to the operation of a C-plate 560 between the parallel polarisers 500, 210.

Figure 30A:
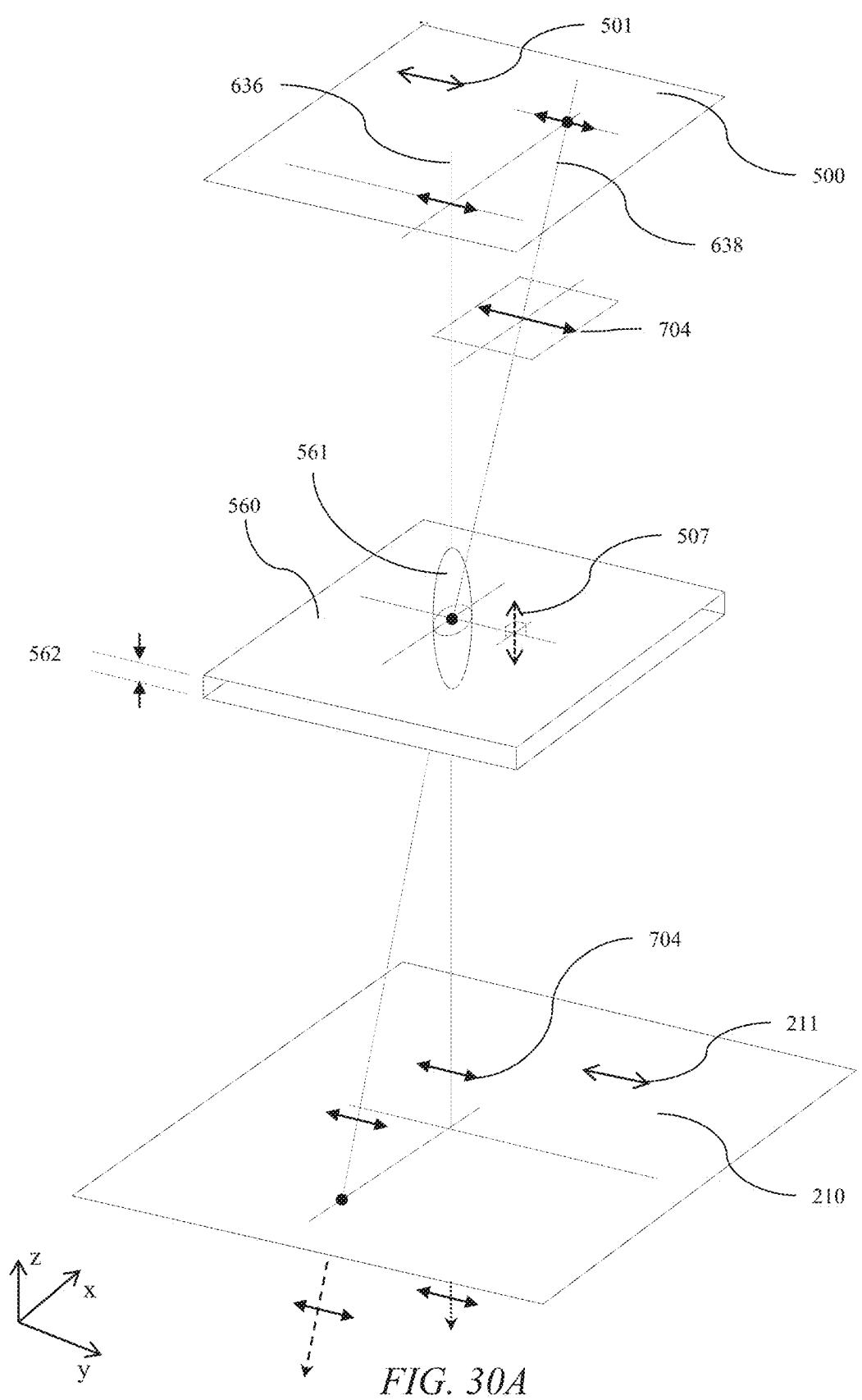
FIG. 30A is a schematic diagram illustrating in perspective view illumination of a C-plate retarder by off-axis polarised light with a positive elevation.

FIG. 30A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder comprises a retarder 560 having an optical axis 561 perpendicular to the plane of the retarder 560, that is the x-y plane. The retarder 560 having an optical axis perpendicular to the plane of the retarder comprises a C-plate.

Figure 30B:
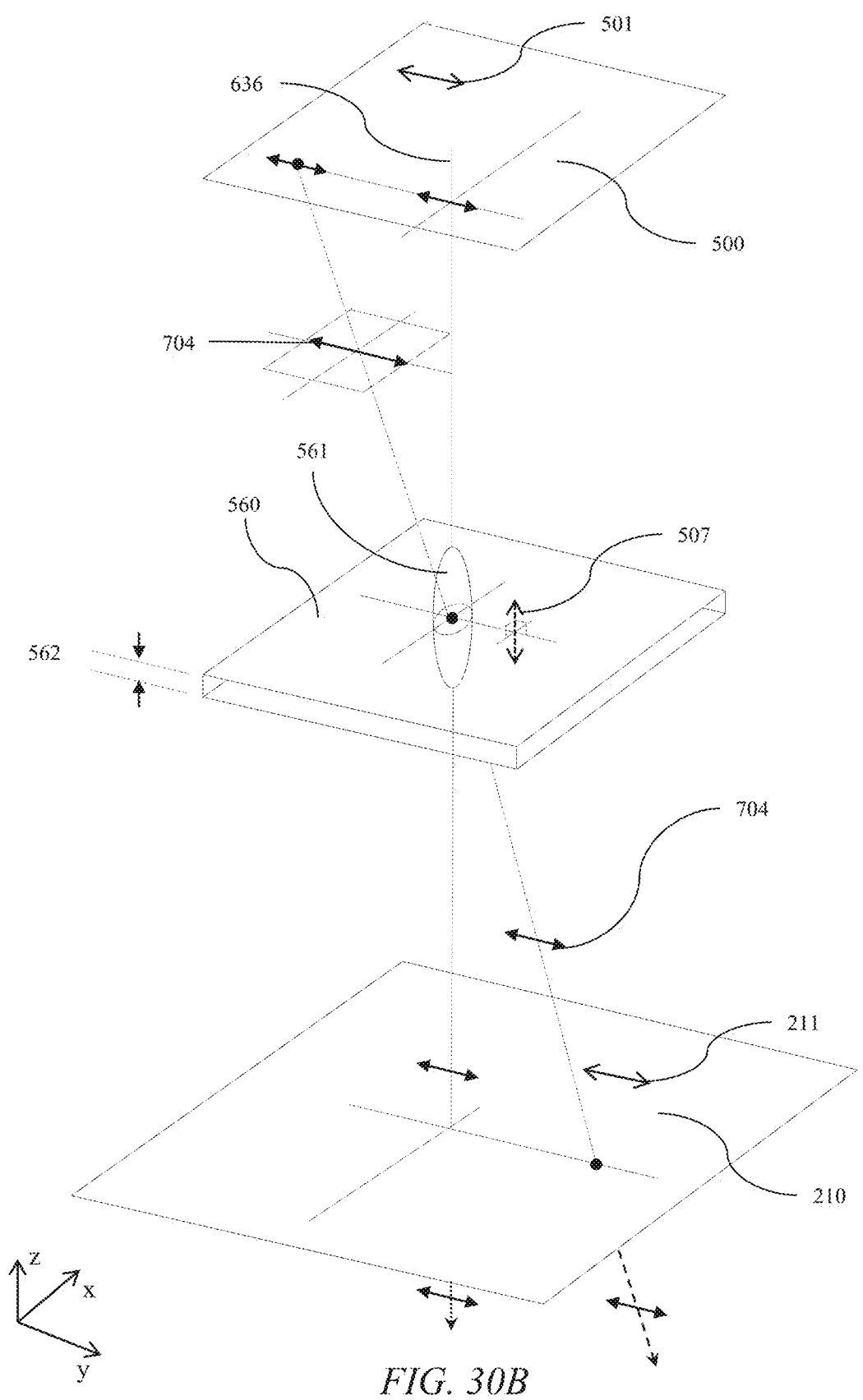
FIG. 30B is a schematic diagram illustrating in perspective view illumination of a C-plate retarder by off-axis polarised light with a negative lateral angle.

FIG. 30B is a schematic diagram illustrating in perspective view illumination of a C-plate layer by off-axis polarised light with a negative lateral angle. As with the arrangement of FIG. 30A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560. Although FIGS. 29A-C relate specifically to the retarder 560 that is passive, a similar effect is achieved by a switchable liquid crystal retarder and by plural retarders in the devices described above.

Figure 30C:
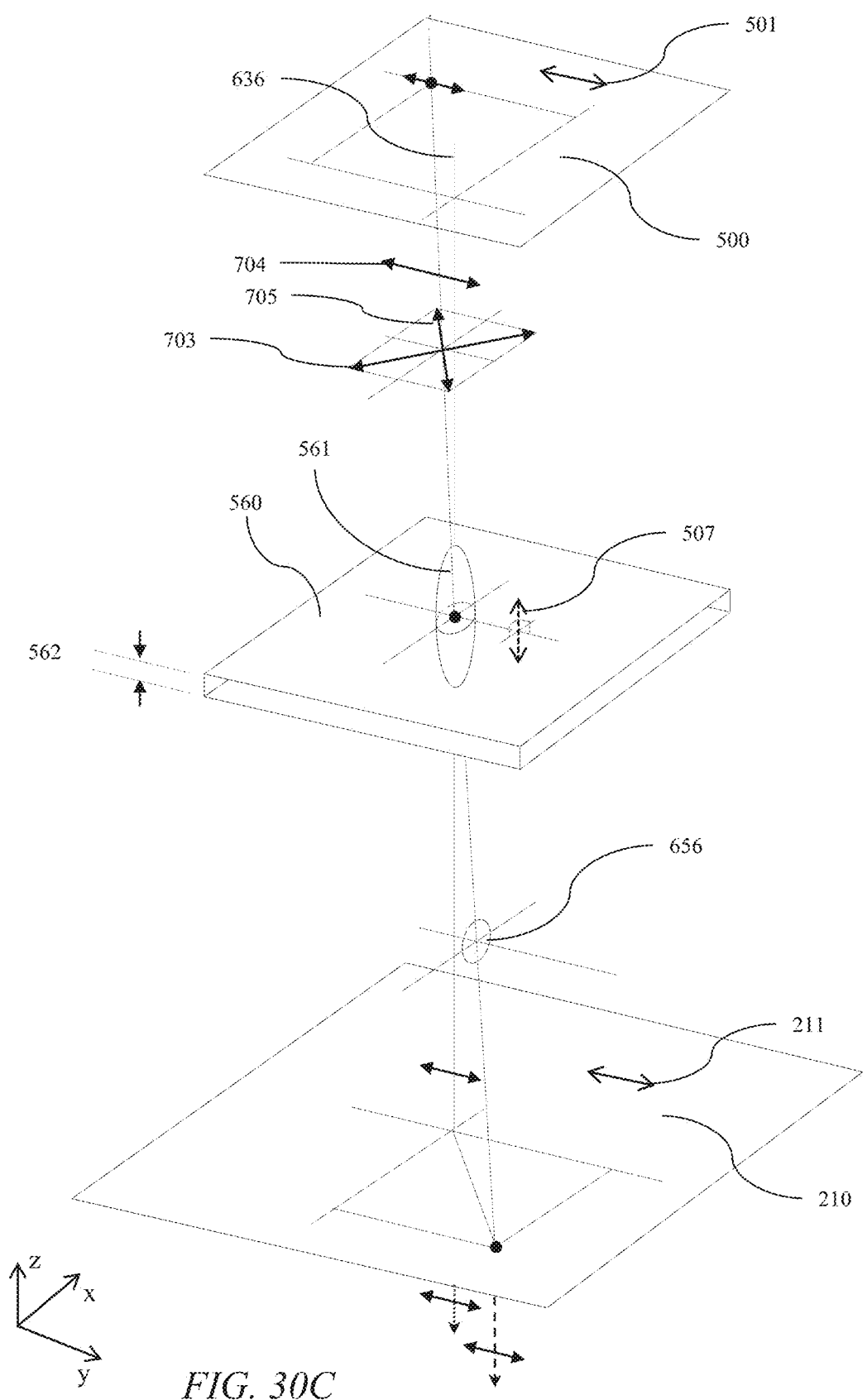
FIG. 30C is a schematic diagram illustrating in perspective view illumination of a C-plate retarder by off-axis polarised light with a positive elevation and negative lateral angle.

FIG. 30C is a schematic diagram illustrating in perspective view illumination of a C-plate layer by off-axis polarised light with a positive elevation and negative lateral angle. In comparison to the arrangement of FIGS. 30A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 30A-B.

Figure 30D:
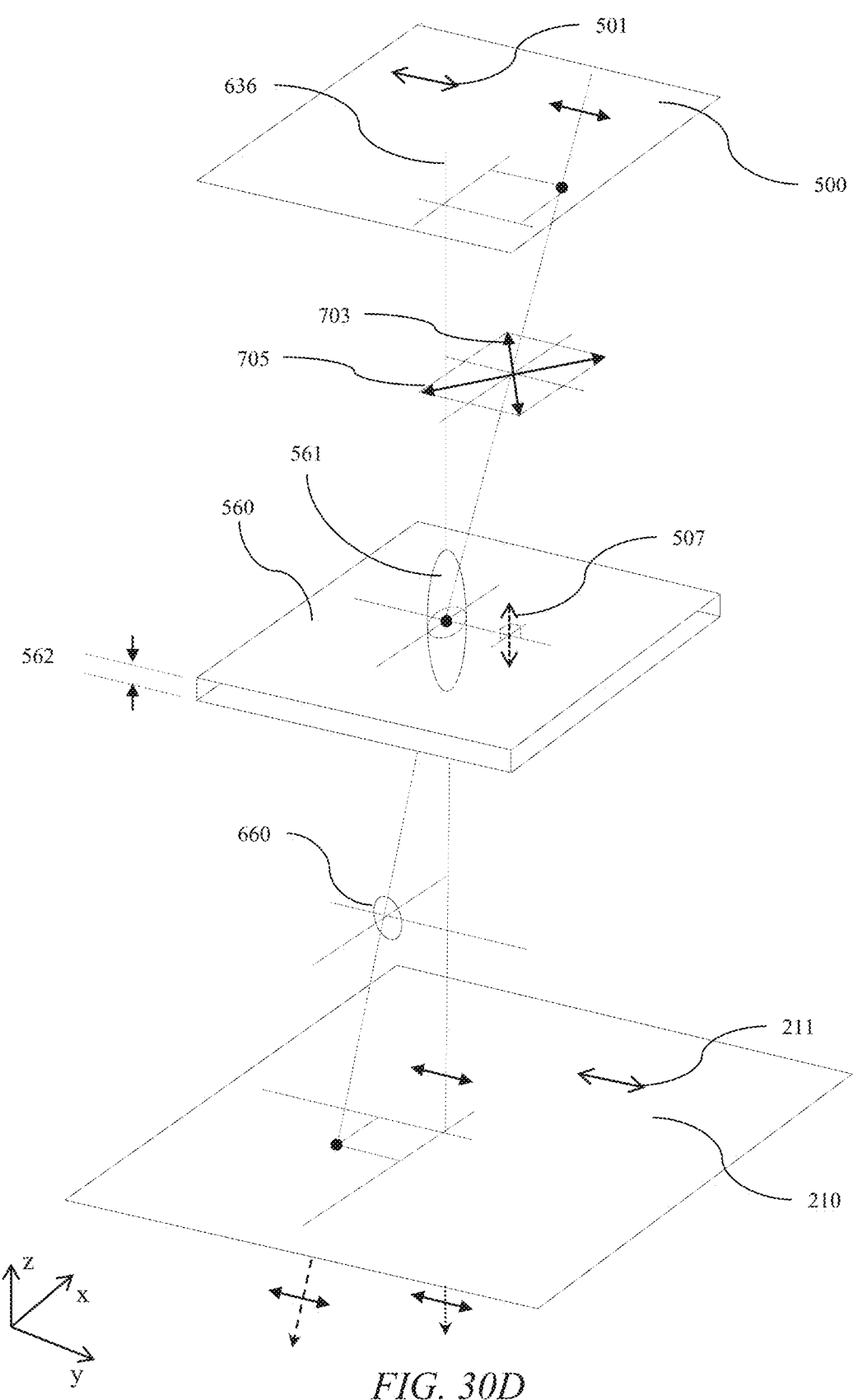
FIG. 30D is a schematic diagram illustrating in perspective view illumination of a C-plate retarder by off-axis polarised light with a positive elevation and positive lateral angle.
Figure 30E:
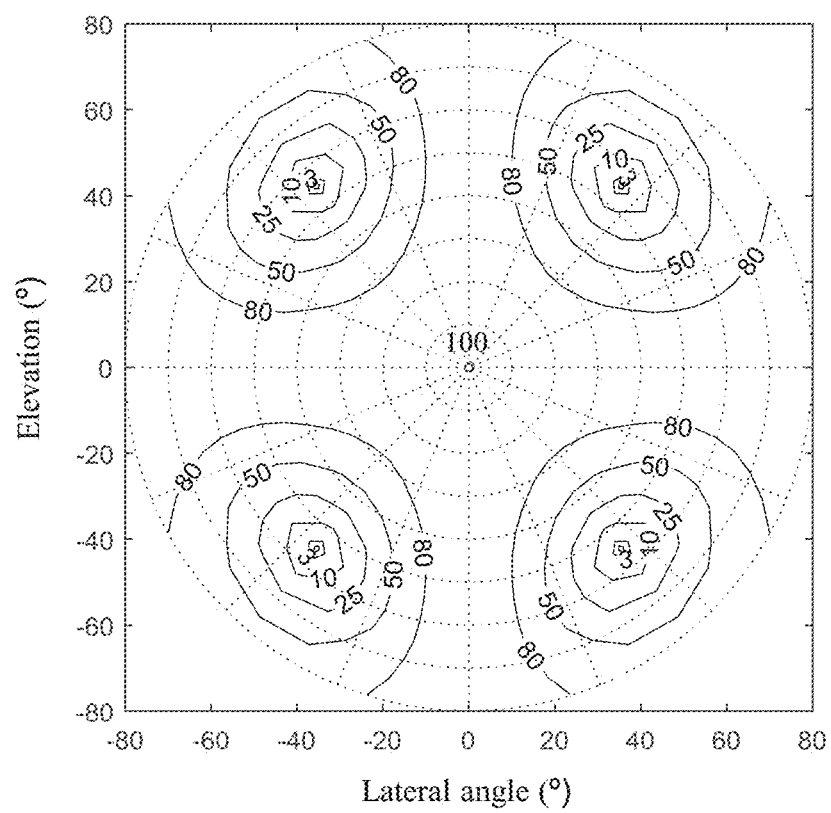
FIG. 30E is a schematic graph illustrating the variation of output transmission with polar direction for transmitted light rays in FIGS. 30A-D.

FIG. 30D is a schematic diagram illustrating in perspective view illumination of a C-plate layer by off-axis polarised light with a positive elevation and positive lateral angle. In a similar manner to FIG. 30C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560. Although FIG. 29D relates to the retarder 560 that is passive, a similar effect is achieved by a switchable liquid crystal retarder, and in the plural retarders described above, in a switchable state of the switchable liquid crystal retarder corresponding to the privacy mode FIG. 30E is a schematic graph illustrating the variation of output transmission with polar direction for transmitted light rays in FIGS. 30A-D. Thus, the C-plate may provide luminance reduction in polar quadrants. In combination with switchable liquid crystal retarder 301 described elsewhere herein, (i) removal of luminance reduction of the C-plate may be provided in a first wide angle state of operation, and (ii) extended polar region for luminance reduction may be achieved in a second privacy state of operation.

To illustrate the off-axis behavior of retarder stacks, the angular luminance control of crossed A-plates 308A, 308B between an additional polariser 318 and output display polariser 218 will now be described for various off-axis illumination arrangements.

Figure 31A:
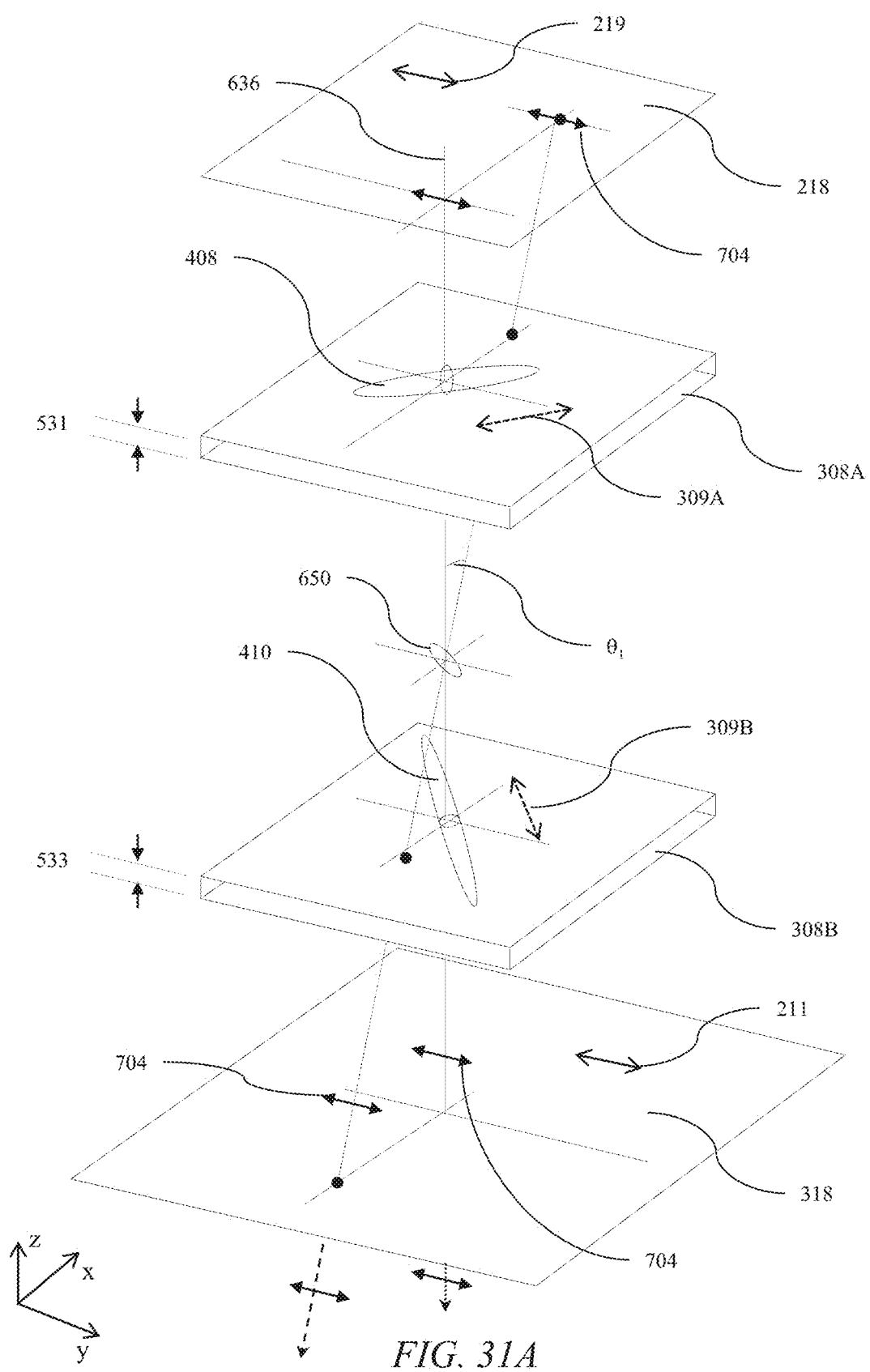
FIG. 31A is a schematic diagram illustrating in perspective view illumination of crossed A-plate retarder layers by off-axis polarised light with a positive elevation.

FIG. 31A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 31A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 31B:
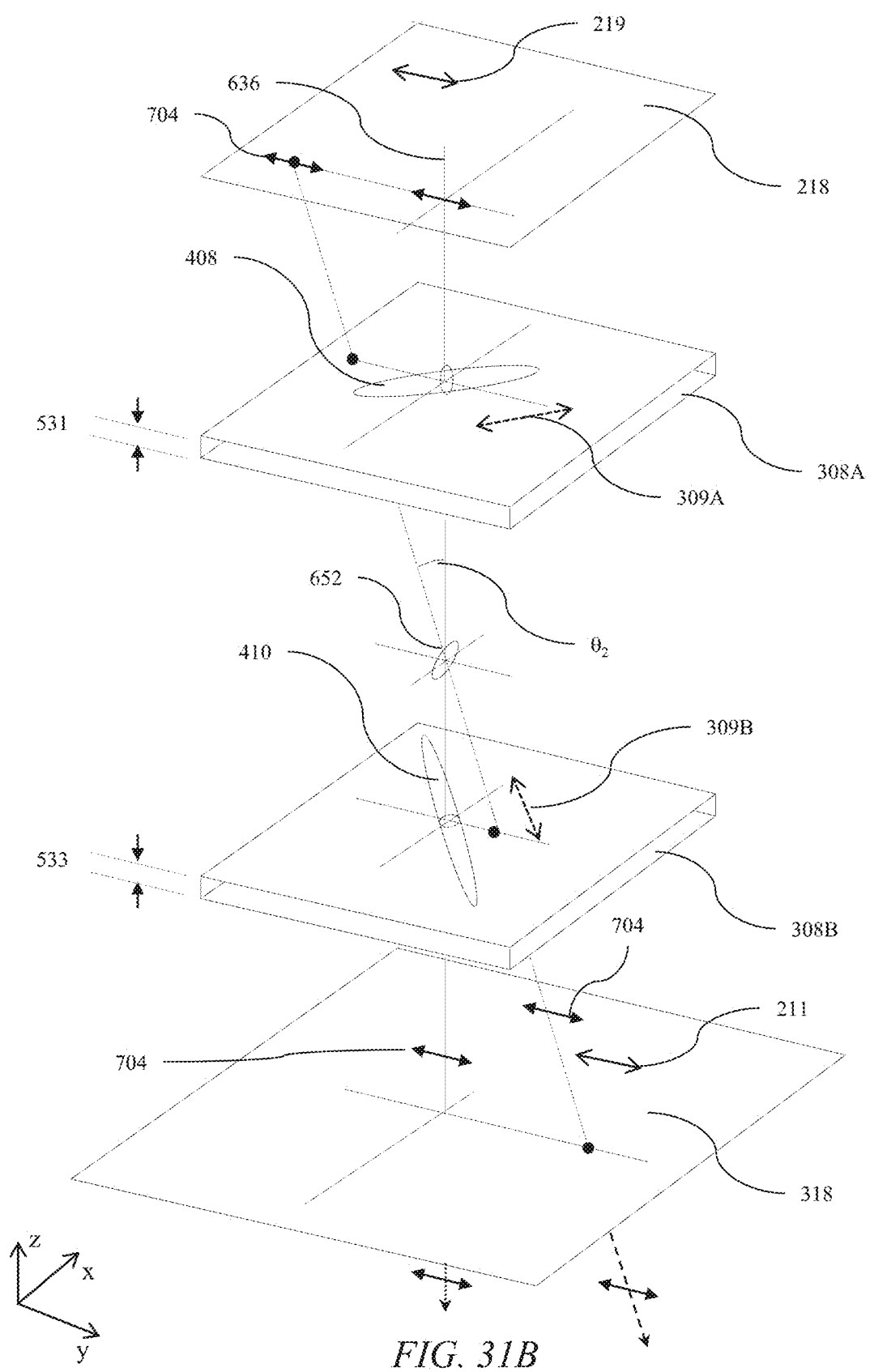
FIG. 31B is a schematic diagram illustrating in perspective view illumination of crossed A-plate retarder layers by off-axis polarised light with a negative lateral angle.

FIG. 31B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 450 with respect to an electric vector transmission direction that is parallel to the electric vector transmission of the polariser 318.

Advantageously substantially no losses are provided for light rays that have zero elevation angular component so that full transmission efficiency is achieved.

Figure 31C:
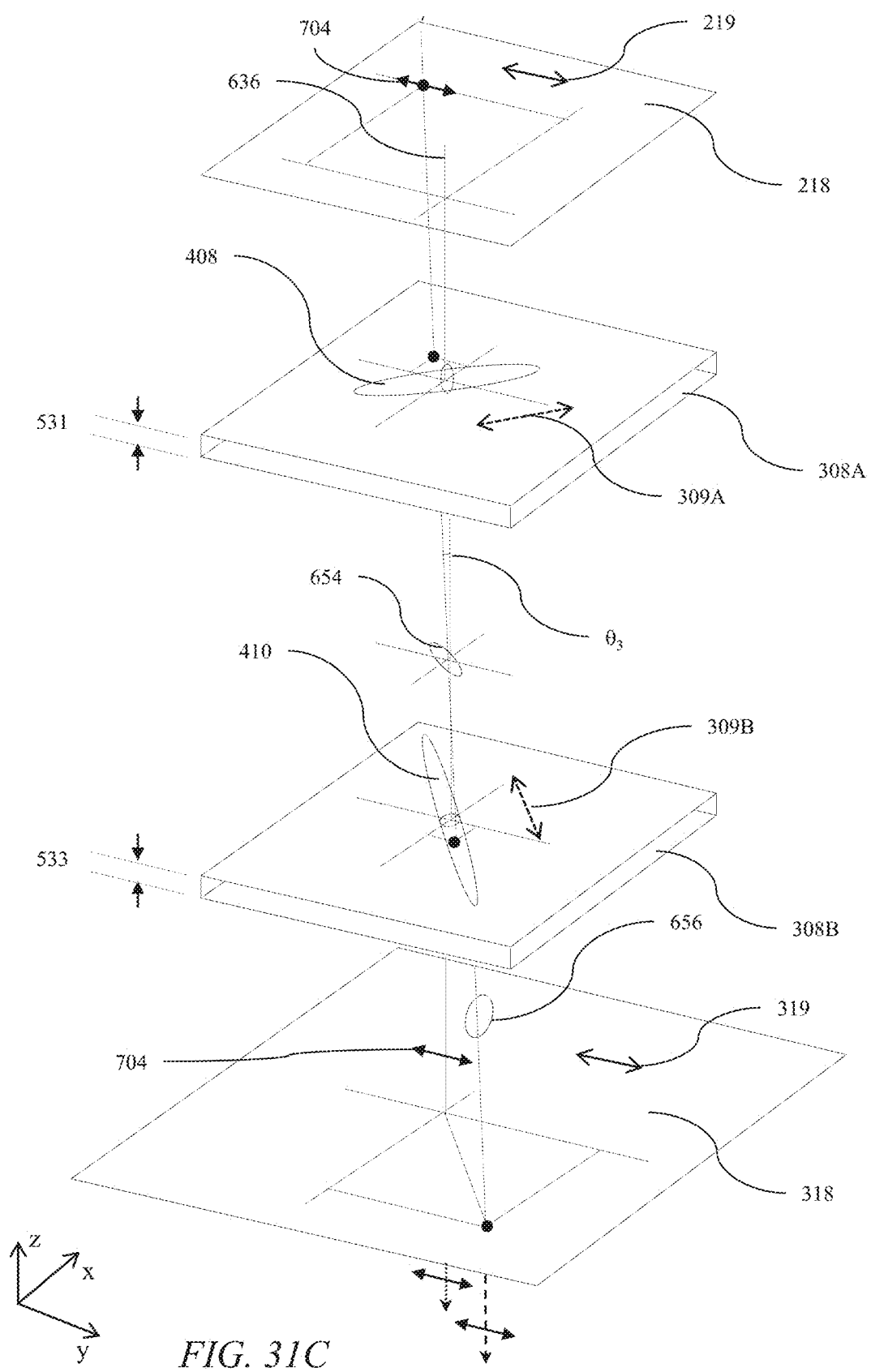
FIG. 31C is a schematic diagram illustrating in perspective view illumination of crossed A-plate retarder layers by off-axis polarised light with a positive elevation and negative lateral angle.

FIG. 31C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 318 with reduced luminance in comparison to the input luminance of the first polarisation component 704.

Figure 31D:
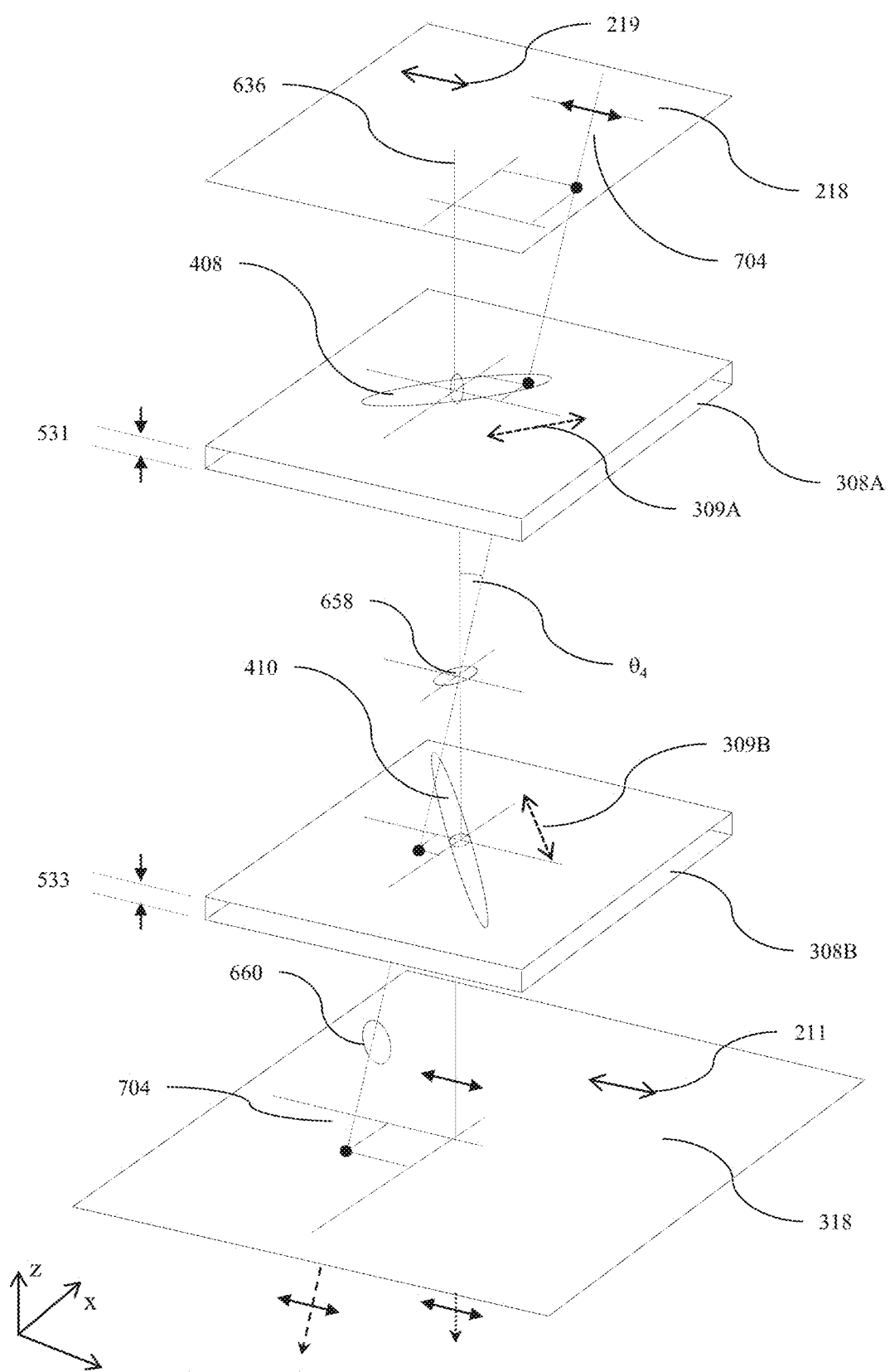
FIG. 31D is a schematic diagram illustrating in perspective view illumination of crossed A-plate retarder layers by off-axis polarised light with a positive elevation and positive lateral angle.

FIG. 31D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 31E:
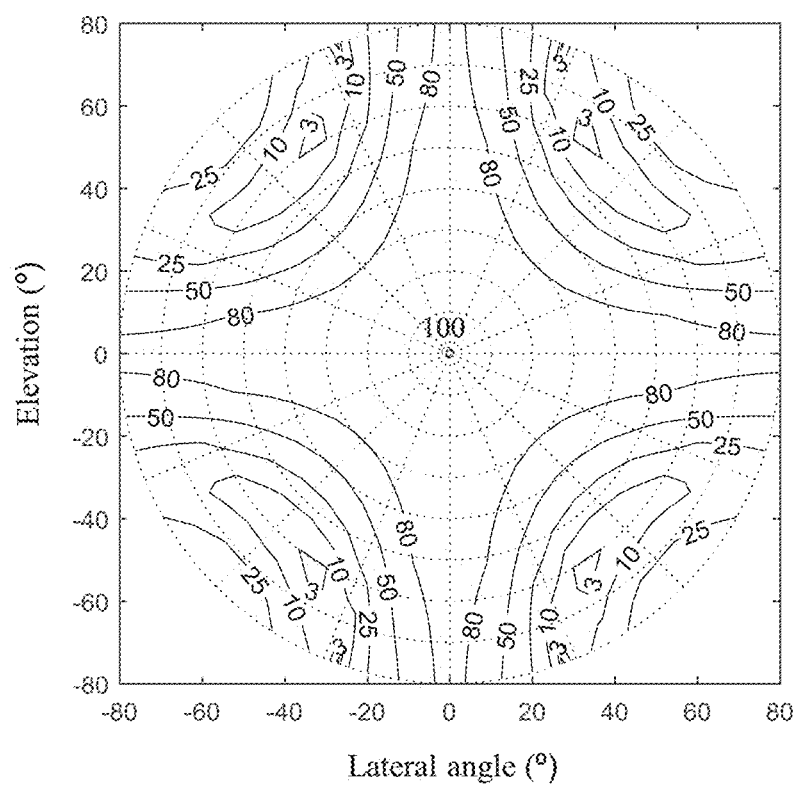
FIG. 31E is a schematic graph illustrating the variation of output transmission with polar direction for transmitted light rays in FIGS. 31A-D.

FIG. 31E is a schematic graph illustrating the variation of output transmission with polar direction for transmitted light rays in FIGS. 31A-D. In comparison to the arrangement of FIG. 30E, the area of luminance reduction is increased for off-axis viewing. However, the switchable liquid crystal retarder 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
   a spatial light modulator;
   a display polariser arranged on a side of the spatial light modulator;
   an additional polariser arranged on the same side of the spatial light modulator as the display polariser; and
   plural retarders arranged between the additional polariser and the display polariser, there being no further polarisers arranged between the plural retarders;
   wherein the plural retarders comprise:
   a switchable liquid crystal retarder comprising either:
   a layer of liquid crystal material and two surface alignment layers disposed adjacent to the layer of liquid crystal material and on opposite sides thereof, each of the surface alignment layers being arranged to provide homeotropic alignment in the adjacent liquid crystal material and each of the surface alignment layers having a pretilt having a pretilt direction with a component in a plane of the layer of liquid crystal material that is parallel or anti-parallel or orthogonal to an electric vector transmission direction of the display polariser, the layer of liquid crystal material having a negative dielectric anisotropy and having a retardance for light of a wavelength of 550 nm in a range from 500 nm to 1000 nm; or
   a layer of liquid crystal material and two surface alignment layers disposed adjacent to the layer of liquid crystal material and on opposite sides thereof, each of the surface alignment layers being arranged to provide homogeneous alignment in the adjacent liquid crystal material and each of the surface alignment layers having a pretilt having a pretilt direction with a component in a plane of the layer of liquid crystal material that is parallel or anti-parallel or orthogonal to an electric vector transmission direction of the display polariser, the layer of liquid crystal material having a positive dielectric anisotropy and having a retardance for light of a wavelength of 550 nm in a range from 500 nm to 1000 nm; and plural passive compensation retarders, each passive compensation retarder having its optical axis perpendicular to a plane of the retarder, the plural passive compensation retarders having a total retardance for light of a wavelength of 550 nm in a range from −300 nm to −900 nm in the case that the two surface alignment layers are arranged to provide homeotropic alignment in the adjacent liquid crystal material or in a range from −300 nm to −700 nm in the case that the two surface alignment layers are arranged to provide homogeneous alignment in the adjacent liquid crystal material.

2. The display device according to claim 1, wherein the display polariser and the additional polariser have electric vector transmission directions that are parallel.

3. The display device according to claim 1, wherein the layer of liquid crystal material of the switchable liquid crystal retarder has a retardance for light of a wavelength of 550 nm in a range from 600 nm to 900 nm in the case that the two surface alignment layers are arranged to provide homeotropic alignment in the adjacent liquid crystal material.

4. The display device according to claim 1, wherein the layer of liquid crystal material of the switchable liquid crystal retarder has a retardance for light of a wavelength of 550 nm in a range from 700 nm to 850 nm in the case that the two surface alignment layers are arranged to provide homeotropic alignment in the adjacent liquid crystal material.

5. The display device according to claim 1, wherein the plural passive compensation retarders have a total retardance for light of a wavelength of 550 nm in a range from −450 nm to −800 nm in the case that the two surface alignment layers are arranged to provide homeotropic alignment in the adjacent liquid crystal material.

6. The display device according to claim 1, wherein the plural passive compensation retarders have a total retardance for light of a wavelength of 550 nm in a range from −500 nm to −725 nm in the case that the two surface alignment layers are arranged to provide homeotropic alignment in the adjacent liquid crystal material.

7. The display device according to claim 1, wherein the layer of liquid crystal material of the switchable liquid crystal retarder has a retardance for light of a wavelength of 550 nm in a range from 600 nm to 850 nm in the case that the two surface alignment layers are arranged to provide homogeneous alignment in the adjacent liquid crystal material.

8. The display device according to claim 1, wherein the layer of liquid crystal material of the switchable liquid crystal retarder has a retardance for light of a wavelength of 550 nm in a range from 700 nm to 800 nm in the case that the two surface alignment layers are arranged to provide homogeneous alignment in the adjacent liquid crystal material.

9. The display device according to claim 1, wherein the plural passive compensation retarders have a total retardance for light of a wavelength of 550 nm in a range from −350 nm to −600 nm in the case that the two surface alignment layers are arranged to provide homogeneous alignment in the adjacent liquid crystal material.

10. The display device according to claim 1, wherein the plural passive compensation retarders have a total retardance for light of a wavelength of 550 nm in a range from −400 nm to −500 nm in the case that the two surface alignment layers are arranged to provide homogeneous alignment in the adjacent liquid crystal material.

11. The display device according to claim 1, wherein the plural passive compensation retarders comprise at least two passive retarders, and the switchable liquid crystal retarder is provided between two of the passive retarders.

12. The display device according to claim 11, further comprising a transparent electrode and a liquid crystal alignment layer formed on a side of each of two of the passive retarders adjacent the switchable liquid crystal retarder.

13. The display device according to claim 11, further comprising first and second substrates between which the switchable liquid crystal retarder is provided, the first and second substrates each comprising one of the at least two passive retarders.

14. The display device according to claim 1, wherein the total retardance of the plural passive compensation retarders is equal and opposite to the retardance of the switchable liquid crystal retarder.

15. The display device according to claim 1, wherein the switchable liquid crystal retarder further comprises electrodes arranged to apply a voltage for controlling the layer of liquid crystal material.

16. The display device according to claim 15, further comprising a control system arranged to control the voltage applied across the electrodes of the switchable liquid crystal retarder.

17. The display device according to claim 1, further comprising a backlight arranged to output light, wherein the spatial light modulator is a transmissive spatial light modulator arranged to receive output light from the backlight.

18. The display device according to claim 17, wherein the backlight provides a luminance at polar angles to the normal to the spatial light modulator greater than 45 degrees that is at most 33% of the luminance along a normal to the spatial light modulator.

19. The display device according to claim 17, wherein the backlight provides a luminance at polar angles to the normal to the spatial light modulator greater than 45 degrees that is at most 20% of the luminance along the normal to the spatial light modulator.

20. The display device according to claim 17, wherein the backlight provides a luminance at polar angles to the normal to the spatial light modulator greater than 45 degrees that is at most 10% of the luminance along the normal to the spatial light modulator.

21. The display device according to claim 17, wherein the backlight comprises:
an array of light sources;
a directional waveguide comprising:
an input end extending in a lateral direction along a side of the directional waveguide, the light sources being disposed along the input end and arranged to input input light into the waveguide; and
opposed first and second guide surfaces extending across the directional waveguide from the input end for guiding light input at the input end along the waveguide, the waveguide being arranged to deflect input light guided through the directional waveguide to exit through the first guide surface.

22. The display device according to claim 21, wherein the backlight further comprises a light turning film and the directional waveguide is a collimating waveguide.

23. The display device according to claim 22, wherein the collimating waveguide comprises
(i) a plurality of elongate lenticular elements; and
(ii) a plurality of inclined light extraction features,
wherein the plurality of elongate lenticular elements and the plurality of inclined light extraction features are oriented to deflect input light guided through the directional waveguide to exit through the first guide surface.

24. The display device according to claim 17, wherein the display polariser is an input display polariser arranged on an input side of the spatial light modulator between the backlight and the spatial light modulator, and the additional polariser is arranged between the input display polariser and the backlight.

25. The display device according to claim 24, wherein the additional polariser is a reflective polariser.

26. The display device according to claim 1, wherein the display polariser is an output polariser arranged on an output side of the spatial light modulator.

27. The display device according to claim 1, wherein the spatial light modulator comprises an emissive spatial light modulator arranged to output light and the display polariser is an output display polariser arranged on an output side of the emissive spatial light modulator.

* * * * *